July 11, 1967  K. R. THOMPSON  3,330,142
AUTOMATIC ZEROING FOR A ROLLING MILL POSITION REGULATOR
Filed June 1, 1965  36 Sheets-Sheet 1

INVENTOR:
KENNETH R. THOMPSON
BY J T Comfort
ATTORNEY

AMPLIFIER 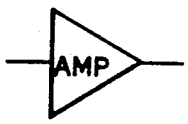
FIG.2A
AND NOT 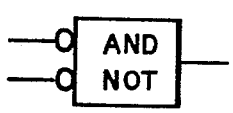
FIG.2B
INVERTER 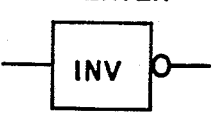
FIG.2C
INVERTING OR 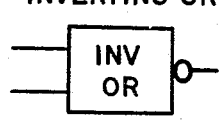
FIG.2D
ONE SHOT 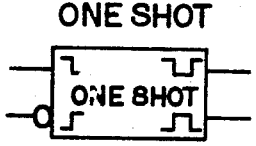
FIG.2E
OR CIRCUIT 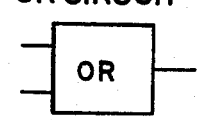
FIG.2F
TIME DELAY 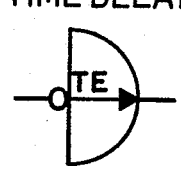
FIG.2G
COIL 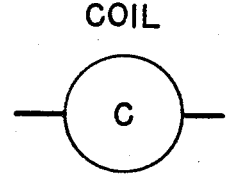
FIG.2H
RESISTER 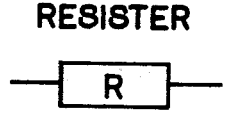
FIG.2I
RELAY CONTACTS 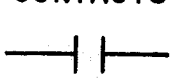
FIG.2J
RELAY CONTACTS 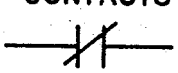
FIG.2K
COUNTER 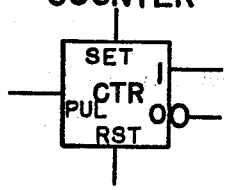
FIG.2L
SHIFT REGISTER 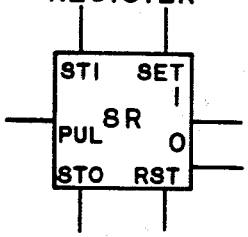
FIG.2M
EXCLUSIVE OR 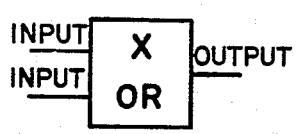
FIG.2N
BINARY ADDER 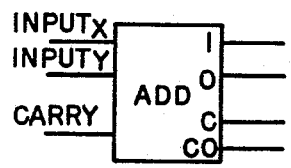
FIG.2O
RELAY FLIPFLOP 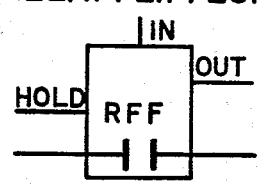
FIG.2P
FIG.2

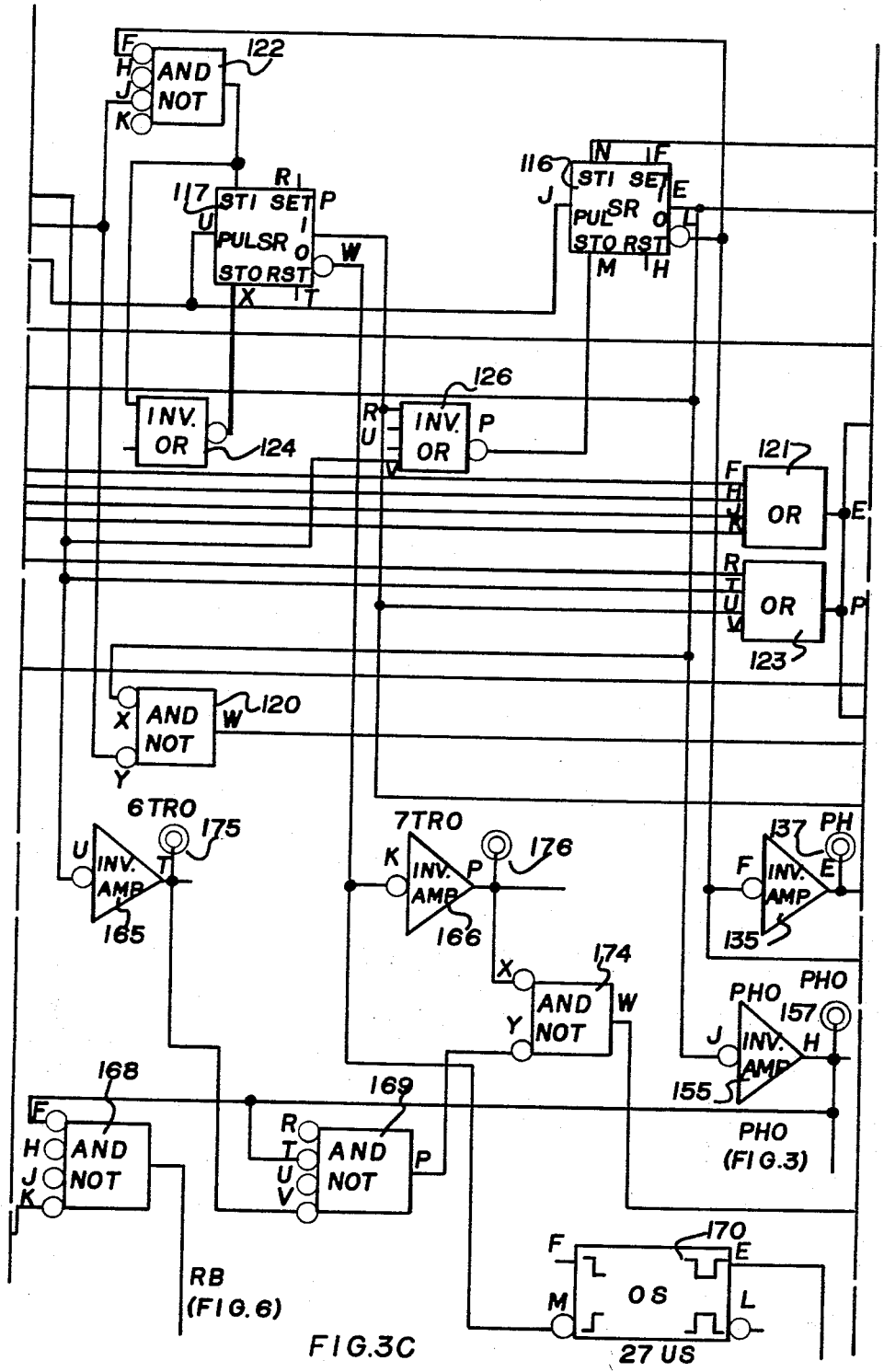

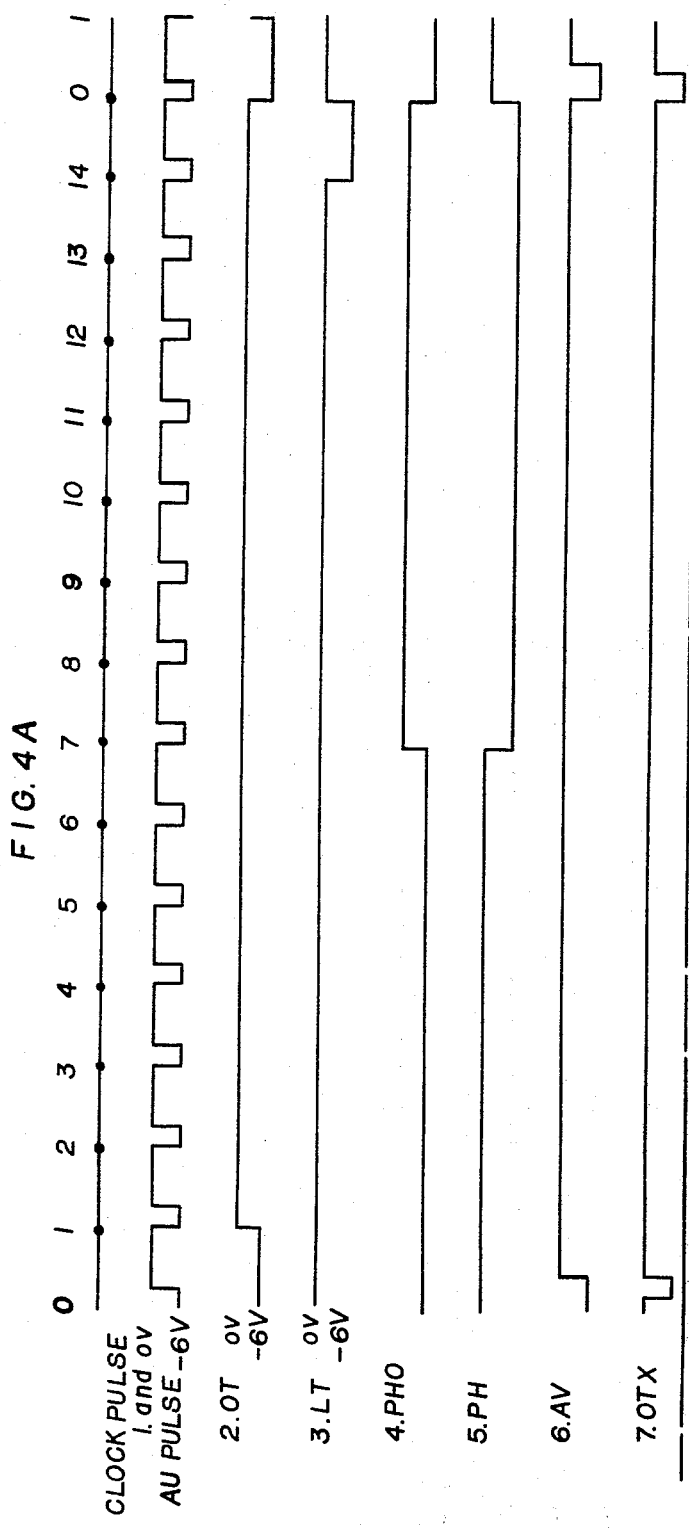

| FIG. 6A | FIG. 6B | FIG. 6E | FIG. 6C | FIG. 6D |
|---|---|---|---|---|
| FIG. 6H | FIG. 6I | FIG. 6J | FIG. 6F | FIG. 6G |

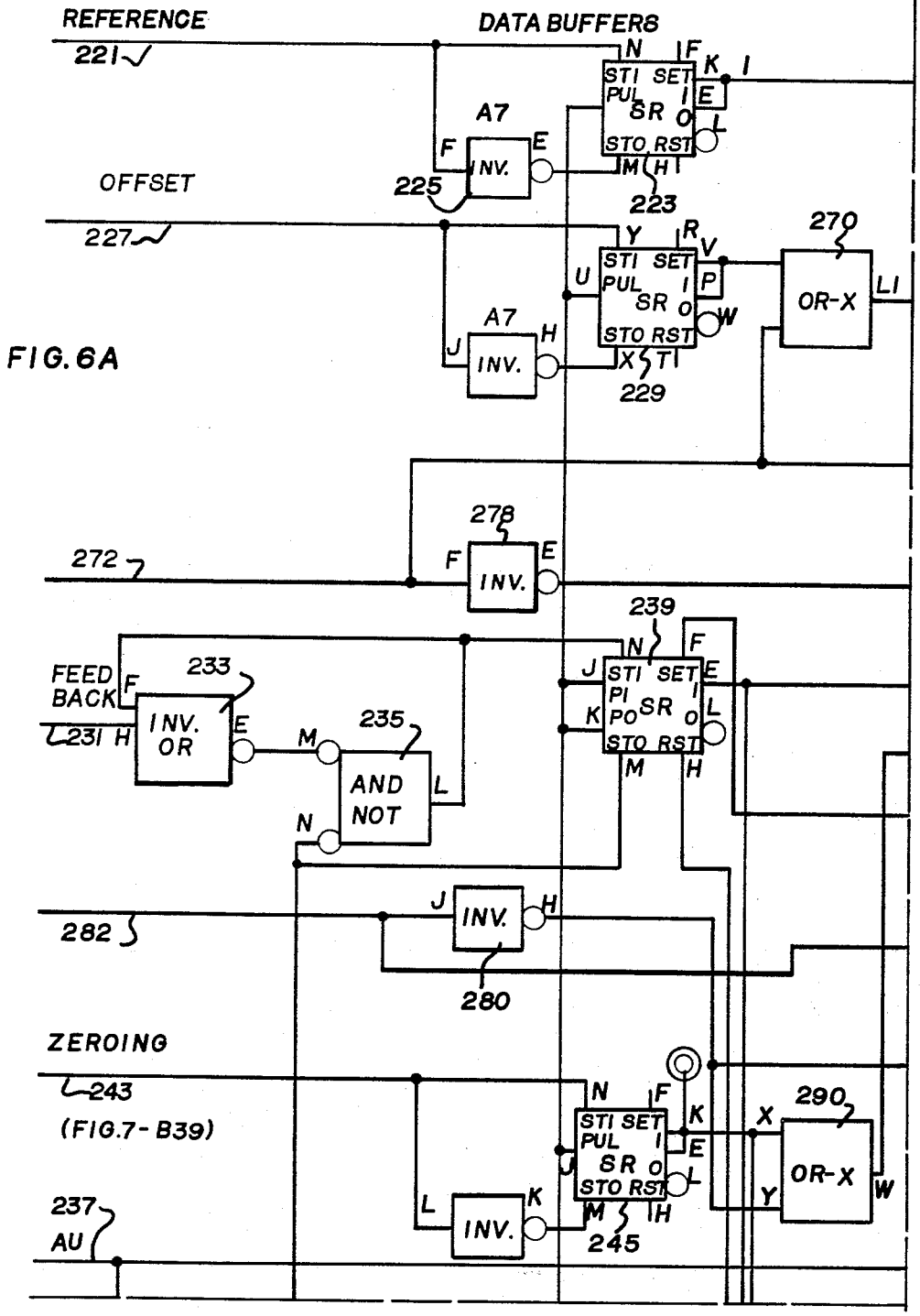

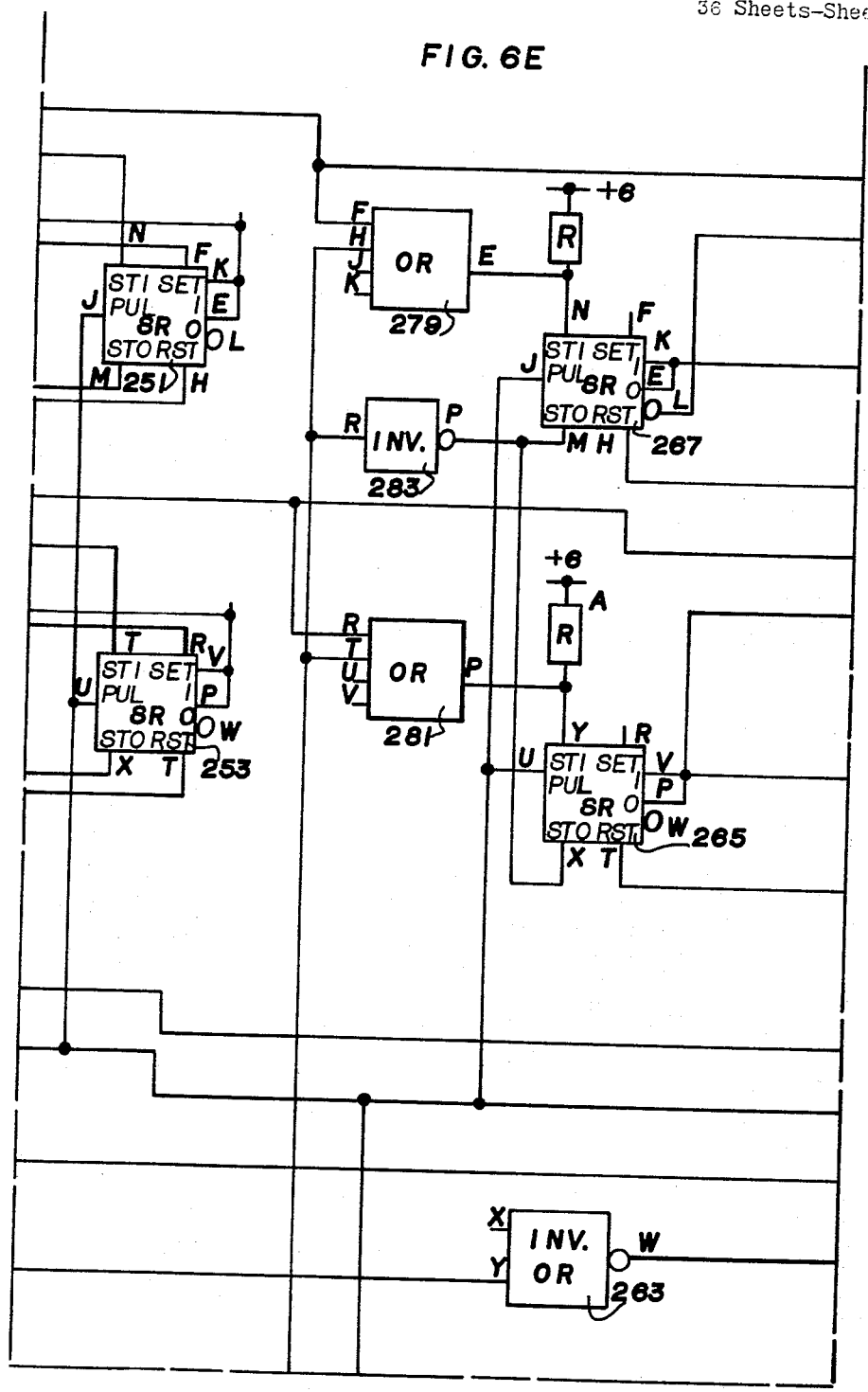

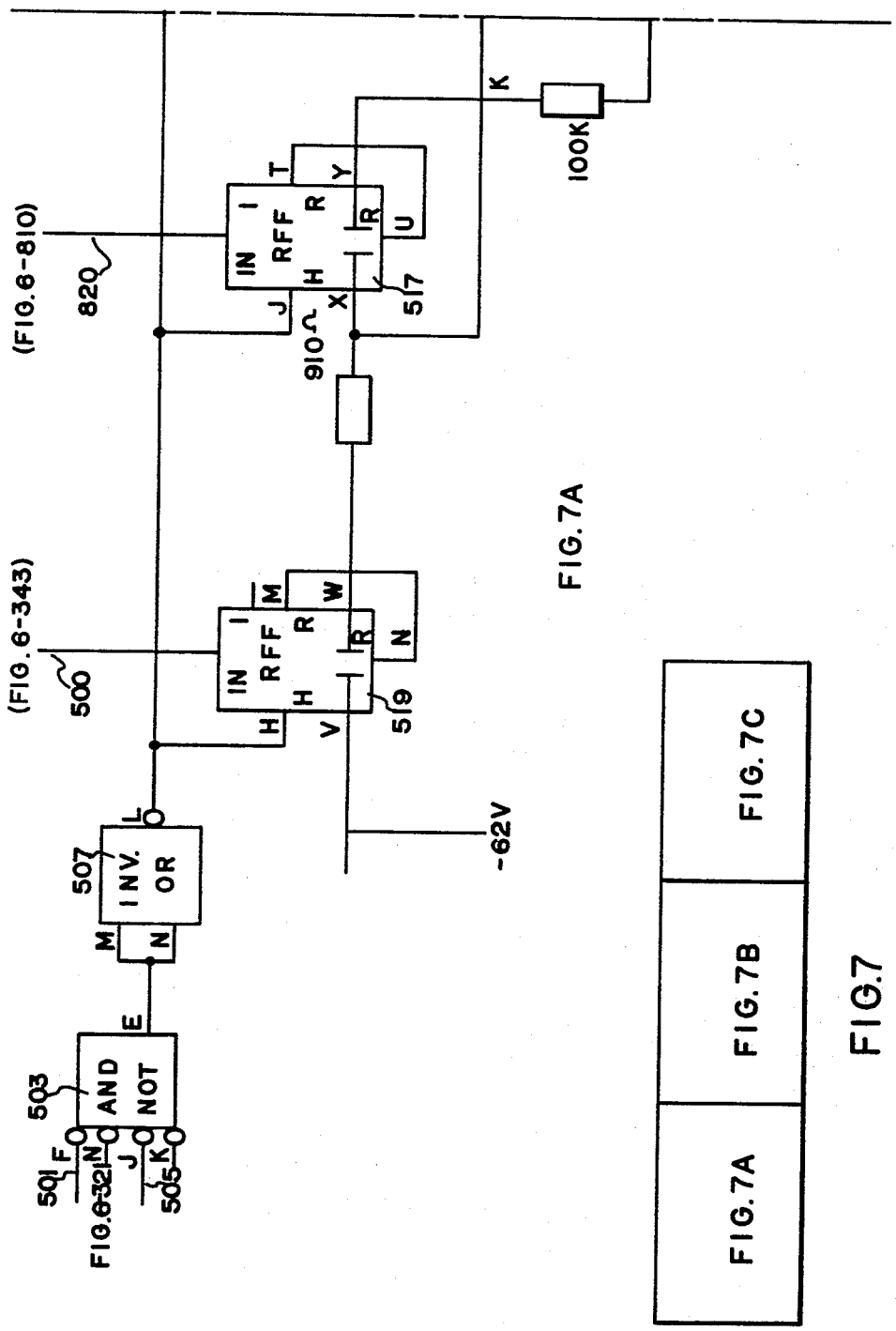

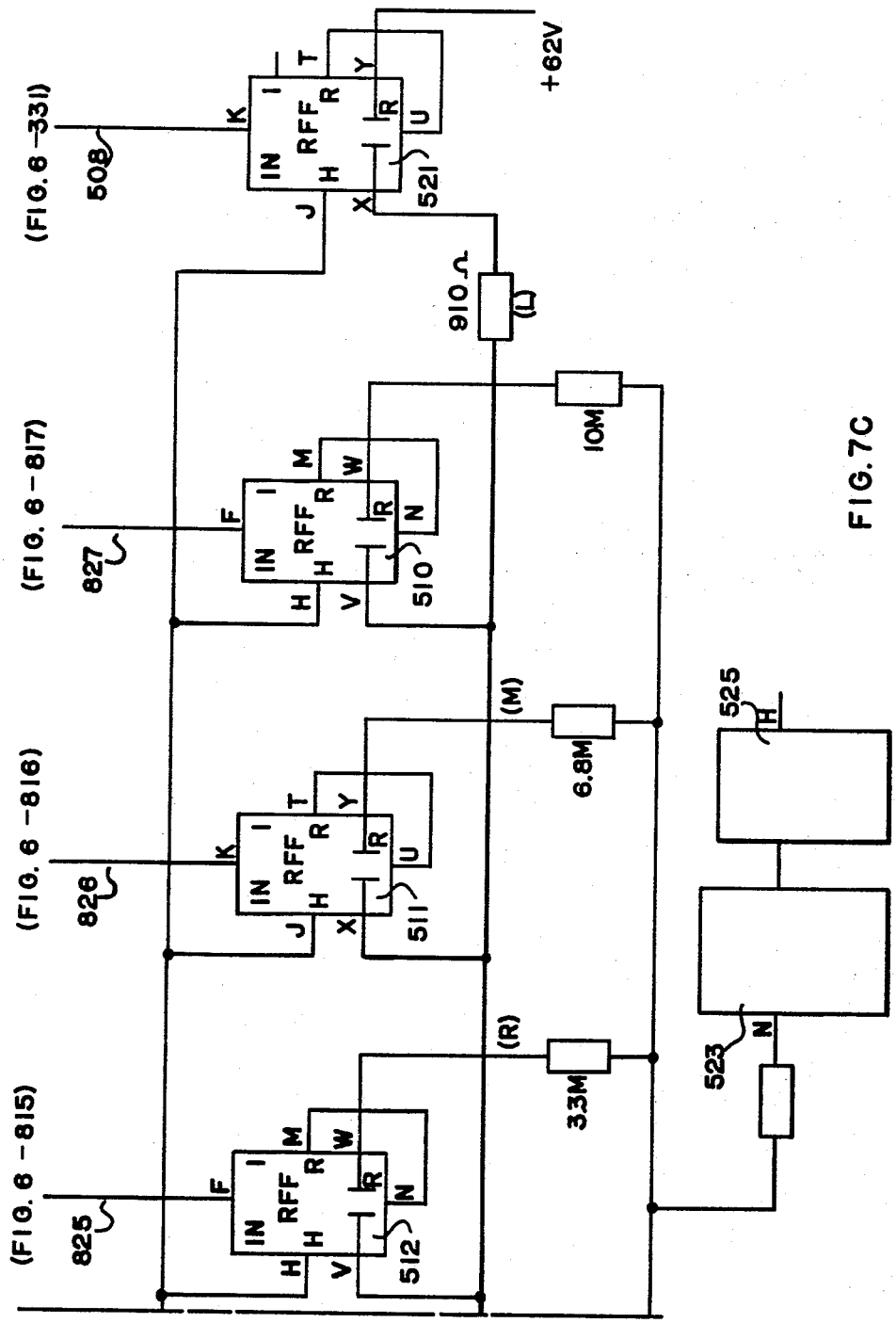

July 11, 1967     K. R. THOMPSON     3,330,142
AUTOMATIC ZEROING FOR A ROLLING MILL POSITION REGULATOR
Filed June 1, 1965     56 Sheets-Sheet 26
FIG.8A
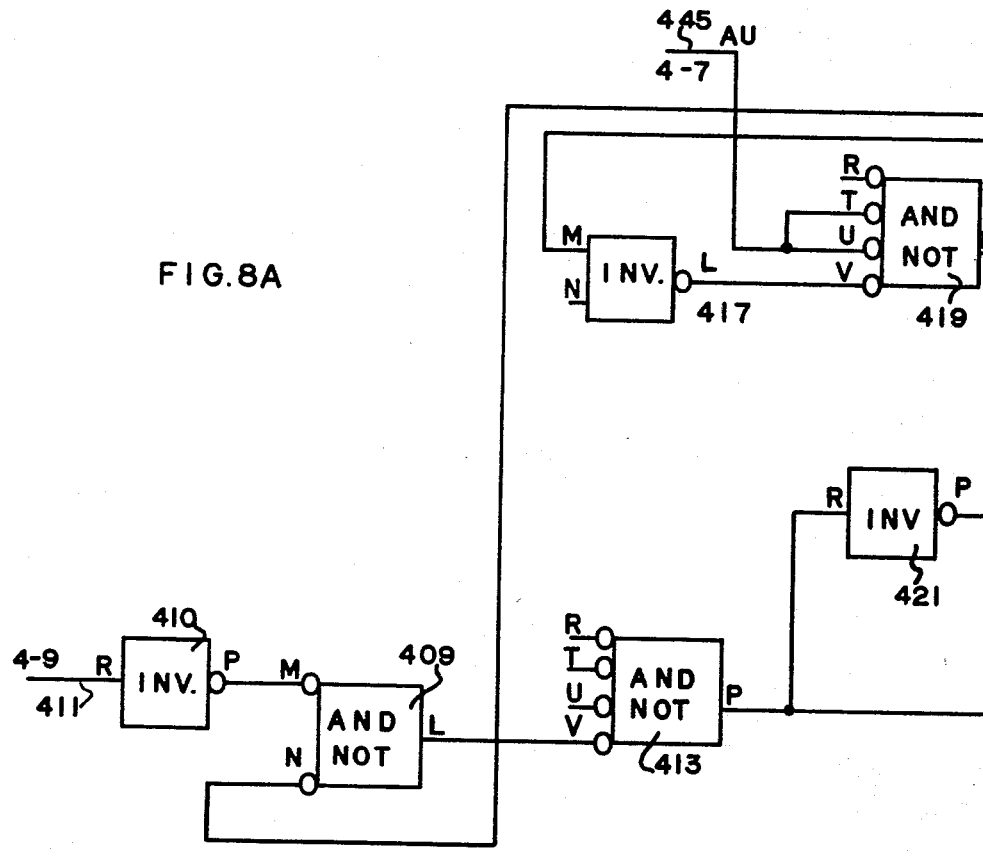
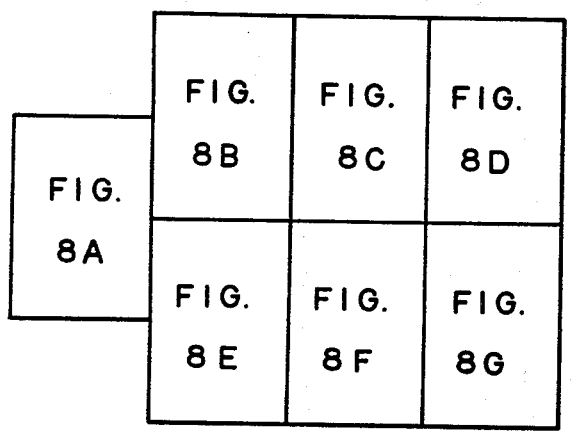
FIG.8

| FIG. 9A | FIG. 9B | FIG. 9C |

United States Patent Office 3,330,142
Patented July 11, 1967

3,330,142
AUTOMATIC ZEROING FOR A ROLLING MILL POSITION REGULATOR
Kenneth R. Thompson, Roanoke, Va., assignor to General Electric Company, a corporation of New York
Filed June 1, 1965, Ser. No. 460,363
8 Claims. (Cl. 72—8)

This invention relates to a system for automatically zeroing a position regulator for a rolling mill. This invention is particularly directed to an automatic zeroing system where the working range of the system is automatically expanded.

The separating distance between coacting rolls in a rolling mill is often used to control the output gage of the strip rolled by the coacting rolls. A desired or reference separating distance is selected and compared with the actual or feedback separating distance. The difference between the reference and feedback is the position error which is used to position the rolls so that the actual separating distance is moved towards the reference separating distance.

The rolls in rolling mills wear during the rolling operations so that the indicated separating distance may not indicate the true separating distance. Different sets of rolls with different diameters may also replace smaller or larger sets of rolls. To overcome this problem a zero correction factor has been used. The actual separating distance between a set of coacting rolls is measured accurately in one of several ways. One way is to position the rolls so that there is a zero separating distance between the coacting rolls. This actual separating distance is then subtracted from the indicated feedback separating distance to provide a zero correction factor. The zero correction factor is then stored in a register and subtracted from the indicated feedback separating distance before the position error is calculated to provide an indication of the actual separating distance between the coacting rolls.

The encoders used to indicate the feedback separating distance between the coacting rolls are normally brush encoders with a coded disc read by brushes to indicate the separating positions. Such brush encoders normally have a limited range, say from a zero to 8191. The binary code on such an encoder is patterned on the disc so that the binary code is continuous. Thus, the brush reading the position on the encoder disc goes straight from the maximum count of 8191 to zero; and when reading down, goes from the minimum count of zero to the maximum count of 8191.

The encoders are thus limited in their working range. Normally this working range is sufficient to accommodate the working range of the coacting rolls if the zero position of the rolls is in the low range of the encoder. For instance, with a range of 8191 if the zero position of the rolls is 2000, the working range of 6192 in the encoder is an adequate working range for the rolls. However, when the large rolls are used and the zero position of the rolls is in the high range of the encoder, for instance if the zero position of the rolls is 6000, the working range of 2192 in the encoder is not an adequate working range for the rolls. The separating distance between the coacting rolls may become larger than the encoder working range so that the encoder may go past its maximum indication to the minimum indication. In a similar manner the zero position of the coacting rolls may be near the zero position of the encoder, and it is possible that the coacting rolls may be moved together so that the encoder goes through zero to the maximum indication.

Both of these conditions are intolerable for the indicated feedback separating difference could not be used. It is therefore an object of this invention to provide a new and improved system for automatically zeroing a position regulator for a rolling mill.

Another object of this invention is to provide a new and improved automatic zeroing system for a rolling mill where the working range of the system is automatically expanded.

Accordingly, the feedback from the encoder is continually compared with the zero correction factor. When the feedback from the encoder is less than the zero correction factor, this is an indication that the encoder is operating in the upper range of the encoder and that the working range of the encoder is not adequate for the working range of the rolling mill. At least one additional binary bit beyond the most significant binary bit is added to the encoder feedback to expand the working range of the encoder for use in the subsequent calculations.

When the zero correction factor plus a number representing the normal working range of the rolling mill is less than the feedback from the encoder, this is an indication that the encoder has gone past zero and the large feedback from the encoder is incorrect. The calculation to determine the position error is carried out in the normal manner using the encoder feedback. The position error is calculated, and a binary number equal to the highest order bit of the encoder is added to the calculated position error to obtain the true position error.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGURE 2 shows the symbols used in the detailed schematics.

Figure 3A:
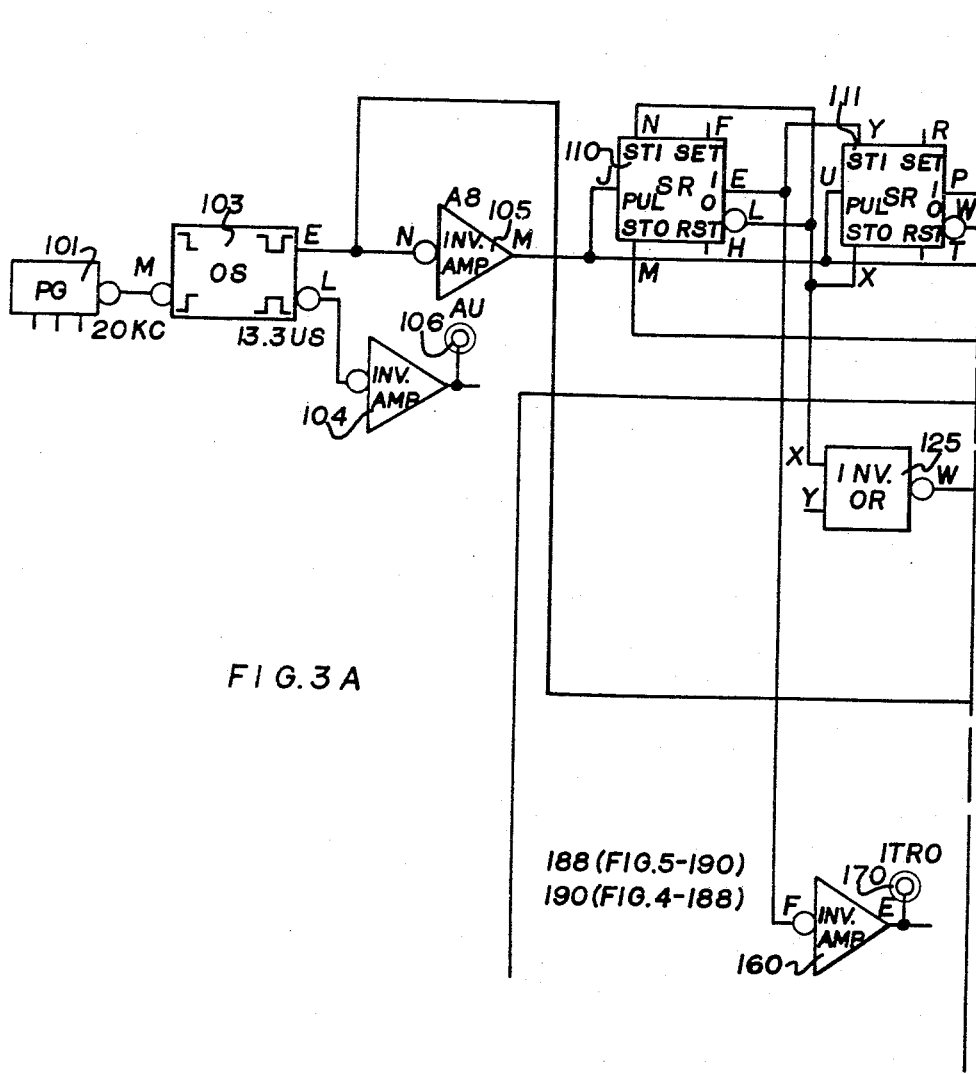
FIGURE 3 shows how to put FIGURES 3A through 3C together.
Figure 3:
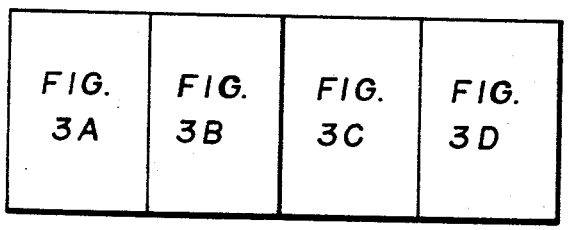
Figure 3B:
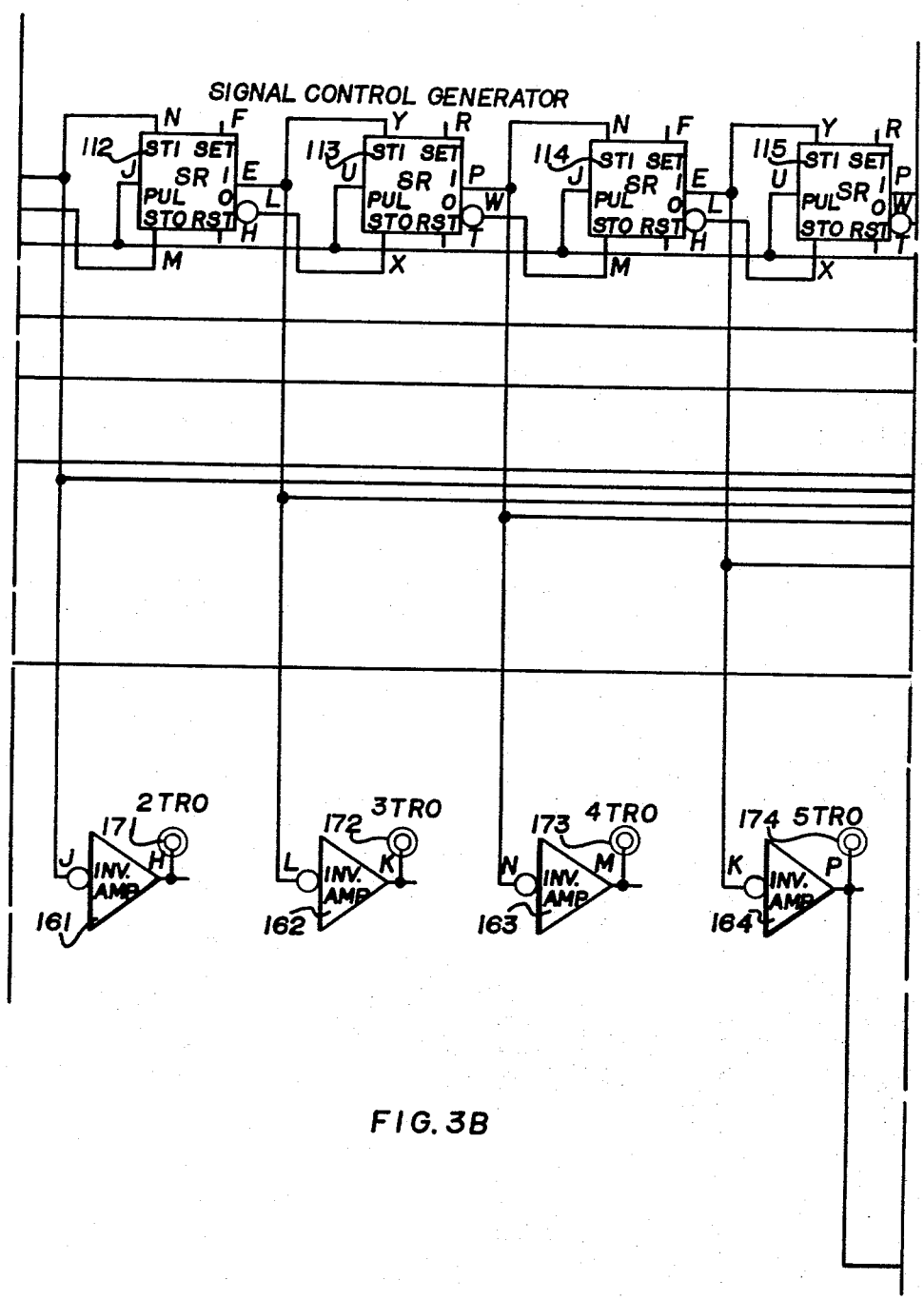
Figure 3D:
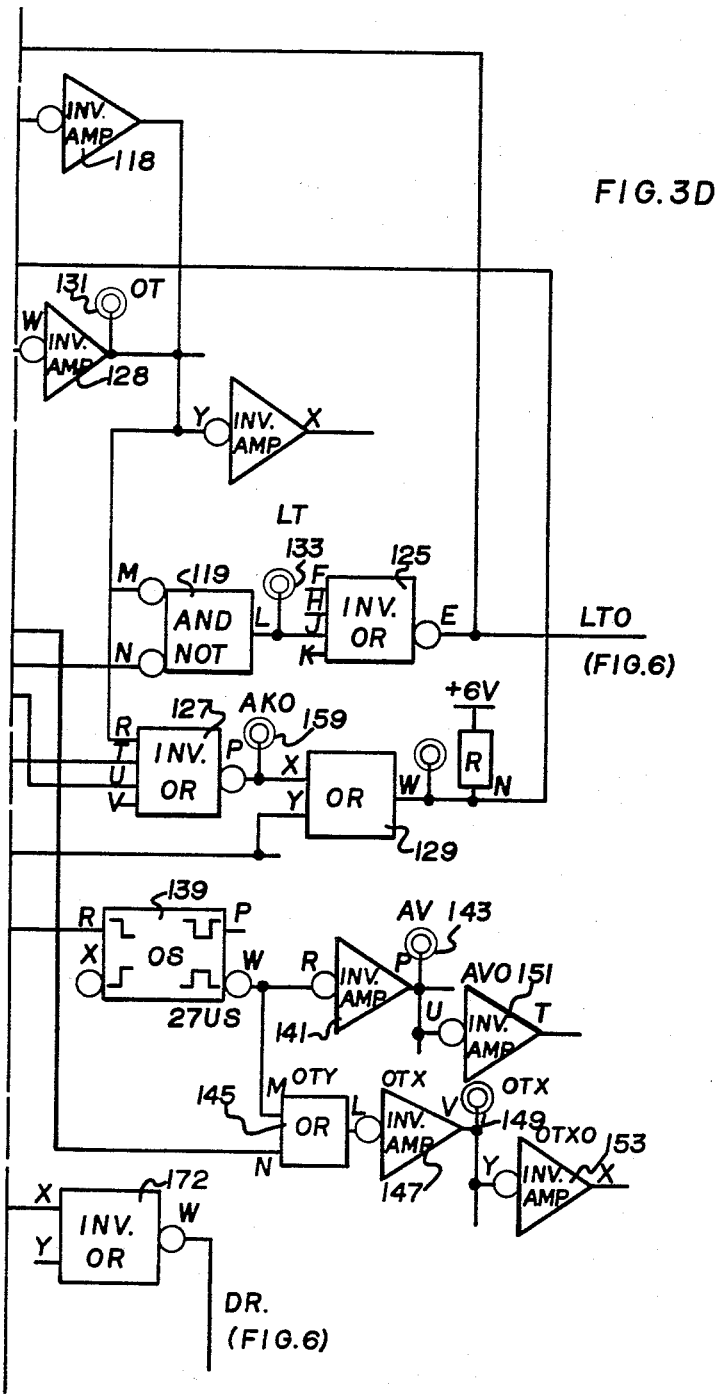

FIGURES 3A through 3C, when put together as shown in FIGURE 3, show a schematic of the signal control generator.

Figure 4:
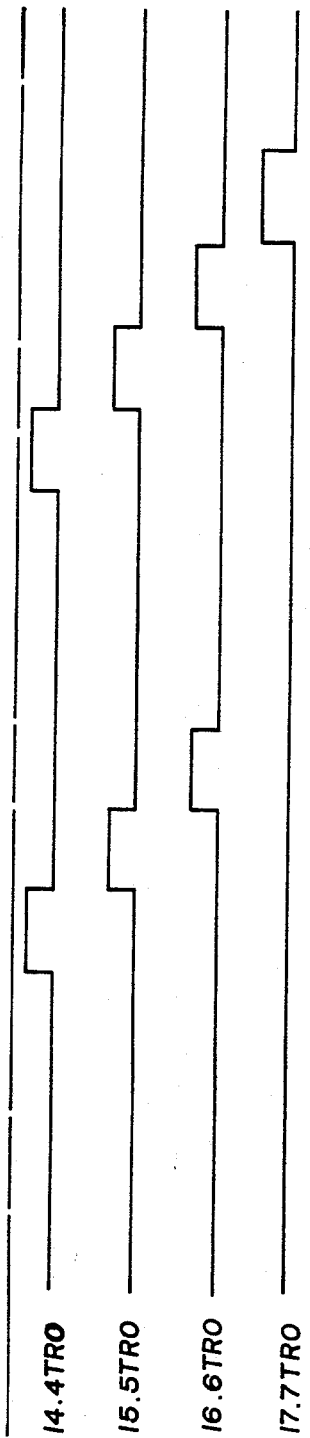
Figure 4:
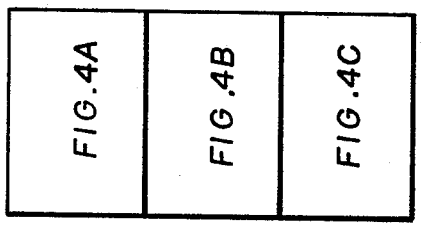
Figure 4B:
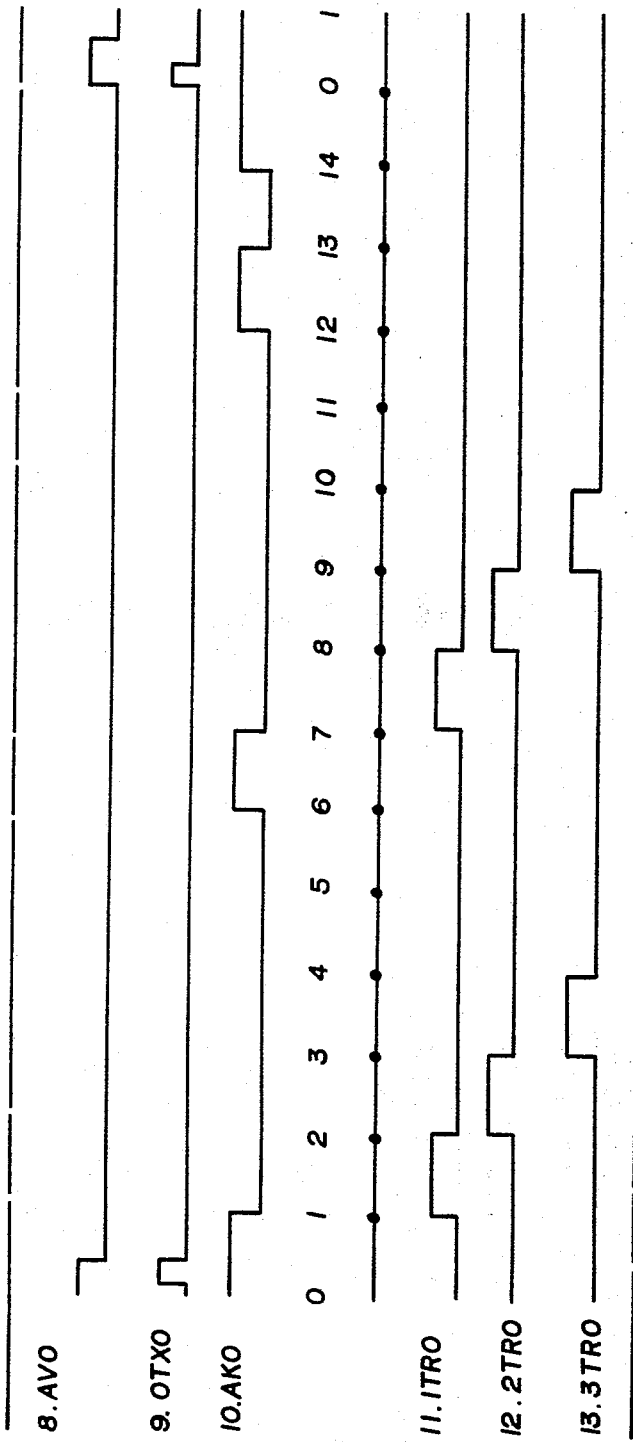

FIGURE 4 shows the timing diagram for the system.

Figure 5C:
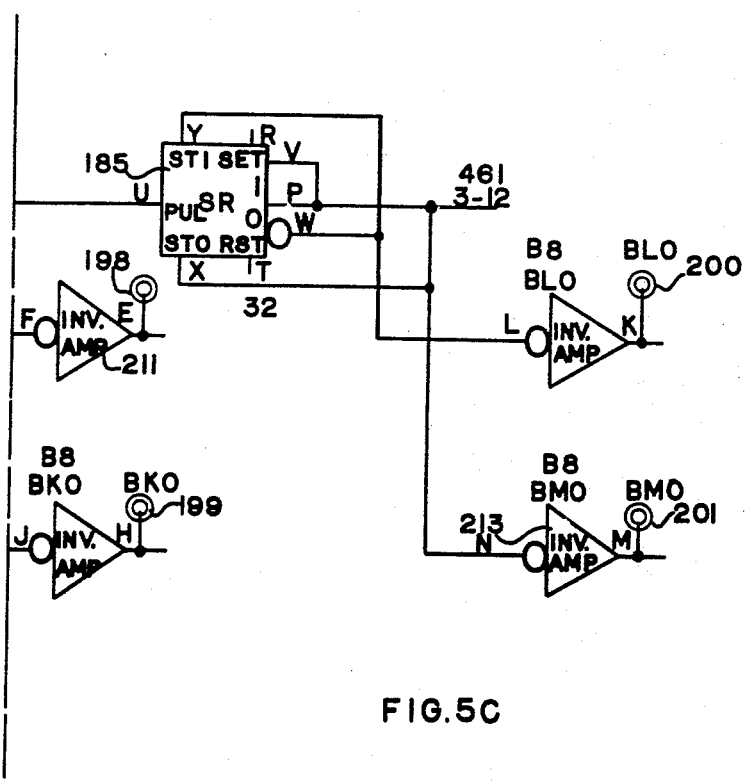
Figure 5:
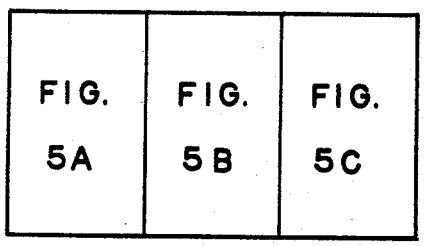
Figure 5A:
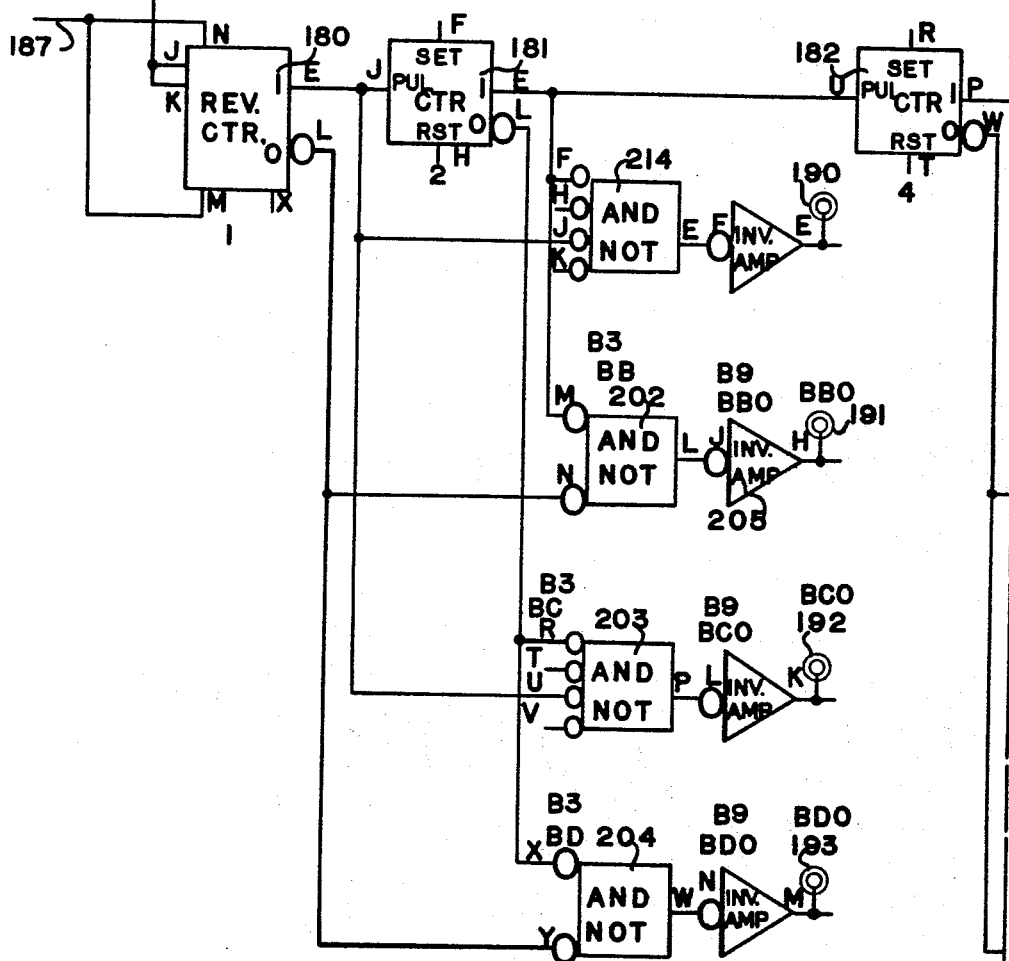
Figure 5B:
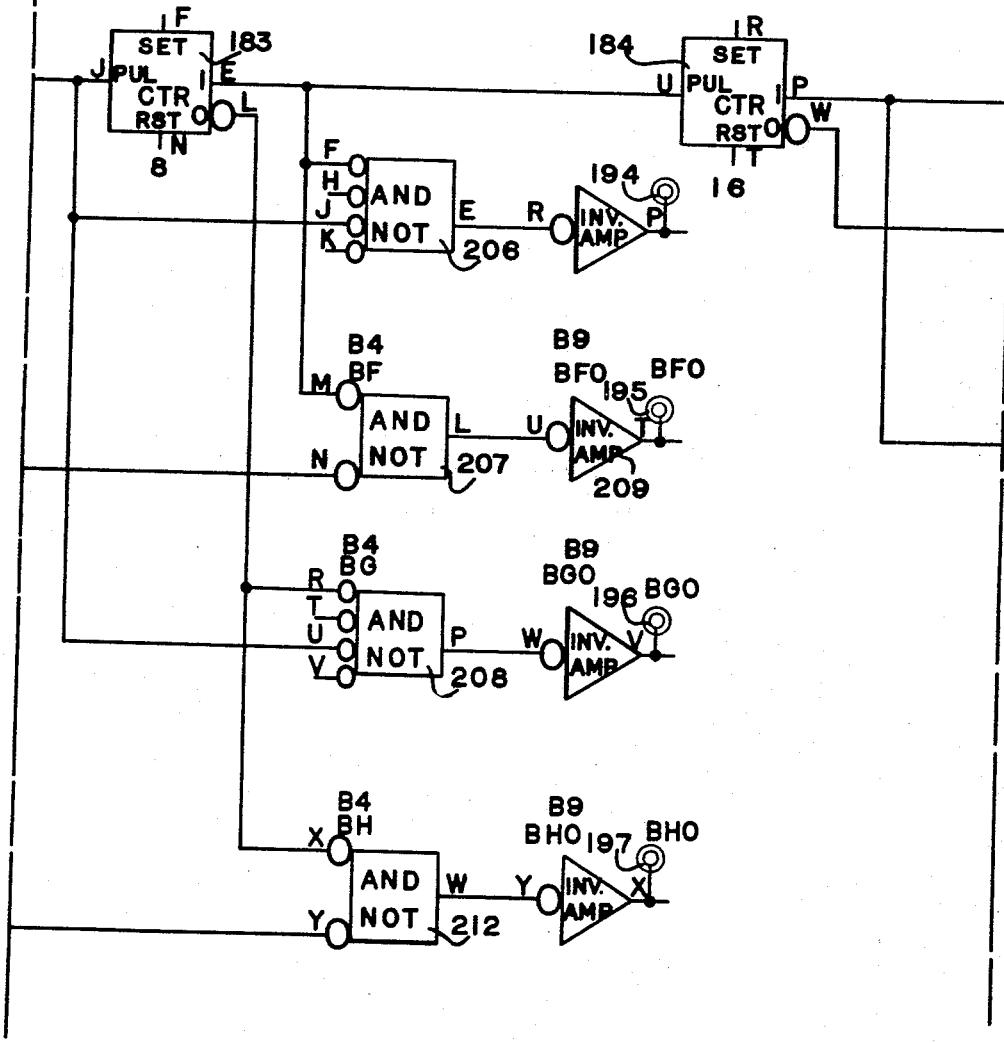

FIGURE 5 shows how to put FIGURE 5A through 5C together.

FIGURES 5A through 5C, when put together as shown in FIGURE 5, show a schematic of the sequence selector element.

Figures 6, 6G:
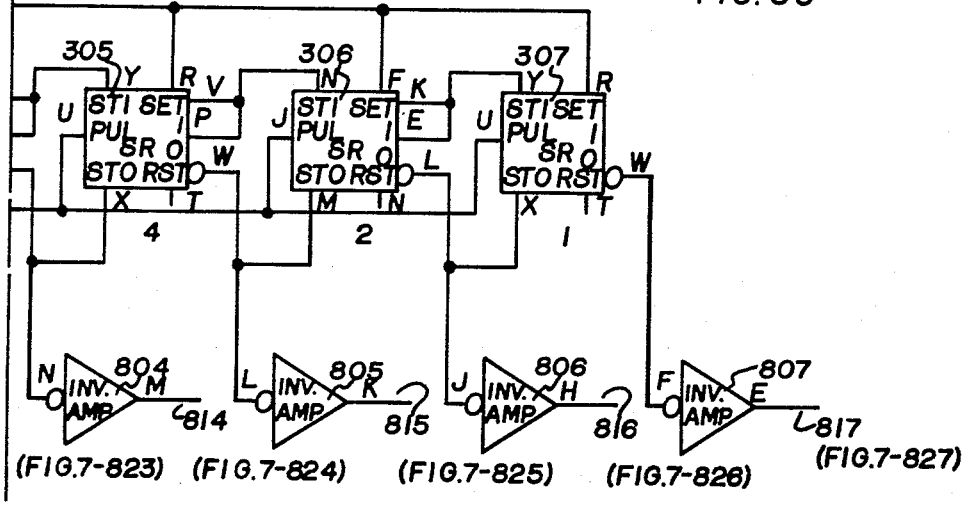
Figure 6B:
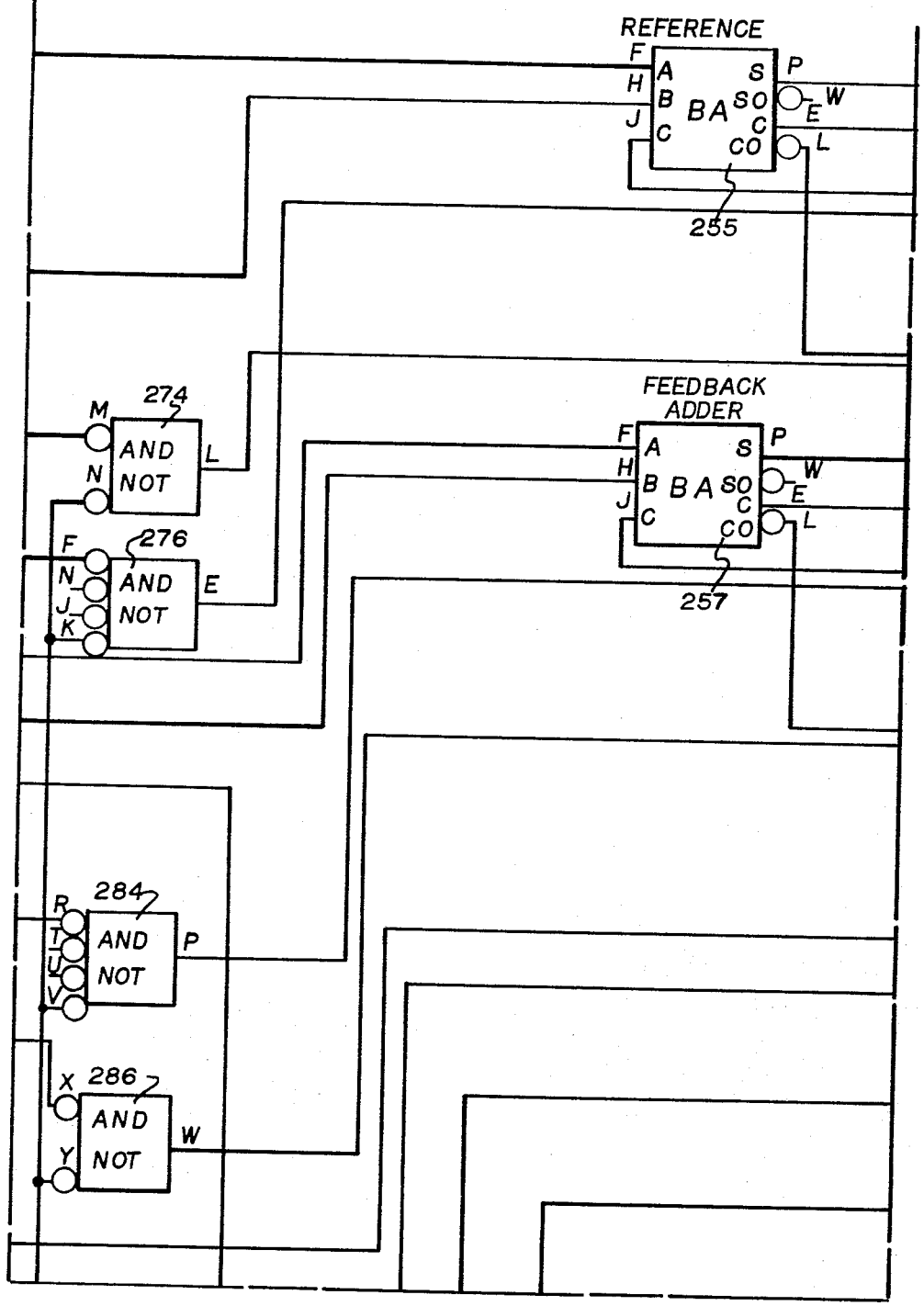
Figure 6C:
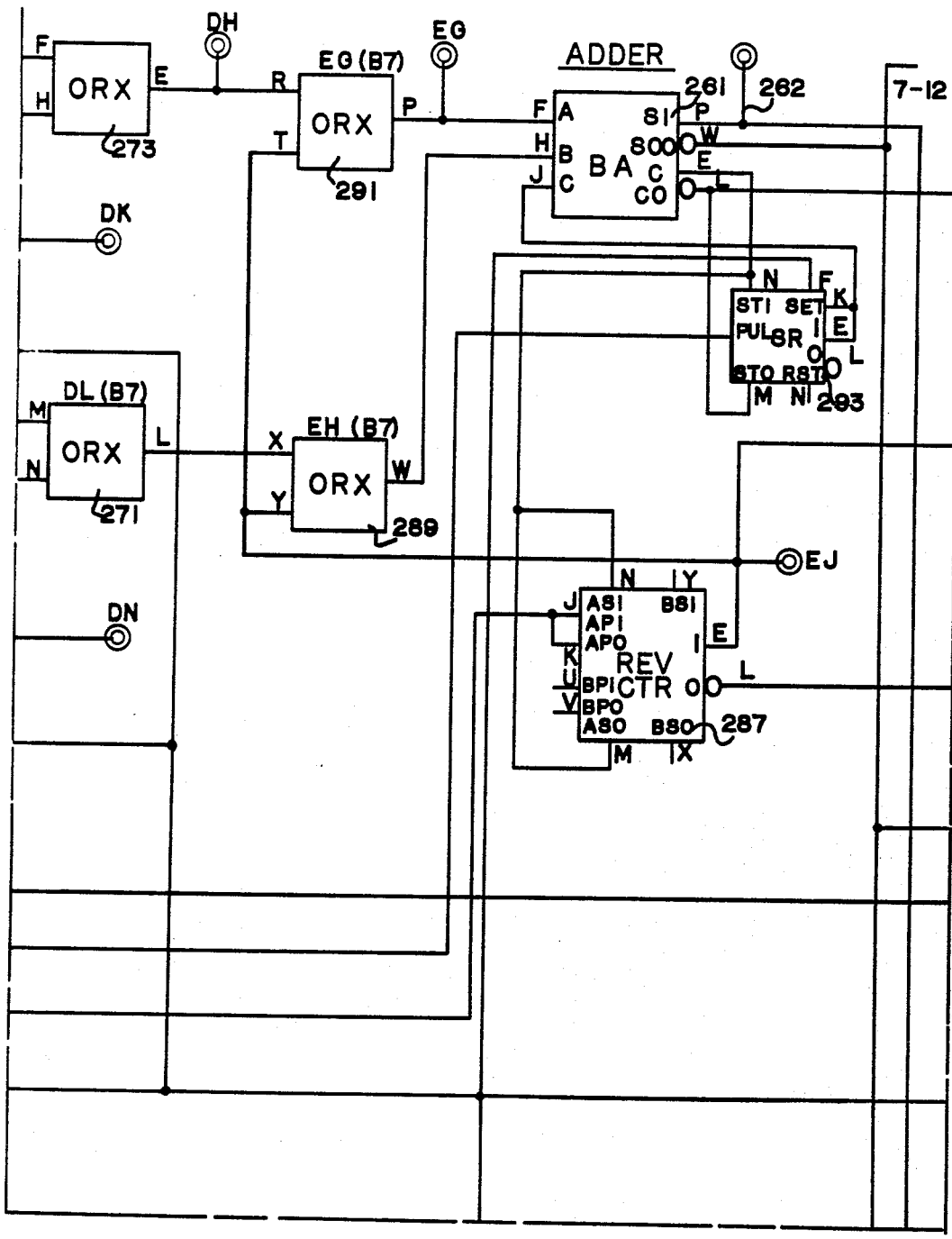
Figure 6D:
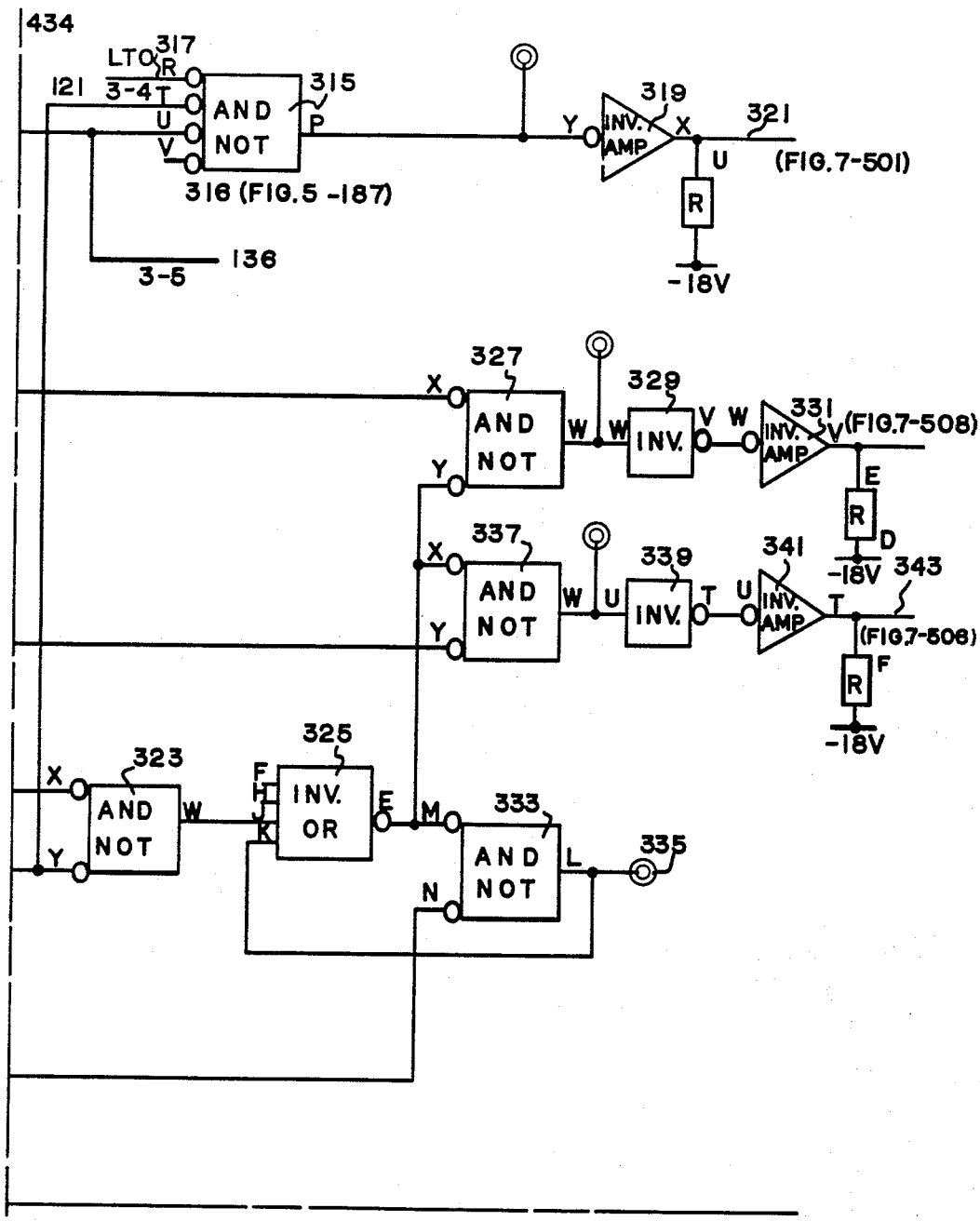
Figure 6F:
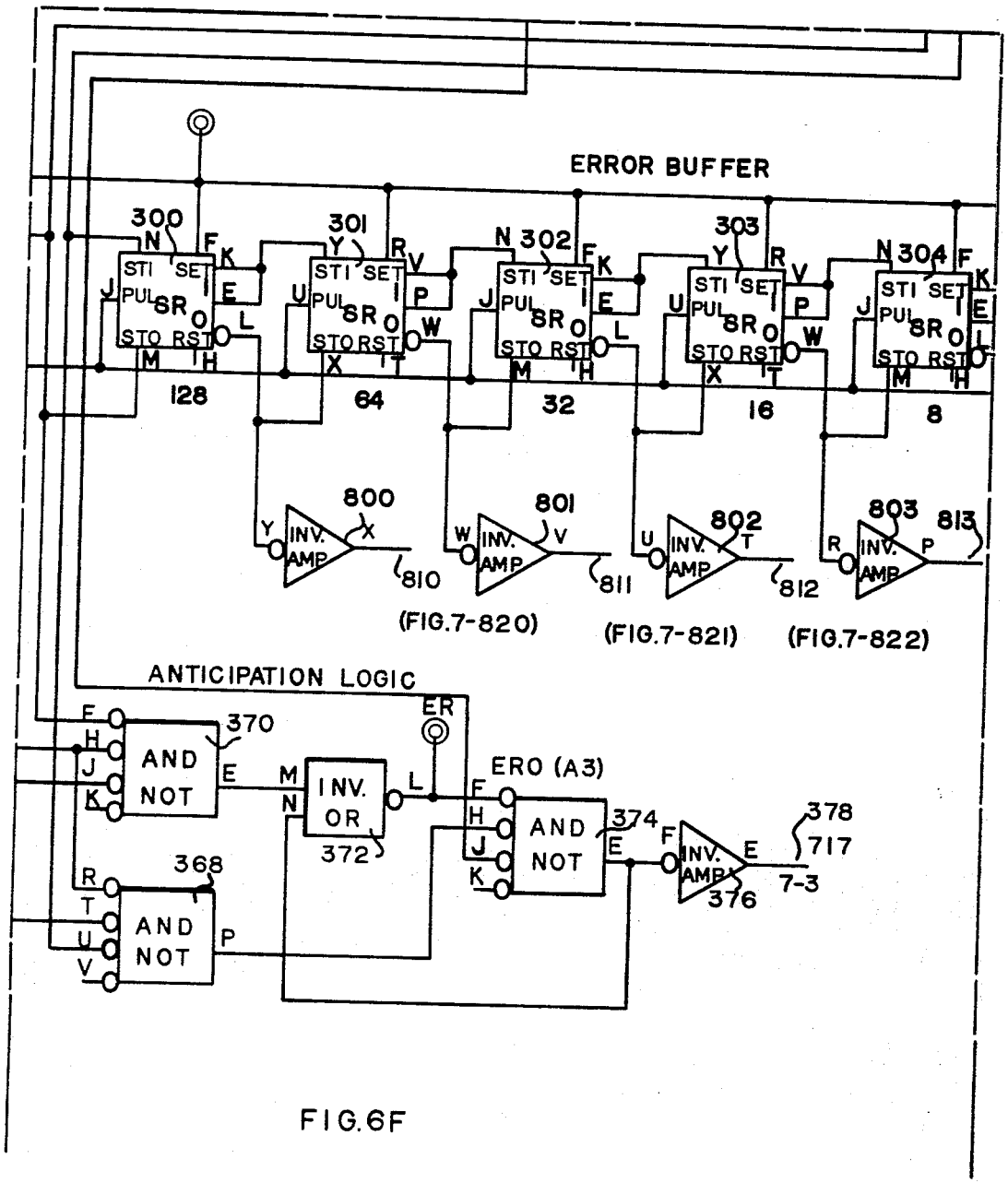
Figure 6H:
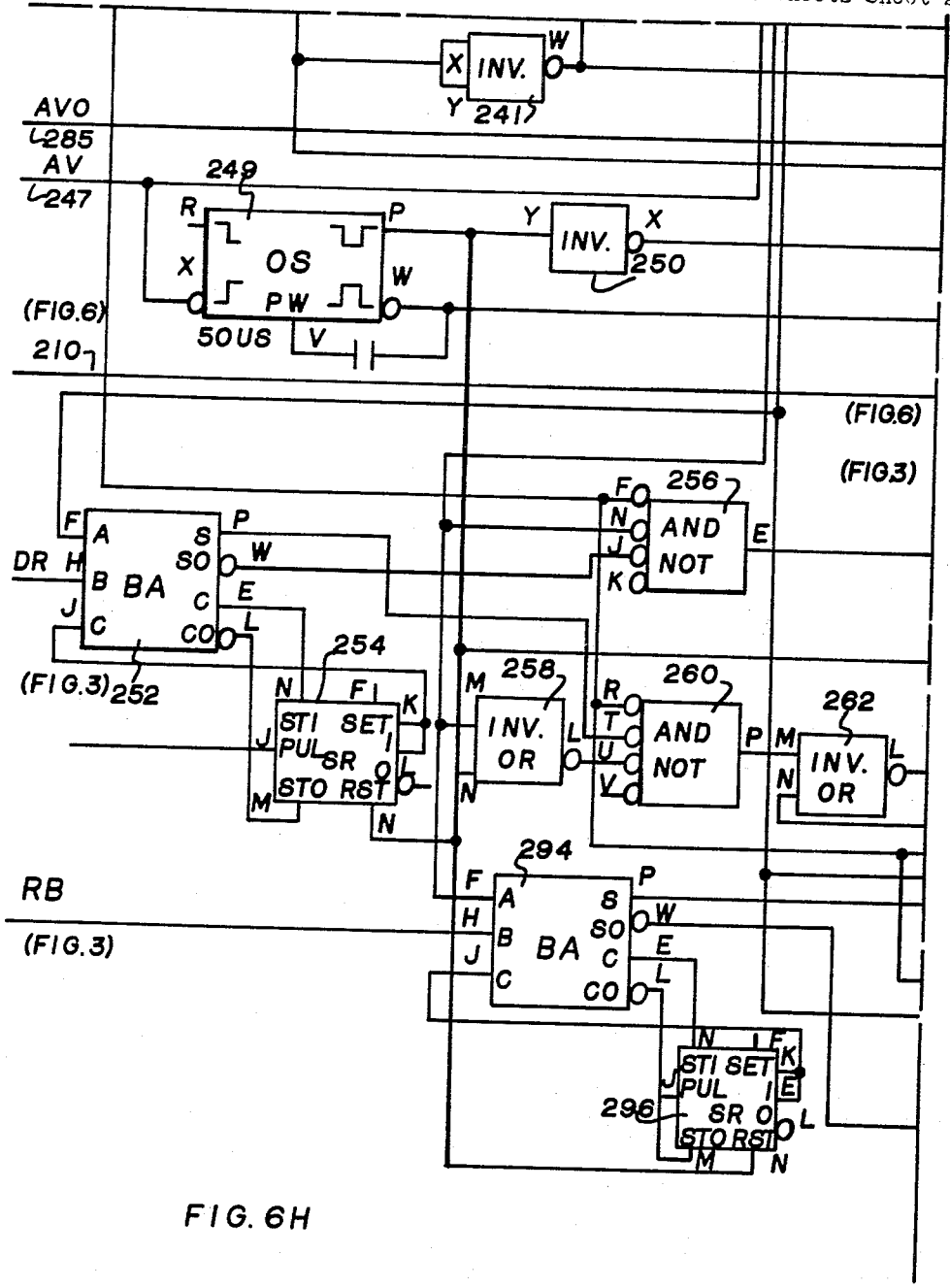
Figure 6I:
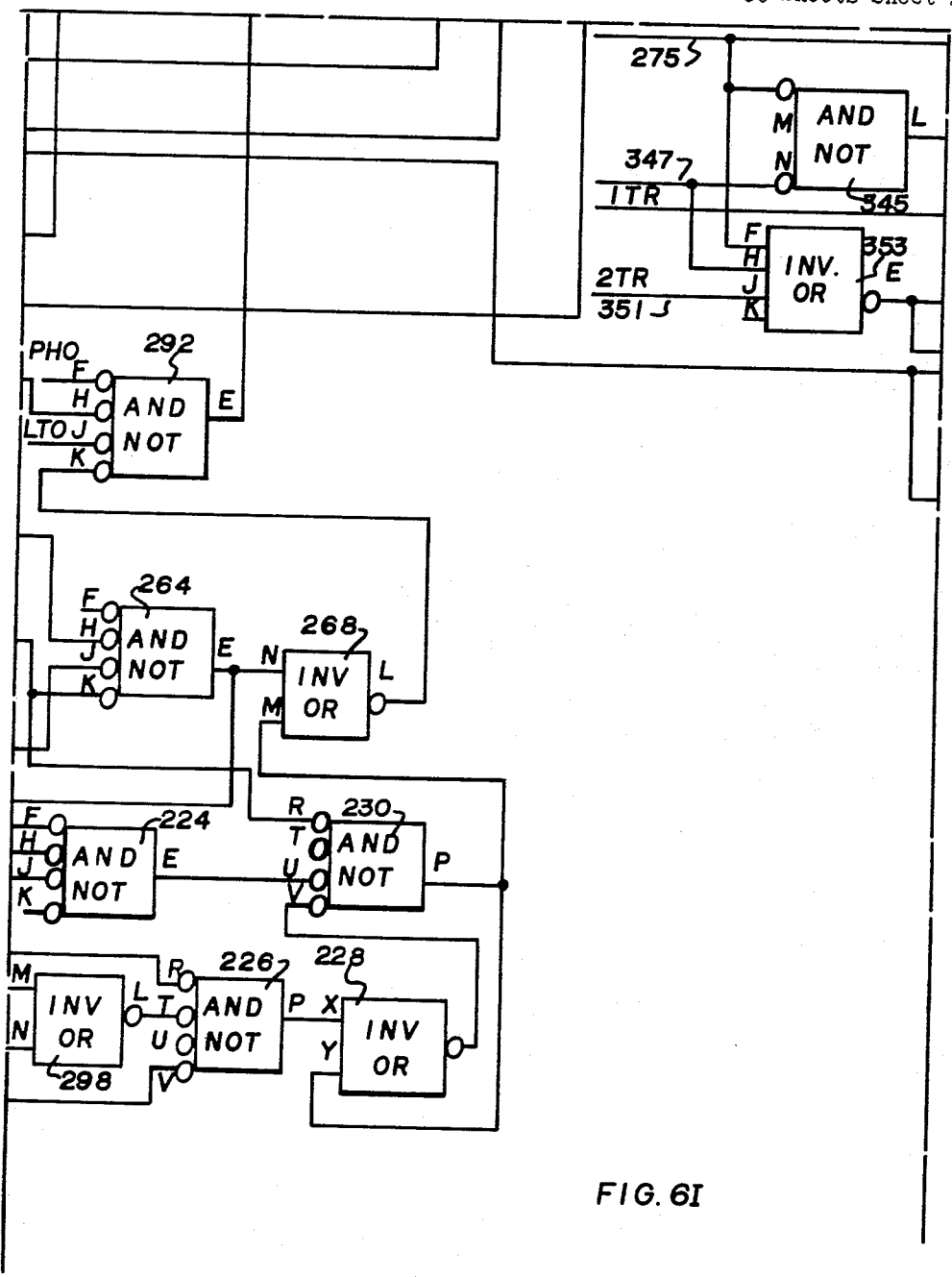
Figure 6J:
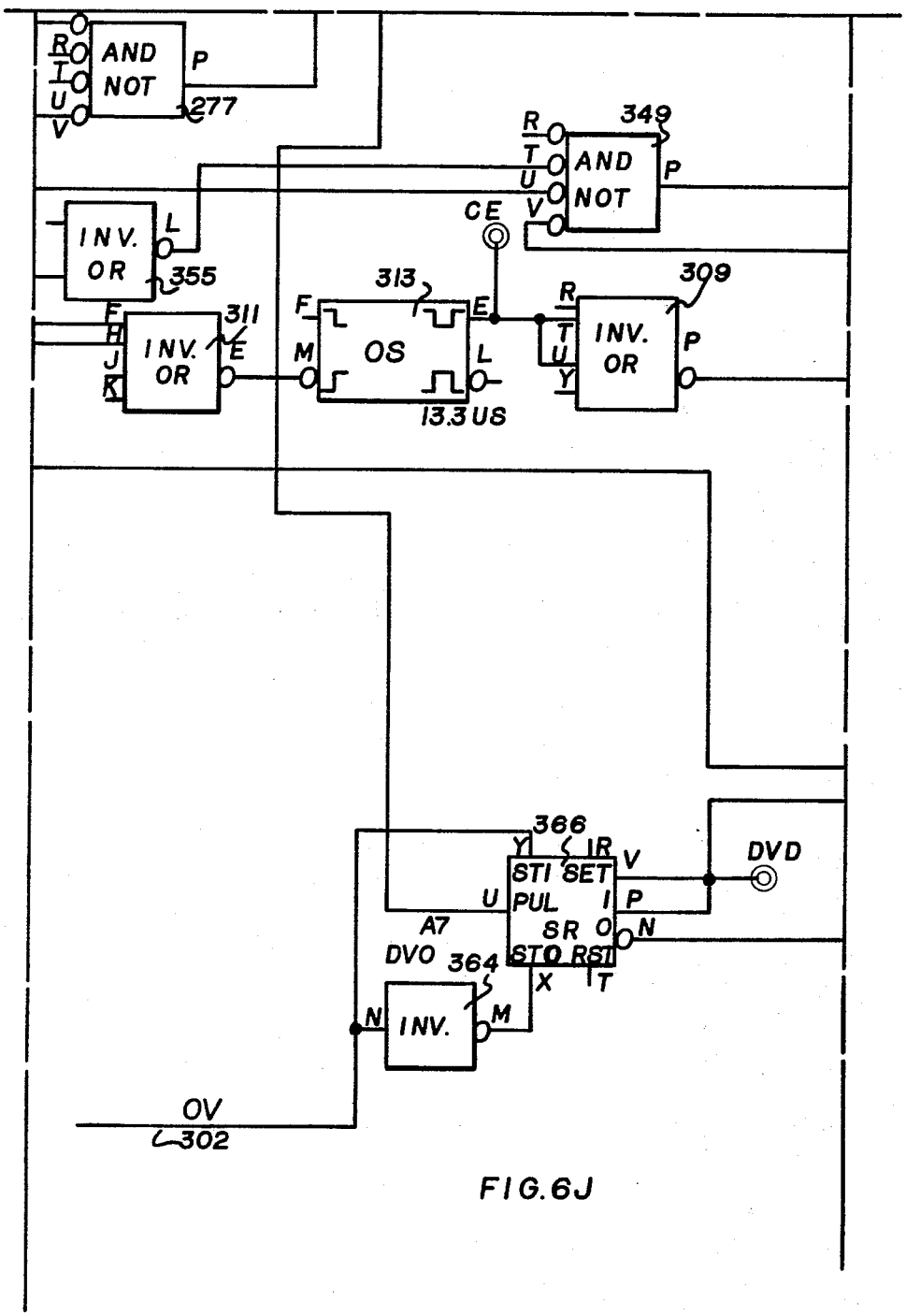

FIGURE 6 shows how to put FIGURES 6A through 6G together.

FIGURES 6A through 6G, when put together as shown in FIGURE 6, show a schematic of the central control element including an arithmetic element, an error storage register, and the overshoot compensation element.

Figure 7B:
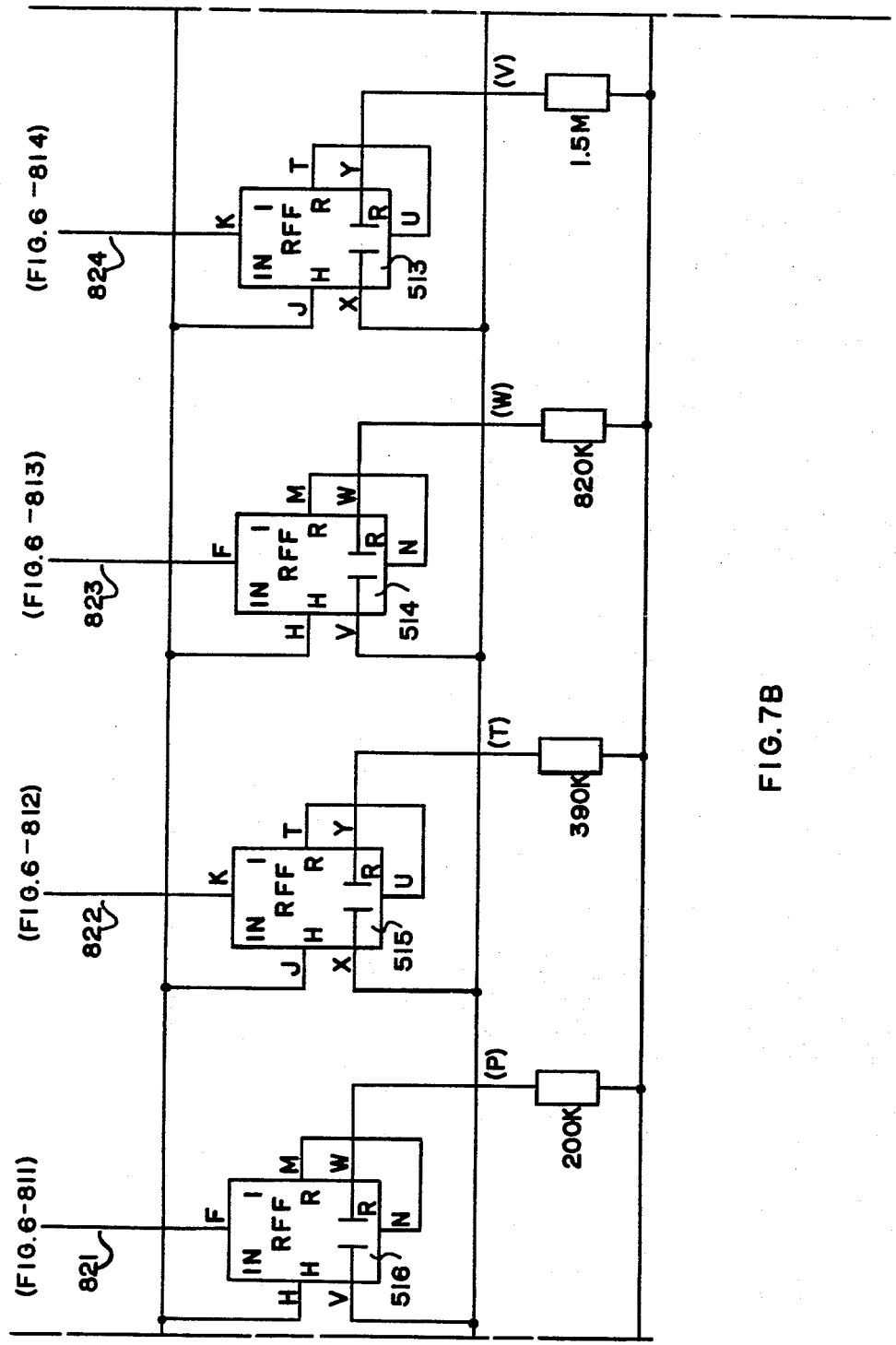
Figure 8B:
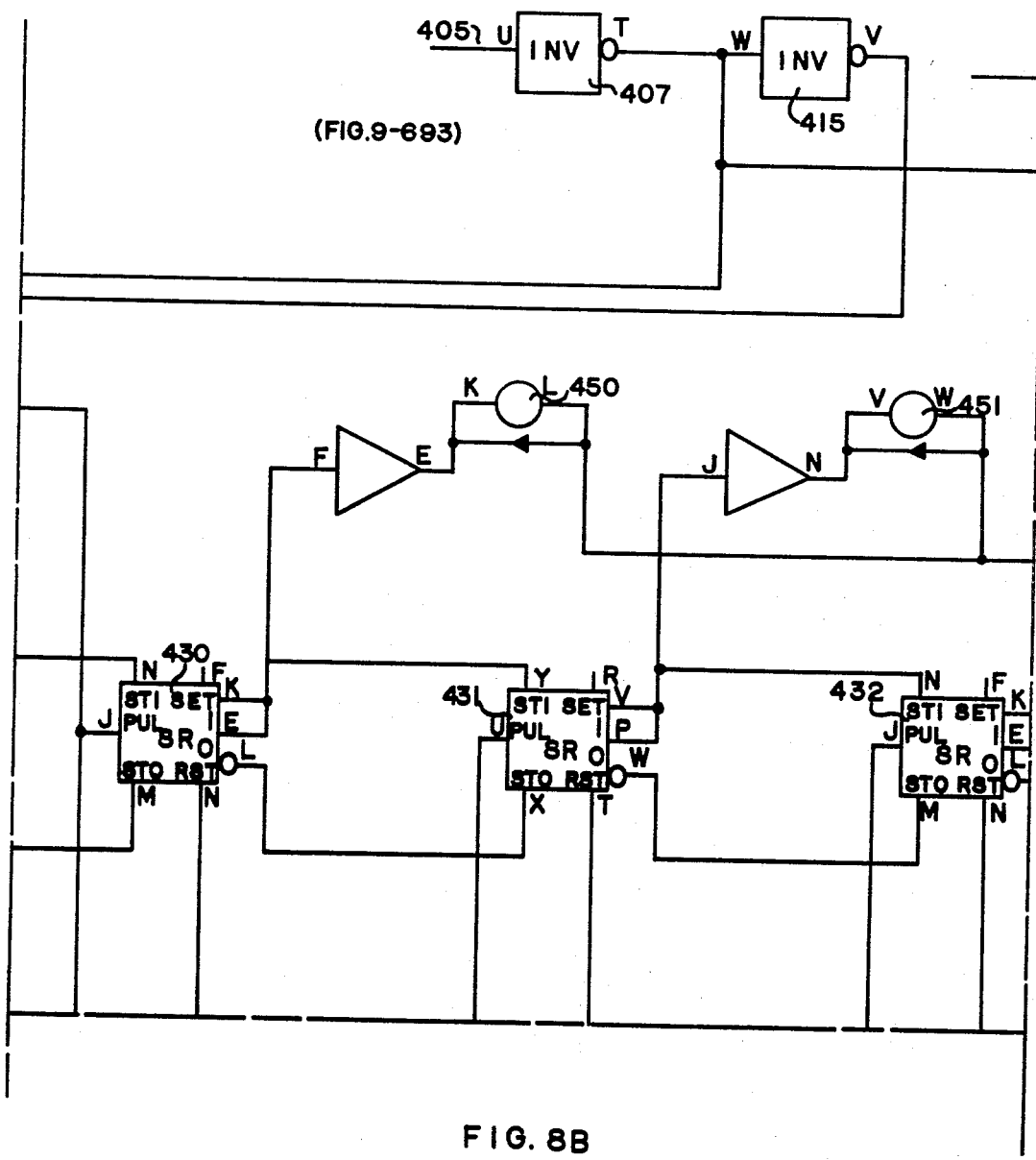
Figure 8C:
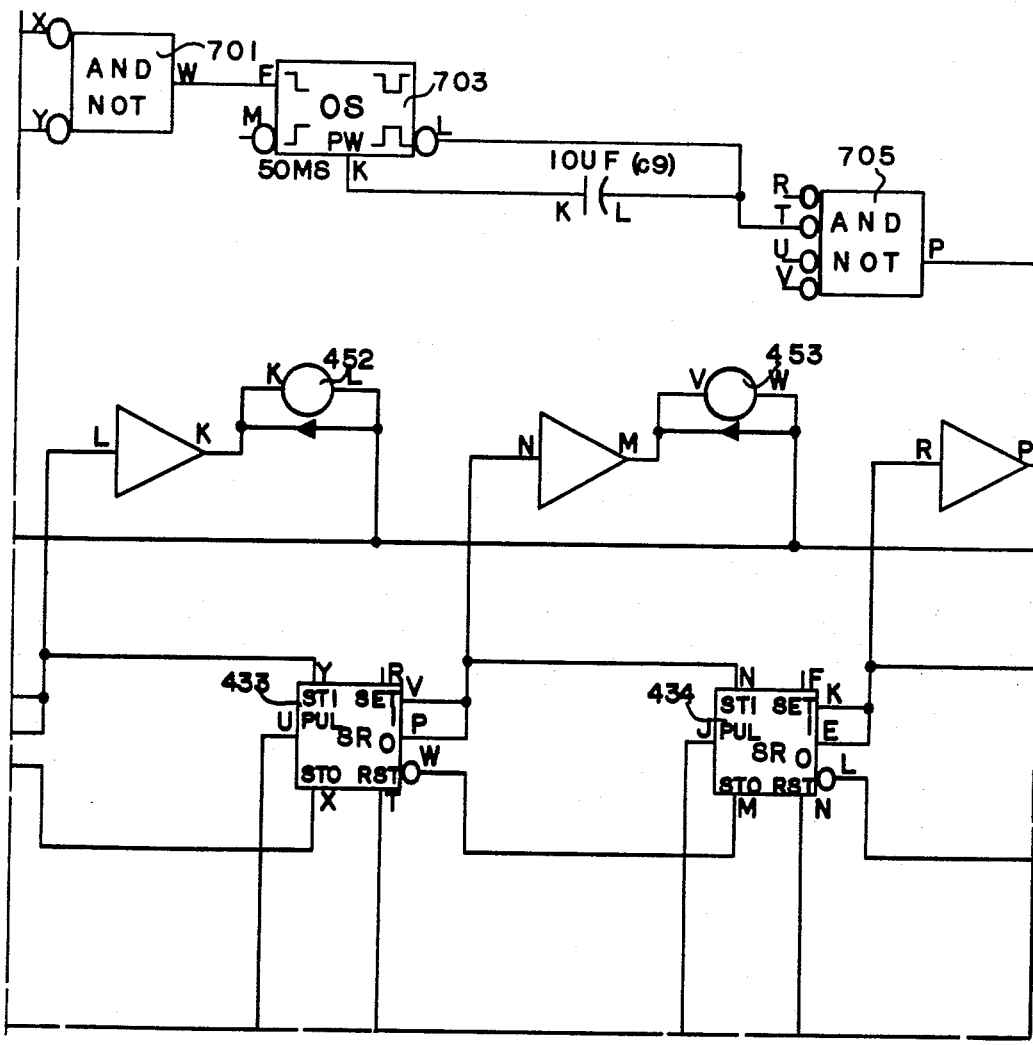
Figure 8D:
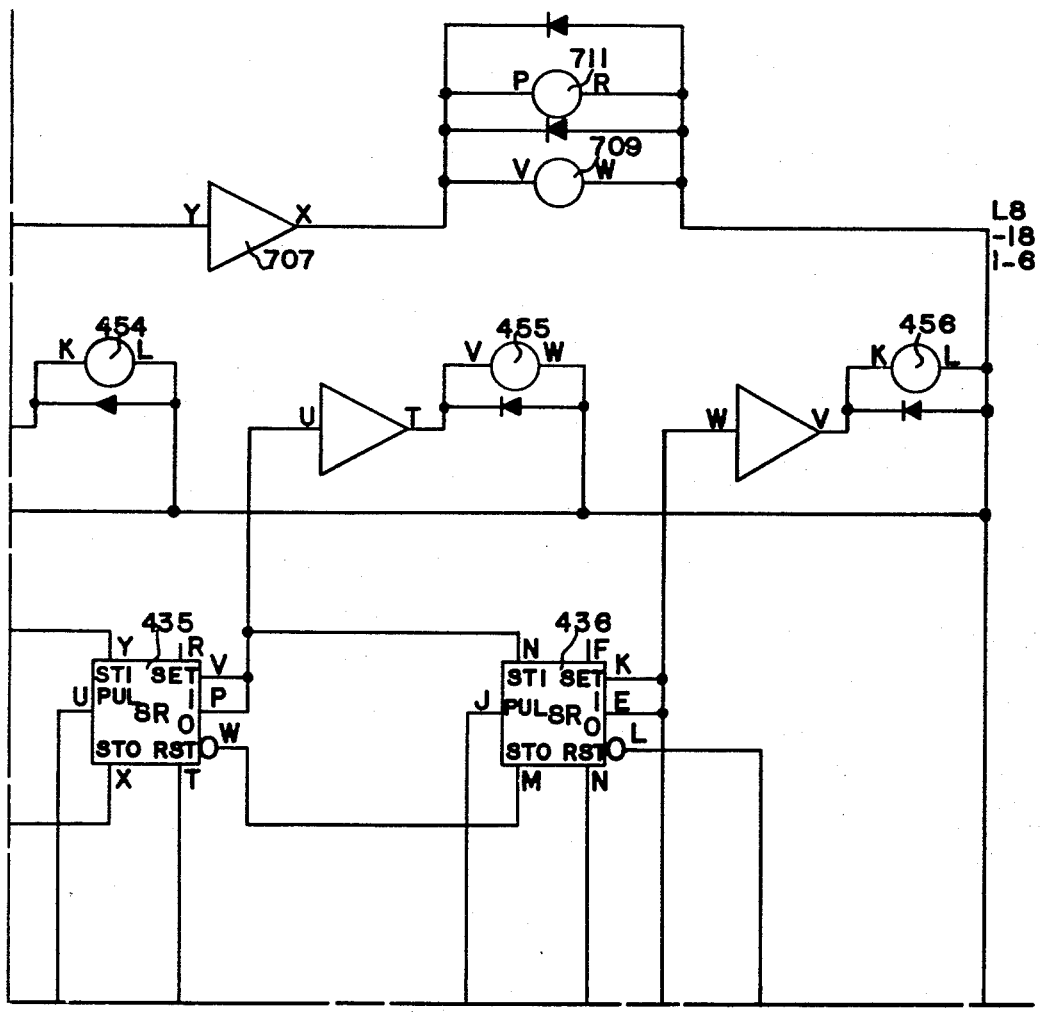
Figure 8E:
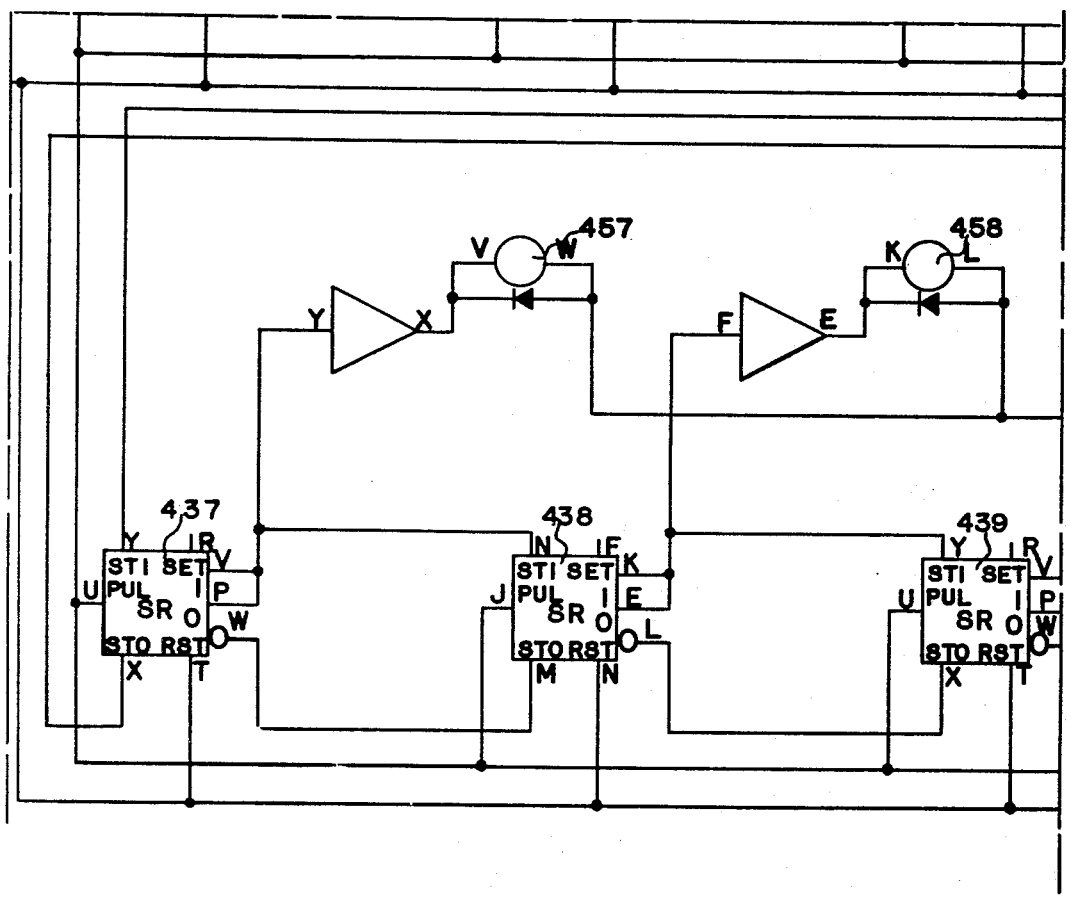
Figure 8F:
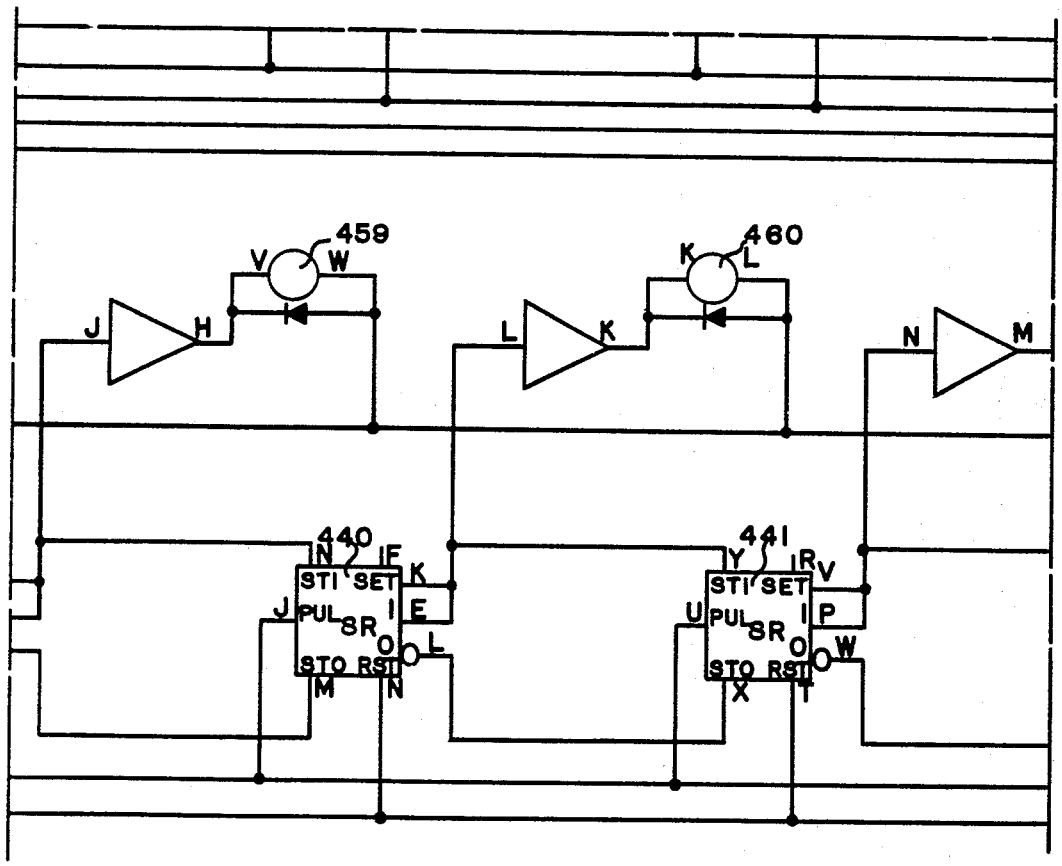
Figure 8G:
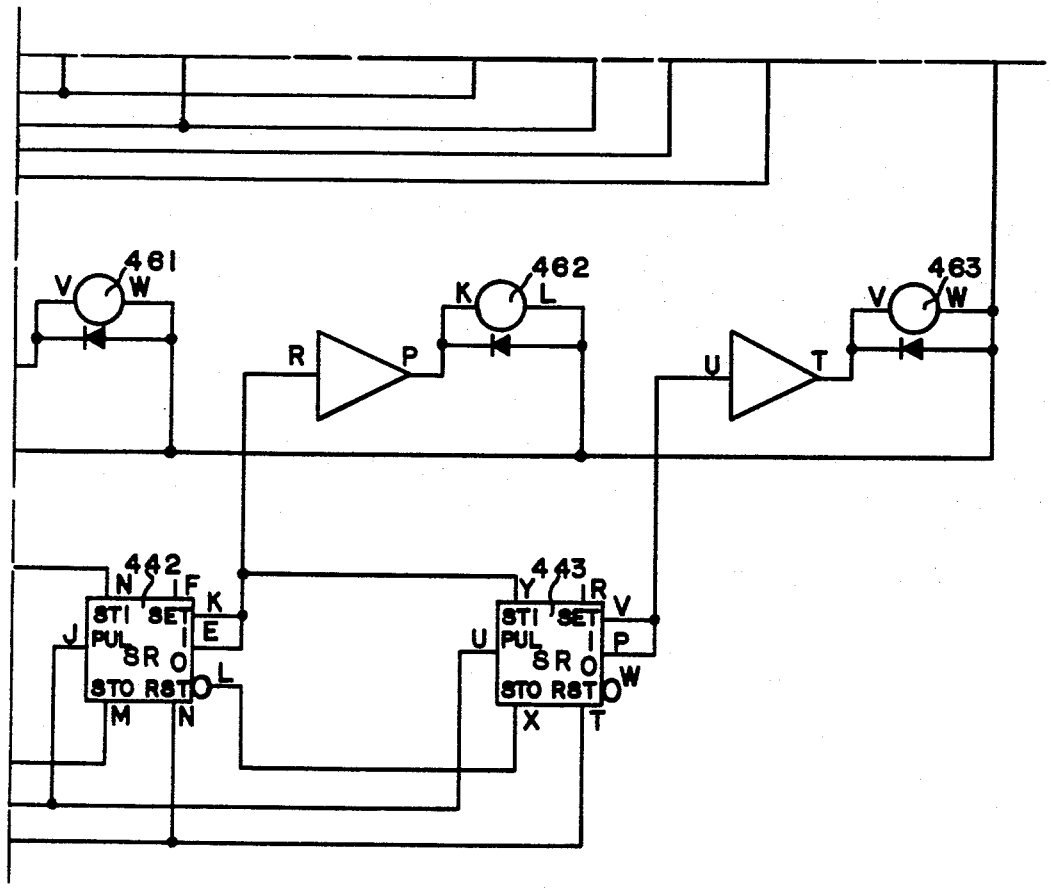

FIGURE 7 shows how to put FIGURES 7A through 7C together.

FIGURES 7A through 7C, when put together as shown in FIGURE 7, show a schematic of a position error storage register and roll position control for a millstand.

FIGURE 8 shows how to put FIGURES 8A through 8G together.

FIGURES 8A through 8G, when put together as shown in FIGURE 8, show the schematic portion of the automatic zeroing control.

Figures 9, 9C:
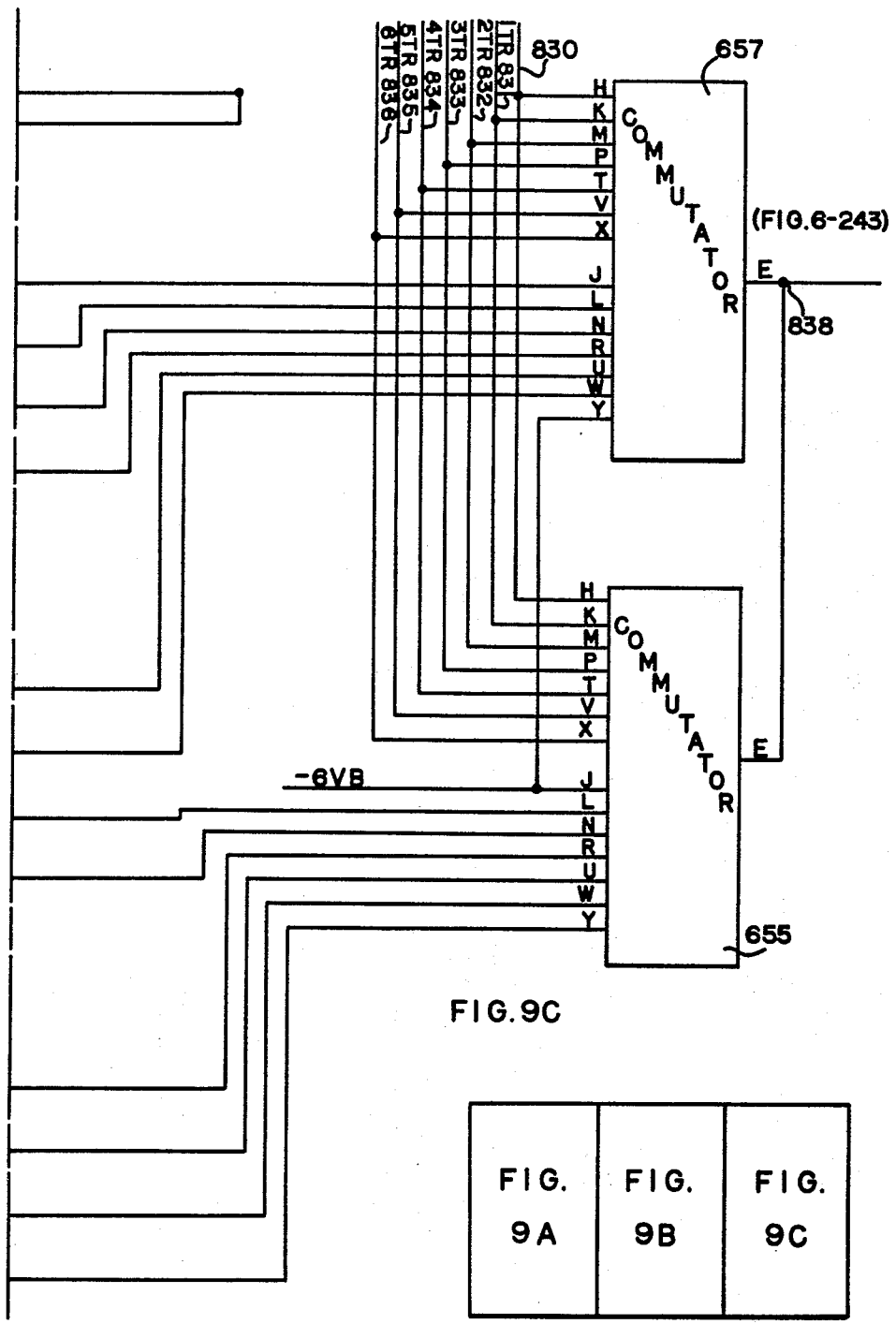
Figure 9A:
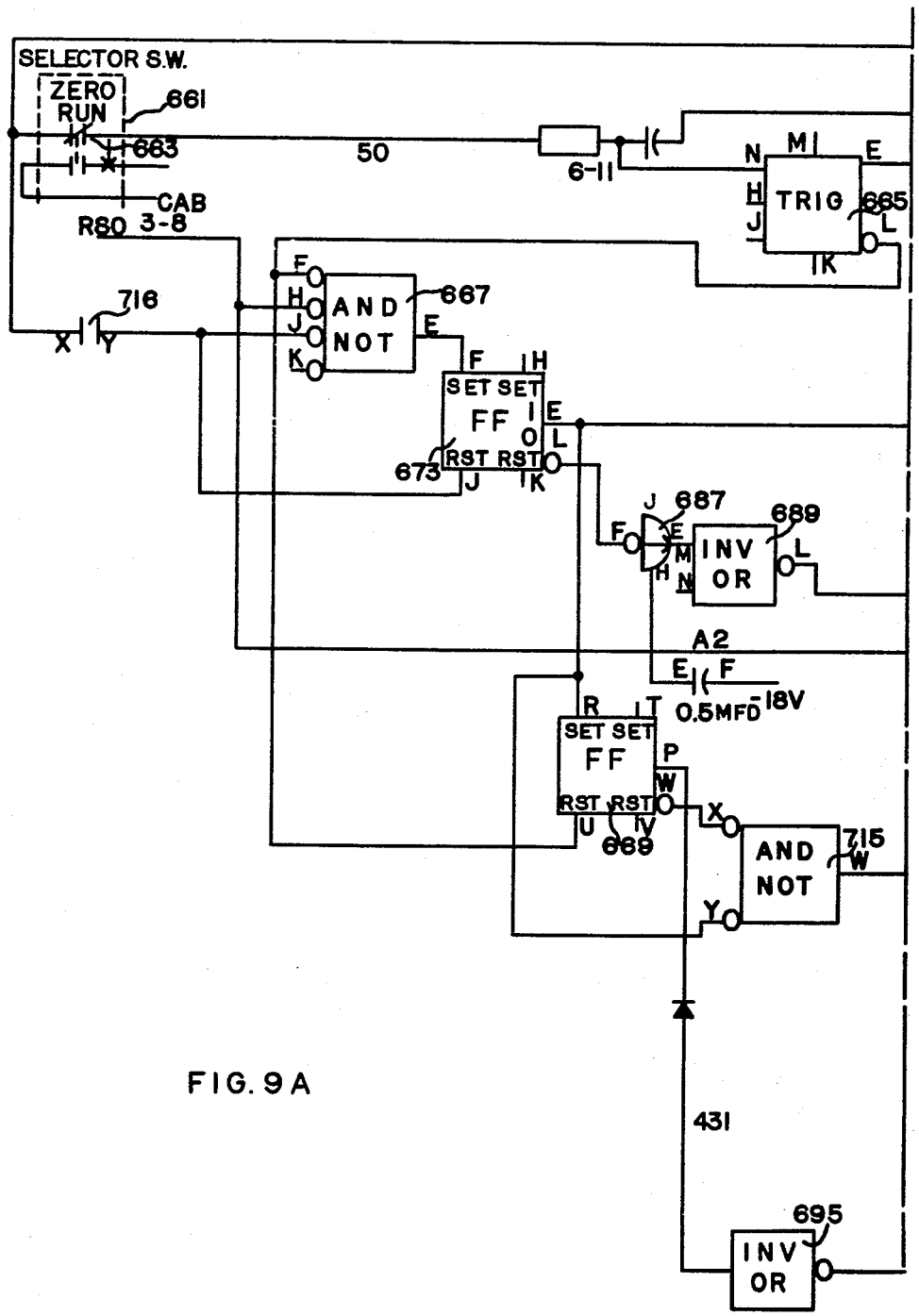
Figure 9B:
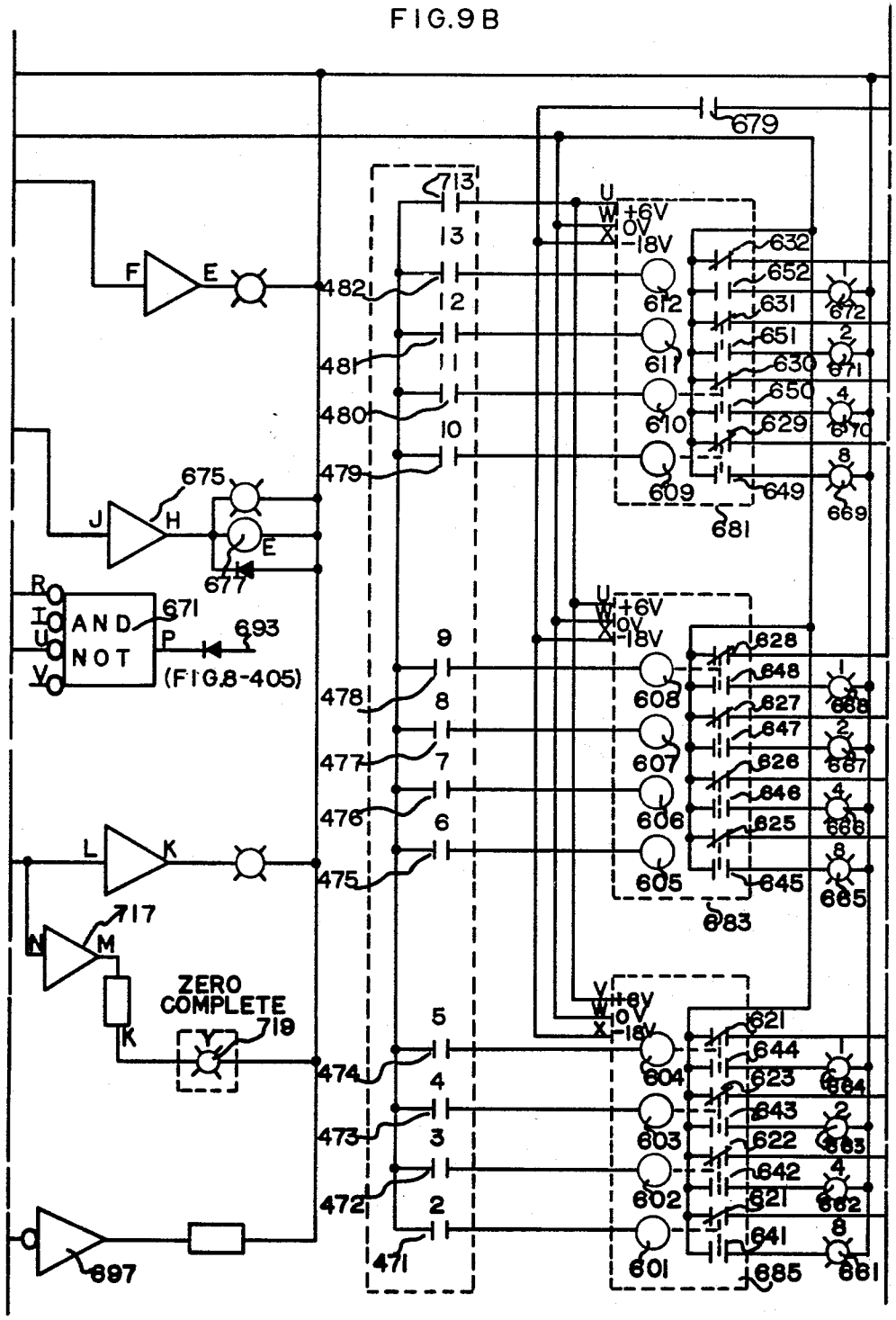

FIGURE 9 shows how to put FIGURES 9A through 9C together.

FIGURES 9A through 9C, when put together as shown in FIGURE 9, show the schematic of the automatic zeroing storage register and control associated with each millstand.

FIGURE 10 shows graphically the relationship between encoder, zeroing position, range, and bias.

INDEX

| | Col. |
|---|---|
| General Description | 3 |
| Operation | 4 |
| Symbols and Nomenclature | 5 |
| Detailed Description | 8 |
| Signal Control Generator | 8 |
| Millstand Sequence Selector | 12 |
| Serial Arithmetic | 13 |
| Almost Null | 25 |
| Overshoot | 26 |
| Error Buffer | 27 |
| Error Storage and Control Circuit | 28 |
| Position Feedback | 29 |
| Reference Input | 29 |
| Automatic Zeroing | 29 |

GENERAL DESCRIPTION

Figure 1:
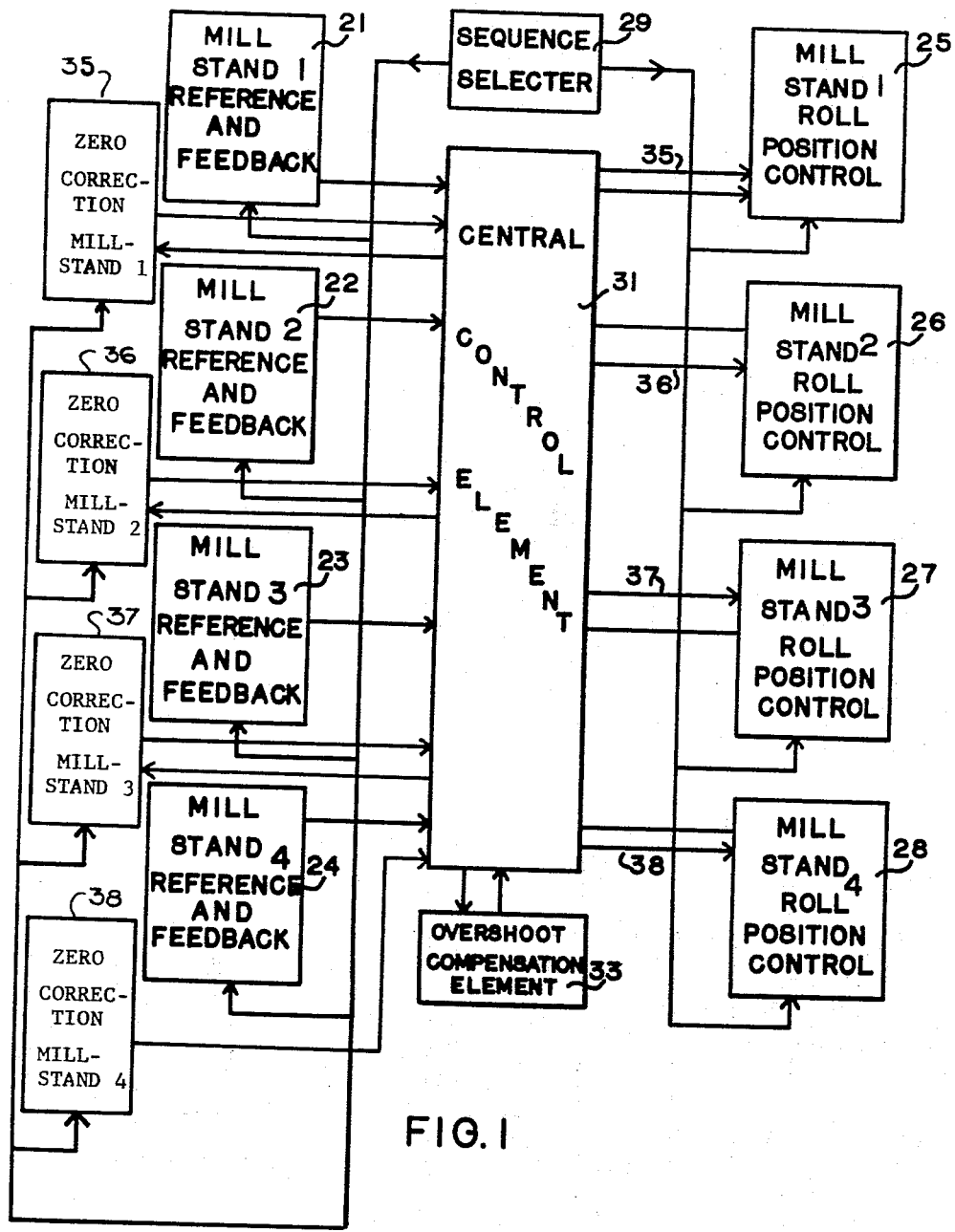
FIGURE 1 is a block diagram of an automatic zeroing system for a rolling mill position regulator.

Referring now to FIGURE 1 a millstand reference and feedback circuit 21–24 are associated with each of four millstands, each indicating a desired reference separating distance between the coacting rolls and the actual feedback separating distance between the coacting rolls of that particular millstand.

The encoders used to indicate the feedback separating distance of the coacting rolls are magnetic encoders such as type MADC–18/13/BV manufactured by Norden, a division of United Aircraft Corporation. The shaft of the encoder is coupled to the shaft of the roll positioning motors. The position code in the encoder exists as a magnetic pattern is a disc with a magnetized area representing a logical zero in the binary code and a non-magnetized area representing a logical one. The encoder can indicate a position from zero to 8191 in binary form. As the position code is on the disc, there is a direct transition from a position of 8191 to zero, and from zero to the maximum of 8191.

A roll position control 25–28 is also associated with each of four millstands to control the movement of the coacting rolls of that particular millstand.

A sequence selector 29 operates in a predetermined time cycle divided into a certain number of word times. In the particular embodiment described the time cycle is divided into 64 word times. During each word time a specific millstand is selected to have the position error developed for that particular millstand. A millstand may be selected more than once during one cycle. The sequence selector 29 selects a corresponding millstand reference and feedback element 21–24 and millstand roll position control element 25–28.

The central control element 31 takes the reference and the feedback from the selected millstand and develops the position error for that particular millstand.

The overshoot compensation element 33 automatically adds an overshoot compensation factor to compensate for the overshoot that might otherwise occur in moving the coacting rolls together.

Each millstand roll position control 25–28 controls the driving of the coacting rolls toward a desired separating distance in response to the position error as developed by the central control element 31.

Only four millstands are represented in FIGURE 1, while as many millstands as are desirable may be controlled. In the detailed description as described hereinafter 64 millstands, or subcombinations thereof, may be controlled. The actual mill rolls and drive motors for physically moving the rolls are not shown in the figures but are well known in the art.

The zero correction elements 35–38 initiate and store the zero correction factor after it has been calculated. The measured actual separating distance between coacting rolls is entered into the reference and feedback indicators 21–24 after it has been measured, and the reference and feedback indicators 21–24 also indicate the indicated separating distance between the coacting rolls of each millstand.

Operation

The rolling operation and the positioning of the coacting rolls is stopped while the zero correction factor is determined. The separating distance between each pair of coacting rolls is first measured accurately. This may be carried out by measuring the separating distance by calibers, by measuring the separating distance by photocells, or by positioning the rolls together so that there is zero separating distance between the coacting rolls. The measured separating distance between each pair of coacting rolls is entered into the corresponding reference and feedback element 21–24, as the zero position.

The sequence selector 29 selects the millstands in sequence and the central control element 31 calculates the zero correction factor by subtracting the measured actual separating distance from the indicated feedback separating distance between the coacting rolls.

The zero correction elements 35–38 separately initiate the storage of the zero correction factors in the zero correction elements 35–38 after they have been calculated.

After the zero correction factors have been determined for each millstand and stored in the proper zero correction elements 35–38, the rolling mill may be started up again and positioning of the coacting rolls of each millstand continued.

The encoder feedback from each millstand reference and feedback elements 21–24, when selected, is compared in the central control element 31 with the zero correction factor from the corresponding zero correction register 35–38. When the feedback from the encoder is less than the zero correction factor, the encoder is operating in the upper range of encoder; and the working range of the encoder is not adequate for the working range of the rolling mill. During the calculations an extra binary bit is added to the left of the most signficant bit of the encoder feedback to provide a larger encoder position number for the subsequent calculation operations. A bias may be added to the encoder feedback before comparison with the zero corrections factor to provide for a possible overshoot when a reference of zero or thereabouts is selected. If there was no bias, the position drive may overshoot so that the encoder would read less than the zero correction factor.

The encoder feedback from each millstand reference and feedback element 21–24, when selected, is also compared in the central control element 31 with the zero correction factor from the corresponding zero correction register 35–38 plus a number representing the normal working range of the rolling mill. When the encoder feedback is more than the zero correction factor plus a number representing the normal working range of the rolling mill this is an indication that the encoder has gone past zero and that the large feedback from the encoder is incorrect. The calculation of the position error is carried out in the usual manner, and then a binary number equal to the two times highest order bit of the encoder is added to the calculated position error to obtain the true position error. When the highest order bit in the encoder is 4096, a binary number of 8191 is added to the position error calculated to obtain the true position error.

During determination of the position error for a particular millstand, the zero correction factor is entered into the central control element 31 and subtracted from the indicated feedback to give a corrected feedback which accurately indicates the actual separating distance between each pair of coacting rolls.

A reference may be determined for each millstand a multiplicity of ways, as, for example, an operator, feedback from the gage of the output metal, or a computer and stored in the corresponding millstand reference and feedback elements 21–24. The actual separating distance for the coacting rolls for each millstand is also stored in the corresponding millstand reference and feedback elements 21–24.

The sequence selector 29 selects a particular millstand in a predetermined sequence such as millstand number 1, connecting the millstand 1 reference and feedback element 21, and the millstand number 1 roll position control element 29 to the central control element 31.

The central control element 31 compares the desired reference separating distance between the coacting rolls of millstand number 1 with the actual feedback separating distance between the coacting rolls of millstand number 1 and develops a position error indicating the direction and magnitude of the distance between the reference and the feedback. The overshoot compensation element 33 automatically enters an overshoot compensation factor into the central control element to compensate for the overshoot that may result when the coacting rolls are moved together. When the position error exceeds a predetermined magnitude, the rolls are driven together at a maximum rate.

An almost null number is continually compared with the position error; and when the position error equals or is less than the almost null number, an indication thereof is delivered on lines 35–38. This indication is stored in the corresponding millstand roll position control 25–28.

The position error for millstand number 1, after development, is stored in millstand number 1 roll position control element 25. The sequence selector 29 then selects the next predetermined millstand to develop the position error for that millstand.

The position error stored in millstand number 1 roll position control element 25 causes the coacting rolls to be moved towards the reference separating distance between the coacting rolls. During the next cycle or later in the same cycle, depending on the sequence determined by the sequence selector 29, millstand number 1 is again selected; and the reference is again compared with the feedback to determine the position error. The reference may be the same or it may have changed as desired.

The development of the position error to control the separating distance between the coacting rolls continues during subsequent cycles.

In this manner, an accurate separating distance between the rolls is maintained in uniform accurate manner for the different millstands. The system is economical in that only one control element is necessary to determine the position error. With a central control element, other functions may be added as necessary as they are developed, such as the overshoot compensation factor as described.

Symbols and nomenclature

In the following detailed description the term "one signal" when used refers to a −6 volt signal and the term "zero signal" refers to 0 volt signal or ground potential.

The symbols shown in FIGS. 2A through 2P and described hereinafter are used in the detailed description of the timed shared roll position regulator.

In all of the elements shown, input terminals are usually shown on the left side of the symbols and output terminals are shown on the right side of the symbols.

*Amplifier.*—FIG. 2A shows the symbol for the amplifier. A one signal on the input terminal will cause current to flow in a load connected between the output terminal and the negative power bus.

*AND/NOT circuit.*—FIG. 2B shows the symbol for the AND/NOT circuit. Its operation is such that a zero signal on all input terminals causes a one signal to be produced on the output terminal. This unit may have two or more input terminals. Positive pulses received on all terminals are effectively the same as zero signals received and cause a one signal to be produced on the output terminal. If a one signal is applied to one or more input terminals, a zero signal is produced on the output terminal.

*Inverter.*—FIG. 2C shows the basic symbol for the inverter. One signal is produced on the output terminal if a zero signal is received on the input terminal and a zero signal is produced on the output terminal if a one signal is received on the input terminal. The small circle is added to the output terminal to indicate the inverted output signal.

*Inverting "OR" circuit.*—FIG. 2D shows the symbol for the inverting OR circuit. Its operation is such that one or more one signals applied to the input terminals will cause a zero signal to be produced on its output terminal. The small circle is added to the output terminal to indicate the inverted output signal.

*One shot pulse generator.*—FIG. 2E shows the symbol for one shot pulse generator. A negative going pulse or a negative going step change in a DC input to the upper input terminal, or a positive going pulse or a positive going step change in a DC input to the lower input terminal, will cause a pulse to be produced at the upper output terminal with a negative going leading edge and a pulse to be produced at the lower output terminal with a positive going leading edge. Both output pulses are available at the same time with a signal on either or both input terminal. The length of time of the output pulses may be adjusted by the capacitance of a capacitor connected to the one shot pulse generator.

*"OR" circuit.*—FIG. 2F shows a symbol for an OR circuit. Its operation is such that a one signal on either input terminal will produce a one signal on the output terminal. This symbol may have two or more input terminals.

*Time delay.*—FIG. 2G shows the symbol for a time delay element. Its operation is such that a predetermined period of time after a one signal is removed from the input terminal, a one signal will appear on the output terminal.

*Coil.*—FIG. 2H shows the symbol used for a coil of a relay. The relay coil is energized by applying a one signal to the coil.

*Resistor.*—FIG. 2I shows the symbol used to represent a resistor.

*Relay contacts.*—FIG. 2J shows the symbol used to represent normally open relay contacts and FIG. 2K shows the symbol used to represent normally closed contacts. The contacts are opened and closed by energizing or de-energizing the corresponding relay coil.

*Counter.*—FIG. 2L shows the symbol for a counter bit. A one signal applied to the SET terminal sets the counter bit to one so that a one signal appears at the "1" output terminal and a zero signal at the "0" terminal. This one signal at the "1" output terminal will be maintained after the set signal is removed and remains until a one signal is applied to the RST (reset) terminal, at which time the one signal at the "1" output terminal becomes a zero signal; and a one signal appears at the "0" output terminal. The counter bit will remain in this, the zero state, or reset state, until a one signal is again applied to the SET terminal. In addition, a positive pulse received on the PUL input terminal will complement the counter bit, changing the state of the counter bit from the previous state. The shift of the counter bit will occur on the positive going side of the input pulse. The "1" and "0" output terminals are always the inverse of each other unless a one signal is simultaneously applied to the SET and RST (reset) terminal, in which case a zero output signal will be present on both output terminals.

*Shift register.*—FIG. 2M shows a symbol for a shift register bit. This circuit is similar to the counter bit shown in FIG. 2L and described above, except for the provision of the ST1 (steer 1) and the ST0 (steer 0) terminals. If a one signal is applied to the SET terminal, the shift register bit is set to one, and a one signal will appear at the "1" output terminal. This one signal will remain after the set signal is removed with the shift register bit remaining set to one until it is reset. A one signal applied to the RST (reset) terminal will reset the shift register bit to zero, and a one signal will appear at the "0" output terminal. The shift register bit will remain reset until it is set to one again. If one signals are received simultaneously on both the RST and the SET terminals, a zero output signal will be present on both output terminals. In addition, if a one signal is applied to the ST1 (steer 1) terminal, a zero signal to the ST0 terminal and a positive pulse applied to the PUL terminal, the shift register bit will be set to one with a one signal appearing on the "1" output terminal. If a one signal is applied to the ST0 (steer 0) terminal, a zero signal to the ST1 terminal and a pulse applied to the PUL terminal, the shift register will be reset to zero with a one signal appearing on the "0" output terminal. The shift of signals from terminal to terminal occurs on the positive going side of the positive pulse applied to the PUL input terminal. The "1" and "0" output terminals are always the inverse of each other, unless a one signal is simultaneously applied to the ST1 and the ST0 terminals, in which case the output remains as it was before.

*Exclusive OR circuit.*—FIG. 2N shows the symbol for the exclusive OR circuit. An exclusive OR circuit produces a one signal from its output terminal when its input signals are different and a zero signal from its output terminal when its input signals are alike.

TRUTH TABLE

OR—X

| X | Y | W |
|---|---|---|
| 0 | 0 | 0 |
| 1 | 0 | 1 |
| 0 | 1 | 1 |
| 1 | 1 | 0 |

BINARY ADDER

FIGURE 2O shows the symbol for the binary adder bit. The binary adder bit will add in binary two inputs plus a carry and produce a combination of one output signals on the "1," "0," and "C" (carry) and "CO" (no carry) output terminals indicating the results of the binary addition of the three inputs. The truth table, indicating the output signals for given input signals is shown below.

Symbols used:
    0 indicates zero volts or ground—a zero signal
    1 indicates —6 volts—a one signal

| Input Terminals | | | Output Terminals | | | |
|---|---|---|---|---|---|---|
| A | B | C | 1 | 0 | C | CO |
| 0 | 0 | 0 | 0 | 1 | 0 | 1 |
| 1 | 0 | 0 | 1 | 0 | 0 | 1 |
| 0 | 1 | 0 | 1 | 0 | 0 | 1 |
| 0 | 0 | 1 | 1 | 0 | 0 | 1 |
| 1 | 1 | 0 | 0 | 1 | 1 | 0 |
| 0 | 1 | 1 | 0 | 1 | 1 | 0 |
| 1 | 0 | 1 | 0 | 1 | 1 | 0 |
| 1 | 1 | 1 | 1 | 0 | 1 | 0 |

Thus, it can be seen the binary adder bit performs the function of adding binary numbers, indicating the result and a carry.

*Flip-Flop relay.*—The symbol for a relay flip-flop is shown in FIGURE 2P. The contacts are normally open. If a one signal is applied to the HOLD input terminal, then when a one or zero signal is applied to the IN input terminal this last signal has no effect; and the relay flip-flop remains in the condition it was before the one or zero signal was applied. When the HOLD input terminal has a zero signal applied thereto and a one signal is applied to the IN input terminal, the contacts are closed, and a one signal appears on the output terminal. If a one signal is then applied to the HOLD terminal, the contacts will remain closed until the one signal is removed from the HOLD terminal. When the one signal is removed from the HOLD terminal and a zero signal is applied to the IN terminal, the contacts open; and a zero signal appears at the OUT output terminal.

The circuits used in this description are all standard circuits well known in the art.

In the detailed description input and output terminals in one figure may connect to input and output terminals on another figure, or a relay coil may close or open a contact on another figure. In such instance, the figure number separated by a dash and a number are enclosed in parentheses below or beside the terminal, coil, or contacts indicating the figure number and the number of the terminal to which that terminal is connected, coil or contact is associated. Thus, a designation (FIG. 7–126) below or beside a coil indicates the corresponding contact 126 is in FIG. 7. In a similar way, a designation (FIG. 8—136) beside a terminal indicates that the terminal connects to terminal 137 in FIG. 8. A number when underlined indicates that a contact is normally closed.

The following terms are used throughout the detailed description.

Pulse—A signal existing for less than 50 microseconds. The signal may be either a positive level of zero volts or a negative level of minus six volts, depending on which condition activates the control device being discussed.

Clock pulse—One of a series of signals occurring continuously at a regular 50 microsecond interval.

Digit time—A 50 microsecond time interval beginning with the start of one clock pulse and ending at the start of the next clock pulse.

Pedestal—A signal existing as a DC level for a period of 50 microseconds or more.

Word time—A time interval consisting of 14 digit times commencing with the start of the digit time in which a regulator calculation is started and ending with the beginning of the next repetition of that digit time. This may also be expressed as the time from the beginning of one pedestal on output "OT" to the beginning of the next pedestal on output "OT."

The 50 microsecond clock pulse may, of course, be changed by means known in the art if desirable.

DETAILED DESCRIPTION

*Signal control generator*

The time shared regulator operates in a time cycle divided into 64 word times. During each word time, the position of a different position regulator may be calculated. Each word time is divided into 15 digit times from 0 time to 14 time. Each digit time is 50 microseconds long.

The signal control generator shown in FIG. 3 produces fourteen clock pulses to make up a fourteen digit long word time.

The signal control generator also produces a number of other control pulses and pedestals used to control the operation of the time shared regulator. The clock pulses, control pulses, and pedestals are shown in FIG. 4.

Pulses are generated by pulse generator 101 every 50 microseconds and widened by one shot pulse generator 103 to a 13.3 microsecond clock pulse as shown in the timing diagram in FIG. 4, waveform number 1. The one clock pulses from output terminal E of one shot 103 are inverted to zero pulses by inverting amplifier 105 and applied to the PUL (pulse) input terminals of shift register bits 110 through 117. The zero pulses from terminal L of one shot 103 are inverted to one pulses by inverting amplifier 104 and delivered as AU pulses from terminal 106 (waveform 1).

*Set up of the signal control generator.*—Before any clock pulses are applied to the signal control generator, shift register bits 110 to 115 and 117 are reset to zero and shift register bit 116 is set to one. Shift register bit 116, set to one, produces a one signal from output terminal E, which is inverted to a zero signal by inverting amplifier 118 and applied as a zero signal to terminal M of AND/NOT circuit 119. Terminal N of AND/NOT circuit 119 receives a zero signal at this time also as zero signals are applied to all of the inputs of OR circuit 121 and 123. Terminal F of OR circuit 121 receives a zero signal at this time due to the fact that the one signal from the L output terminal of shift register bit 110, set to zero, is inverted by inverting OR 125 to a zero signal. Shift register bit 111, set to zero, applies a zero signal from output terminal P to terminal H of OR circuit 121. Shift register bit 112, set to zero, applies a zero signal from output terminal E to terminal J of OR circuit 121. Shift register bit 113, set to zero, applies a zero signal from output terminal P to terminal K of OR circuit 121. Shift register bit 114 is also set to zero, applying a zero signal from output terminal E to terminal R of OR circuit 123. Shift register bit 115 is set to zero, applying a zero signal from output terminal P to terminal T of OR circuit 123, and shift register bit 117, set to zero, applying a zero signal to terminal U of OR circuit 123. Thus, OR circuits 121 and 123 apply a zero signal to terminal N of AND/NOT circuit 119. AND/NOT circuit 119 therefore produces a one signal which is inverted to a zero signal by inverting OR circuit 125 so that a zero signal is applied to the ST1 (steer 1) terminal of shift register 116.

The one signal produced by shift register 116, set to one, from terminal E and inverted by inverting amplifier 118 to a zero signal, is also applied to terminal R of inverting OR circuit 127. Terminal T of inverting OR circuit 127 also has a zero signal applied to it at this time from terminal P of shift register bit 117 as shift register bit 117 is set to zero. The one signal from terminal E of shift register 116 set to one is applied to terminal X of AND/NOT circuit 120. The one signal from terminal W of shift register 115 set to zero is applied to terminal Y of AND/NOT circuit 120. The AND/NOT circuit 120 therefore produces a zero signal which is applied to input terminal U of inverting OR circuit 127. Inverting OR circuit 127 therefore produces a one signal at this time which is passed by OR circuit 129 and applied back to ST0 (steer 0) terminal of shift register bit 110.

*First clock pulse.*—The first clock pulse (shown in timing diagram, FIG. 4) at zero time of the word time from pulse generator 101 is widened to a 13.3 microsecond duration by one shot pulse generator 103, converted to a zero pulse by inverting amplifier 105 and applied to the PUL inputs of shift register bits 110 through 116. Shift register bits 110 through 117 have one signals applied to their ST0 terminals so that shift register bits 110 through 115 and 117 remain reset to zero and shift register bit 116 is reset from one to zero on the positive going side of the clock pulse at zero time.

*OT pedestal.*—With shift register bit 116 reset to zero, the zero signal from terminal E of shift register bit 116 is inverted to a one signal by inverting amplifier 118 so that a one signal is produced from output terminal 131 as an OT pedestal at zero time as shown in the timing diagram in FIGURE 4, waveform 2.

*LT pedestal.*—With shift register bit 116 set to zero, the one signal from inverting amplifier 118 is applied to terminal M of AND/NOT circuit 119, causing AND/NOT circuit 119 to deliver a zero signal on output terminal 133 at this time. This zero signal is the LT pedestal as shown in the timing diagram, FIG. 4, waveform 3, from zero time to 14 time.

*PH and PHO pedestal.*—When shift register bit 116 was set to zero, the one signal from terminal L was inverted to a zero signal by inverting amplifier 135 and delivered on PH output terminal 137 as shown in the timing diagram, waveform 5. The zero signal from terminal E is inverted to a one signal by inverting amplifier 155 and delivered in the PHO output terminal 157, waveform 4.

*AV pulse.*—The one signal from terminal L of shift register bit 116 is also applied to one shot pulse generator 139, causing one shot pulse generator 139 to produce a zero pulse for 27 microseconds, which is inverted to a one pulse by inverting amplifier 141 and delivered as an AV pulse on output terminal 143 as shown in the timing diagram, waveform 6.

*OTX pulse.*—The zero pulse from output terminal W of one shot pulse generator 139 applied at zero time to terminal M of OR circuit 145 is 27 microseconds long. A one pulse at zero time from terminal E of one shot pulse generator 103 is applied to terminal N of OR circuit 145 for a duration of 13.3 microseconds. The combination of these two pulses results in a zero pulse of 13.7 microsecond duration from terminal L of OR circuit 145, which is converted to a one pulse by inverting amplifier 147 and delivered as an OTX pulse to output terminal 149 as shown in the timing diagram, waveform 7.

*AVO pulse.*—The one signal from the AV inverting amplifier 141 is inverted to a zero signal by inverting amplifier 151 to produce an AVO pulse, waveform 8, FIGURE 4.

*OTXO pulse.*—The signal from the OTX inverting amplifier 147 is inverted by inverting amplifier 153 and delivered as an OTXO pulse as shown in the timing diagram, waveform 9.

*AKO pedestal.*—The AKO pedestal is derived from the zero signal from terminal E of shift register bit 116 being applied to terminal X of AND/NOT circuit 120. The AND/NOT circuit produces a one signal from terminal W which is applied to terminal U of inverting OR 127.

The zero signal from terminal E of shift register bit 116 is inverted by inverting amplifier 118 and the resulting one signal applied to terminal R of inverting OR 127.

The zero signal from terminal P of shift register 117 is applied to terminal T of inverting OR 127.

With two one signals and one zero signal at its input terminals, OR circuit 127 will deliver a zero signal to the AKO output terminal 159 as shown in the timing diagram, waveform 10.

The zero signal from terminal P of the inverting OR circuit 127 is passed by the OR circuit 129 and applied to the ST0 terminal of shift register bit 110.

The ST1 terminal of the shift register bit 110 receives a one signal from its own output terminal L steering the shift register bit 110 to 1.

*One time.*—The second clock pulse at one time applied to the PUL input terminal of shift register bit 110 causes shift register bit 110 to be set to one. Shift register bits 111 to 117 have a one signal applied to their ST0 input terminals from the zero output terminals of the previous shift register bits so that they remain reset to zero. The setting to one of shift register 110 now applies a one signal to ST1 and a zero signal to ST0 of shift register 111, steering shift register 111 to one.

*OT pulse.*—With shift register 110 set to one a zero pulse is applied to terminal X of inverting OR 125 which inverts this zero pulse to a one pulse and applies this to terminal F of OR circuit 121 where it is passed to inverting amplifier 128. Inverting amplifier 128 inverts the signal to a zero and applies this to output terminal 131 as an OT signal, as shown in timing diagram, FIGURE 4, waveform 2.

*TRO pulse.*—Shift register bit 110, set to one, produces a one signal which is inverted to a zero signal by inverting amplifier 160 and is delivered on output terminal 170 as a 1TRO pulse, waveform 11.

The zero signal which produced the OT pulse on output terminal 131 is also applied to terminal R of inverting OR 127. This causes a one signal to be applied to terminal X of the OR circuit 129, which passes this signal onto the ST0 terminal of shift register bit 110, steering shift register bit 110 to zero.

*Two time—TRO pulses.*—The third clock pulse at two time applied to the PUL input of shift register bit 110 causes shift register bit 110 to be set back to zero. This causes a zero pulse to be applied to inverting amplifier 160 which inverts the signal to a one and applies this one signal to output terminal 170 as 1TRO pedestal, as shown in timing diagram, FIGURE 4, waveform 11.

The third clock pulse at two time applied to PUL input terminal of shift register bit 111 causes shift register bit 110 to be set to one. This causes a one pulse to be applied to inverting amplifier 161 which inverts the signal to a zero and applies this zero signal to output terminal 171 as a 2TRO pulse as shown by waveform 12 of the timing diagram, FIGURE 4.

After shift register bit 110 is set to zero and shift register bit 111 is set to one in the manner hereinbefore described, the setting of successive shift register bits to one will continue with each input clock pulse in a straight shift register manner so that the one will shift progressively from shift register bit 111 to shift register bit 112, to shift register bit 113, to shift register bit 114 and to shift register bit 115.

At the same time the zero setting of successive shift register bits will continue with each input clock pulse so that the zero will shift progressively from shift register bit 110 to shift register bit 111, to shift register bit 112, to shift register bit 113, to shift register bit 114. Thus, at 6 time after the seventh clock pulse, shift register 115 is set to one with all other shift registers set to zero. TRO pulses 1TRO–6TRO, waveform 11–16 on timing diagram 4, are produced in this manner.

*AKO pedestal.*—With shift register bit 115 set to one at 6 time, a zero signal is applied to the Y terminal of the AND/NOT circuit 120, which with a zero signal from shift register bit 116 applied to terminal X, applies a one signal to terminal U of inverting OR circuit 127. This signal is inverted by inverting OR circuit 127 and applied as a zero AKO pedestal to output terminal 159. With shift register bit 115 set to one on the six time clock pulse, a one pulse is applied to terminal V of inverting OR circuit 126 which converts this pulse to a zero pulse and applies this to the ST0 of shift register 116. With a one pulse applied to ST1 of shift register bit 116, the shift register is steered to one.

*Seven time—PHO-PH pedestal.*—With shift register bit 116 steered to one, the seven time positive going pulse from generator 103 sets shift register bit 116 to one and remains set to one during the second shifting sequence of shift register 110–115, since a one signal is continually applied to the ST1 terminal from inverting OR circuit 125. This is because a one signal from one of the shift register bits 110 to 115 is continually applied to OR circuit 121 or 123 to terminal N of AND/NOT circuit 119, causing AND/NOT circuit 119 to produce a zero signal which is inverted by inverting OR 125 to a one signal. Thus, during the first half of the cycle shown in the timing diagram, a one signal is produced from the PHO output terminal 157 and during the second half of the cycle as shown in the timing diagram (waveform 4) a zero signal is produced from the PHO output terminal 157. During the second half a one signal is produced from the PH output terminal 137 (waveform 5).

*1TRO pulse.*—The zero signal (AKO) applied to the output terminal 159 at six time (heretofore described) is also applied to terminal X of OR circuit 129, which passed the signal to the ST0 terminal of shift register bit 110. With a cone signal applied to the ST1 terminal of shift register bit 110 this shift register bit 110 is steered to one. Therefore, with the seven time pulse from pulse generator 103, shift register bit 110 is set to one. This one pulse is applied to inverting amplifier 160 which inverts this signal to a zero pulse and applies this to output terminal 170 as a 1TRO pulse as shown on timing diagram, FIGURE 4, waveform 11.

*13 time—7 TRO pulse.*—As in the first half of the cycle, the setting of each successive register continues in the second half of the cycle with the one shifting progressively from shift register bit 110 to shift register bit 111, to shift register bit 112, to 113, to shift register bit 114 and then to shift register bit 115.

With shift register bit 115 turned to one during the 12 time pulse, a zero signal is applied to AND/NOT circuit 122 at terminal K. Shift register bit 116 is still set to one at this time and applies a zero signal to terminal F of AND/NOT circuit 122. AND/NOT circuit 122 applies a one signal to the ST1 terminal of shift register bit 117 and also to inverting OR circuit 124 which applies a zero signal to the ST0 terminal of shift register bit 117, steering this shift register bit 117 to one. At 13 time, shift register bit 117 is set to one. This one signal is applied to inverting amplifier 116 which inverts this signal and applies the resulting zero signal to output terminal 176 as a 7TRO pulse as represented on timing diagram, FIGURE 4, waveform 17.

*14 time.*—With shift register bit 116 set to one a zero signal is applied to input terminal F of AND/NOT circuit 122. This causes a zero signal and a one signal to be applied to the ST1 and ST0 terminals of shift register bit 117 respectively.

The 14 time pulse from pulse generator 103 will set shift register bit 117 to zero. This zero signal is applied shift register bit 117 to zero. This zero signal is applied to inversion amplifier 166 which inverts the signal and applies the resulting one signal to output terminal 176 as shown in timing diagram, FIGURE 4, waveform 17.

With shift register 117 set to zero, a zero signal is applied to terminal U or OR circuit 123 with zero signals already applied to terminals R and T of OR circuit 123. A zero is passed to terminal N of AND/NOT circuit 119 which inverts and applies a one signal to output terminal 133 as an LT pulse, shown on timing diagram 4, waveform 3.

With shift register bit 117 set to zero, a zero signal is applied to inverting OR 126 at terminal R. A zero signal from shift register bit 115 is already applied to terminal V of inverting OR 126, resulting in inverting OR applying a one signal to ST0 terminal of shift register bit 116.

The one pulse applied to output terminal 133 as an LT pulse is also applied to inverting OR 125 which inverts this signal to a zero and applies this to terminal LT1 of shift register bit 116. The next positive going pulse at zero time applied to PUL terminal of shift register bit 116 will set shift register bit 116 back to zero, and the cycle will repeat itself from the beginning.

*Millstand sequence selector*

The millstand sequence selector consists of reversing counter bit 180, counter bits 181 through 184 and shift register bit 185, and functions as a straight binary counter. Reversing counter bit 180 acts as a gating circuit so that when a one signal is applied to input terminals M and N from input terminal 187, the counter 180 will be inhibited. At zero time when shift register bit 116 (FIG. 3) in the signal control generator is shifted to zero, a positive or zero signal is applied to terminals J and K of counter bit 180. Counter bit 180 is then complemented. The millstand sequence selector will count in a binary form from zero to 63, countng one each time shift register bit 116 is shifted to zero unless input terminal 187 is one. An inhibit signal is applied to terminal 187 when calculations are continuing in the arithemetic unit shown in FIGURE 6. By connecting the modified binary output terminals 190 to 201 selectively to the position regulators, the error value for the particular position regulator may be calculated sequentially. The order in which the error value is calculated is dependent upon the order in which the position regulators are connected to the binary output terminals 190 through 201.

The binary output terminals 190 through 201 are connected to the one and zero output terminals of the millstand sequence selector through AND/NOT circuits 202–204, 206–208, 212 and 214 to provide a modified binary output. This is done rather than have 64 output terminals which must be wired to the particular position regulator.

For example, a zero output signal from one of the modified binary output terminals 190 through 201, or a combination thereof, is effective to select a position regulator in a manner that will be described hereinafter.

For a particular decimal number, there should be a zero output signal from one or more of the output terminals 190–201. For example, take the decimal number 38 and determine which of the modified binary terminals 190 through 201 must be connected to a position regulator to select it during the 38 word time. Modified binary output terminals 192, 195, 198, and 201 must be connected to the position regulator to select a particular position regulator during the 38th word time in the manner to be described. For the decimal number 38, the binary number is 100110 (least significant bit on right) with the reversible counter bit 180 (binary 1) reset to zero, counter bit 181 (binary 2) set to one, counter bit 182 (binary 4) set to one, counter bit 183 (binary 8) set to zero, counter bit 184 (binary 16) set to zero and shift register 185 (binary 32) set to one. A zero signal is therefore applied to terminal R of AND/NOT circuit 203 from output terminal L of counter bit 181 since counter bit 181 is set to one and a zero signal is applied to terminal U of AND/NOT circuit 203 from terminal E of reversing counter bit 180 as reversing counter bit 180 is set to zero at this time. AND/NOT circuit 203 therefore produces a signal which is inverted to a zero signal by inverting amplifier 205 so that a zero signal is produced on output terminal 192 at this time. A zero signal is applied to terminal M of AND/NOT circuit 207 from the E output terminal of counter bit 183 since counter bit 183 is set to zero at this time, and a zero signal is also applied to terminal N of AND/NOT circuit 207 from terminal W of counter bit 182 since counter bit 182 is set to one at this time so that AND/NOT circuit 207 produces a one signal which is inverted to a zero signal by inverting amplifier 209, supplying a zero signal from terminal 195 at this time. As counter bit 184 is set to zero at this time, a one signal is produced from its output terminal W which is inverted by inverting amplifier 211 to a zero signal and delivered as a zero signal on output terminal 198 at this time. Shift register bit 185 is set to one at this time so it produces a one signal on its B output terminal which is inverted by inverting amplifier 213 to a zero signal and delivered as a zero signal on output terminal 201. Therefore, with the selected regulator connected to terminals 192, 195, 198 and 201, when the millstand sequence selector has counted to 38, this particular position regulator is selected. Only one selection has been made for illustrative purposes. The selection may be made for other position regulators connected to other combinations of the output terminals 190 through 201 in the manner described for the 38th word to accomplish similar selections of other word numbers from 0 through 63. For each binary number, the logic of the AND/NOT circuits selects one or more output terminals 190–201.

*Serial arithmetic*

Referring now to FIG. 6, in the arithmetic section, the feedback will be subtracted from the reference to determine the position error and the error will be stored in a buffer register. As a preliminary statement of operation before going into the detailed operation, the arithmetic operation is unique in that, first, the reference is added to an offset in a binary adder; and also if necessary, a carry may be added to provide a two's complement of the reference plus the offset for the operation to be described. The feedback is added to a zeroing number and to a carry of one, if necessary. After these steps have been carried out, the two's complement of the feedback is added to the reference so that the feedback is subtracted from the reference in the final sum adder. The addition is carried out bit by bit with result transferred in the error buffer register.

Referring now to FIG. 6, the reference number is received on input terminal 221. A reference number is received as a binary number in serial form with a one signal representing a binary one and a zero signal representing a binary zero. A one signal representing a binary one is applied directly to the ST1 (steer 1) input terminal of shift register bit 223 and also inverted by inverter 225 and applied as a zero signal to the ST0 (steer 0) terminal of shift register bit 223, steering shift register bit 223 to one. The next pulse applied to the PUL input terminal of shift register bit 223 causes shift register bit 223 to be set to one. A zero signal representing a binary zero received on input terminal 221 is applied to the ST1 input terminal of shift register bit 223 as a zero signal and also inverted by inverter 225 and applied to ST0 input terminal of shift register bit 223 as a one signal so that the next pulse applied to the PUL input terminal of shift register bit 223 causes shift register bit 223 to be reset to zero. Shift register bit 223 when set to one produces a one output signal on output terminal E; and when reset to zero produces a zero output signal on output terminal E of shift register bit 223.

Input terminal 227 receives a binary signal in the form of a one signal (binary one) or zero signal (binary zero) in the same manner as on input terminal 221 to indicate the offset which is used to modify the reference number received on input terminal 221. This is useful, for example, to compensate for the roll wear and heating of the rolls of the rolling mill. Shift register bit 229 is set to one and reset to zero in the same manner as that described for shift register bit 223.

The feedback number in serial form is applied to input terminal 231 with a one signal representing a binary one and a zero signal representing a binary zero. The negative signal representing a binary one is applied to terminal H of inverting OR circuit 233, causing inverting OR circuit 233 to apply a zero signal to terminal M of AND/NOT circuit 235.

The AU pulses from the signal control generator in FIG. 3 as shown in the timing diagram (FIG. 4, waveform 1) are received on input terminal 237 in FIG. 6. When an AU pulse goes positive, 13.3 microseconds after it starts, a zero signal is applied to terminal N of AND/NOT circuit 235. AND/NOT circuit 235 thereupon produces a one signal which is applied back to terminal F of inverting OR circuit 233, keeping inverting OR circuit 233 producing a zero signal from terminal E. The one signal is also applied to ST1 terminal of shift register bit 239. The zero signal from terminal E of inverting OR circuit 233 is also applied to the ST0 terminal of shift register bit 239. The next negative pulse received on the AU input terminal 237 is inverted by inverting OR circuit 241 to a positive pulse and applied to the PUL input terminal of all the shift register bits including shift register bit 239 to set shift register bit 239 to one. The zero signal representing a binary zero received on the feedback input terminal 231 is applied to terminal H of inverting OR circuit 233, causing inverting OR circuit 233 to produce a one signal which is applied to terminal M of AND/NOT circuit 235. AND/NOT circuit 235 thereupon produces a zero signal which is applied to terminal ST1 of shift register bit 239 and also applied back to terminal F of inverting OR circuit 233, causing inverting OR circuit 233 to continue producing a one signal. The one signal from the inverting OR circuit 233 is also applied to the ST0 terminal of shift register bit 239, causing shift register bit 239 to be steered to a zero on the next input pulse on the PUL terminal.

A binary number is also received on input terminal 243 which is used to modify the feedback number received on input terminal 231. This is useful, for example, as a zeroing signal to be subtracted from the feedback number. The zeroing signal is subtracted from the feedback signal to indicate the actual position of the rolls when in a zero position. The binary numbers received on the input terminal 243 set and reset shift register bit 245 in the same manner as that described for shift register bits 223 and 229.

The reason for the buffer shift registers 223, 229, 239, and 245 is because the feedback signal applied to input terminal 231 is not required to be a pedestal signal but may be a pulse signal; and after the feedback signal is received, some means must be provided for storing the signal for one pedestal time. The feedback signal, the reference signal, the offset signal, and the zeroing signal are stored in the proper shift register bits.

The offset signal may either be added or subtracted from the reference signal bit by bit in the binary adder 255 as the two signals are received on the input terminals. The addition or subtraction is determined by the input on terminal 272.

A one signal applied to input terminal 272 as a subtraction signal is applied to terminal N of exclusive OR circuit 270. With a one signal from shift register bit 229 applied to input terminal M exclusive OR circuit 270 applies a zero signal to terminal H of binary adder 255. In other words the one's complement of the offset is applied as one input to adder 255. The one signal applied to input terminal 272 is also applied to inverter 278 to apply a resultant zero signal to terminal F of AND/NOT circuit 276. At the end of the AV pulse, pulse generator 249 produces a one pulse which is inverted to a zero signal by inverter 250 and applied to terminal K of AND/NOT circuit 276 which thereupon applies a one signal to the set terminal of shift register bit 251.

Shift register bit 251 set to one applies a one signal to the C terminal of binary adder 255 as a carry signal, thus creating the two's complement of the offset signal from shift register 229. By adding the two's complement of the offset signal to the reference signal from shift register bit 223, the offset signal is subtracted from the reference signal.

If a zero signal is applied as an addition signal to input terminal 272, exclusive OR circuit 270 will produce a one signal if a zero signal is applied to terminal M from shift register 229. The zero signal from input demand 272 will also be applied to AND/NOT circuit 274 which at the end of the AV pulse produces a one signal which is applied to the RST terminal of shift register bit 251, resetting shift register bit 251 to zero. Shift register 251 then applies a zero signal to the C terminal of binary adder 255, which then simply adds the reference and offset signals together.

The addition and subtraction circuit of the feedback and zeroing system operates in a similar manner to that of the reference and offset system. A zero signal as a subtraction signal is applied to input terminal 282, inverted to a one signal by inverter 280, and applied to terminal Y of exclusive OR circuit 290. Assume that the first bit of the zeroing signal from shift register bit 245 is a one signal which is applied to terminal X of exclusive OR circuit 290. Exclusive OR circuit 290 then produces a zero signal which is applied to terminal B of the feedback adder 257 as the one's complement of the first bit of the zeroing signal. The zero signal applied to input terminal 282 is also applied to AND/NOT circuit 284 so that at the end of the AV pulse a one signal which applied to the SET terminal of shift register bit 253 to set shift register bit 253 to one. The one signal thus produced from shift register bit 253 is applied to the C terminal of binary adder 257 as a carry signal to produce the two's complement of one bit of the zeroing signal.

Adding the two's complement in binary arithmetic is effectively the same as subtracting so that the zeroing signal is subtracted from the feedback signal. Addition is accomplished by applying a one signal to input terminal 282 in a similar manner as described for the offset and reference addition.

The binary adder 255 delivers a one output signal on terminal P when the result of addition or subtraction is a binary one, delivers a one output signal on terminal W when the output is a binary zero, and delivers a one output signal on terminal E when there is a carry. The carry output terminal E is connected to the ST1 terminal of the shift register bit 251. When there is no carry, a one output signal is delivered on output terminal L. The no carry terminal L is connected to the ST0 terminal of the shift register bit 251. Thereupon, the next pulse applied to the PUL input terminal of shift register bit 251 causes that shift register bit ot be set to either one or zero depending upon the steering terminal which has been conditioned by having a one signal applied thereto.

The feedback binary adder bit 257 operates in the same manner as the reference binary adder bit 255.

*Encoder down range logic.*—At zero time, the AV pulse is generated as shown in timing diagram, FIGURE 4, waveshape 6. This pulse is applied from terminal 247 to the RST terminal of shift register bit 239 to reset shift register bit 239 to zero. The AV pulse, which lasts 27 microseconds, is also applied to terminal X of one shot pulse generator 249, which fires on the positive going side at the end of the AV pulse. The output from one shot pulse generator 249 may be called the CG pulse and lasts for 50 microseconds so that it overlaps the one time AU pulse. The last time pulse (14 time) caused shift register bit 245 to be steered to zero, so that at zero time the output from shift register bit 245 is a zero signal, which is applied to binary adder 252 input terminal A. At zero time shift register bit 116 in FIGURE 3 is set to zero and applies a zero signal to inverting amplifier 155 where the zero is inverted to a one signal which is applied to terminal T of AND/NOT circuit 169. AND/NOT circuit 169 applies a zero signal to the input terminal Y of AND/NOT circuit 174 which now causes a one signal to be applied to the X terminal of inverting OR 172. This one signal is inverted and the resulting zero signal is applied to terminal B of binary adder 252 in FIGURE 6.

The CG pulse from terminal P of pulse generator 249 is applied to the RST terminal of shift register bit 254 which resets to zero applying a zero signal to terminal C of binary adder 252. With all zero signals on its input terminals, the binary adder 252 produces a zero signal from the sign terminals, and a one signal from the 0 terminal W. The zero signal from terminal P is applied to terminal T of AND/NOT circuit 260 and the one signal from terminal W is applied to terminal J of AND/NOT circuit 256. With shift register bit 239 set to zero, a zero signal is applied to terminal H of AND/NOT circuit 256 and a zero signal is applied to the input of inverting OR circuit 258 which applies the resulting one signal to terminal U of AND/NOT circuit 260. With a one signal on one of its input terminals, AND/NOT circuit 260 applies a zero signal to terminal M of inverting OR circuit 262.

The CG pulse applied a one signal to terminal K of AND/NOT circuit 264, which then produced a zero signal and applied this to terminal N of inverting OR 262. With two zero input signals, inverting OR will produce a one signal and apply this to terminal J of AND/NOT circuit 264. This one signal locks in the zero output signal from AND/NOT circuit 264 which is applied to the N terminal of inverting OR circuit 268.

*Encoder up range logic.*—The encoder up range logic is very similar to that of the encoder down range logic. In this case at zero time, the zero signal from the output of shift register bit 245 is applied to terminal H of AND/NOT circuit 224 and also to terminal M of inverting OR 298, where it is inverted to a one and applied to terminal T of AND/NOT circuit 226. The AU pulse is applied to terminal F of AND/NOT circuit 224 and terminal R of AND/NOT circuit 226. The zero signal from the output of shift register bit 239 is applied to terminal A of binary adder 294. At zero time, a zero signal is produced by shift register bit 116 in FIGURE 3 and applied to inverting amplifier 155 where it is inverted to a one signal and applied to terminal F of AND/NOT circuit 168. AND/NOT circuit 168 produces a zero signal which is applied to terminal B of binary adder 294 in FIGURE 6.

The CG pulse from terminal P of one shot 249 resets shift register 296 to zero so that the zero signal from the one output terminal E is applied to the carry terminal C of binary adder 294.

With three zero input signals, binary adder 294 produces a zero signal from the sign terminal P which is applied to terminal V of AND/NOT circuit 226 and a one signal from terminal W which is applied to terminal J of AND/NOT circuit 224. During the 13.3 microseconds of the AU pulse the one signal of the AU pulse prevents AND/NOT circuits 224 and 226 from producing a one signal. However, at the end of the AU pulse AND/NOT zero signals are applied to all of the inputs to AND/NOT 224 so that it applies a one signal to terminal U of AND/NOT circuit 230. AND/NOT circuit 230 applies a one signal to input terminal Y of inverting OR 228.

AND/NOT circuit 226 has a one signal at input terminal V and therefore applies a zero signal to input terminal X of inverting OR circuit 228, which with two zero signal inputs, produces a one signal and applies this to terminal V of AND/NOT circuit 230, thus holding AND/NOT circuit 230 at zero. This zero signal from AND/NOT 230 is now applied to inverting OR 268 which has already a zero applied to its input from the encoder down range logic and consequently will produce a one signal which is applied to input terminal K of AND/NOT circuit 292.

AND/NOT circuit 292 has applied to its input two other one signals, creating a mask, preventing AND/NOT circuit 292 from producing a one signal except during the second half of the cycle when shift register bit 116 in FIGURE 3 is set to one which is inverted by inverting amplifier 155 and specifically 27 microseconds after last time when one shot generator 170 applies a zero signal to the input terminal 210 of AND/NOT circuit 292 in FIGURE 6. These so-called masks allow for information applied to the flip-flop circuits consisting of circuits 230, 228, 268, 264 and 262 to settle down before being used.

If, at any time, during a cycle a one signal is produced by shift register bit 239, this one signal is applied to the H terminal of AND/NOT circuit 256 and after being inverted by inverting OR circuit 258 to a zero signal it is also applied to input terminal U of AND/NOT circuit 260. With two zero signals applied to its input terminals, AND/NOT circuit 260 will produce a one signal after each AU pulse. This one signal is applied to inverting OR circuit 162 which produces a zero signal which is applied to AND/NOT circuit 264. AND/NOT circuit 264 has already a zero applied to its terminal H from AND/NOT circuit 256, therefore, except during the AV pulse, AND/NOT circuit 264 will produce a one signal which is applied to inverting OR 262 where the signal is inverted to a one signal and applied to input terminal J of AND/NOT circuit 264 which will then continue to produce a one signal until the CG pulse from one shot 249 sets it back to zero.

The one signal from AND/NOT 264 is now applied to inverting OR circuit 268 which produces a zero signal which is applied to AND/NOT circuit 292. AND/NOT circuit 292 will produce a one signal at 14 after the masks applied to terminals F, H and J have been lifted. This one signal is applied to the set terminal of shift register bit 239, which causes shift register bit 239 to produce a one signal which is applied to terminal F of binary adder 257. At zero time the shift register bits are again set to zero and the circuit is ready for the next calculation.

A functional description will now be made of the up-range and down-range comparison circuits. The zeroing system features the possibility of zeroing the encoder without physical adjustments of the encoder.

The system is based on the following conditions:

(1) During zeroing the encoder is read and the "zero" position is stored in memory.

(2) During subsequent operations the encoder output is compared with the stored zero value.

If the encoder output value at the time of comparison is greater than or equal to the stored zero number, the encoder output is used to indicate true position.

If the encoder output value at the time of comparison is smaller than the value of the stored number, a number equal to the maximum output of the encoder must be added to the encoder output value.

The stored zeroing number is available as the output signals from shift register bit 245 and the encoder or feedback output is available as the output signals from shift register bit 239. At the beginning of each calculation the CG pulse, produced by pulse generator 249, resets AND/NOT circuit 264 to zero; then during each of the 15 bits times of the word time, the signals from shift register 239 are presented to terminal H of AND/NOT circuit 256. The signals from shift register bit 245 in the meantime are presented through binary adder 252 to terminal T of AND/NOT circuit 260.

If the feedback signal is zero and the zeroing signal is one AND/NOT circuit 256 produces a one signal while AND/NOT circuit 260 produces a zero signal so that AND/NOT circuit 264 sets inverting OR circuit 268 to one.

If the feedback signal is one and the zeroing signal is zero, inverting OR 262 produces a one which resets AND/NOT circuit 264 to zero.

During the 13th digit time, AND/NOT circuit 292 is enabled from the PHO pulse and one shot generator 170 in FIGURE 3.

If AND/NOT circuit 264 in FIGURE 6 is one, AND/NOT circuit 292 produces a one signal which is applied to the shift register bit 239 to add another binary one to the feedback. If AND/NOT circuit 264 produces a zero at the thirteenth digit time, the position detector reading is not modified. Thus, the most significant digits of the two serial binary numbers are compared; and if the encoder has traveled into the region where its output is less than the stored "zeroing" number, the effective range of the encoder is extended by the addition of the output of one full cycle of the encoder during the last digit time.

Binary adder 294 is used to allow position comparisons within a preselected range in the negative region. This is accomplished by adding the preselected number to the position encoder reading before comparing it with the stored zero number. The feedback signal from shift register bit 239 is applied to binary adder 294 where 512 increments are added to it by AND/NOT circuit 168 in FIGURE 3 at 12 digit time by a one signal. Note that shift register bit 117 is on during the 14 digit time in a word.

The feedback signal from shift register bit 239 is the encoder or feedback position delayed by one digit time. The most significant digit of the encoder or feedback position is compared with the stored zeroing number when shift register bit 117 in FIGURE 3 is one and then transferred as a set signal to shift register bit 239 at the beginning of the last time or 14 time.

The comparison logic just described is reset by the CG pulse from one shot generator 249 at zero time, that is, at the beginning of each word. The above describes the operation of the circuit which provides for encoder positions "upward" from the "zero" position or up-range extension. A separate circuit is provided to allow operation of the down range encoder position from the zero position.

Specific examples will help clarify the up range and down range logic. The up range logic will be explained first. In the example, the operating range is 5000 counts on the encoder. A maximum of 6144 counts has been allowed for operating range. Ignoring the range bias (to be explained later) if the encoder position is less than the "zero" position, an extra bit (weighted 8192 counts) which represents one complete cycle of the encoder is added to the encoder reading.

Figure 10A:
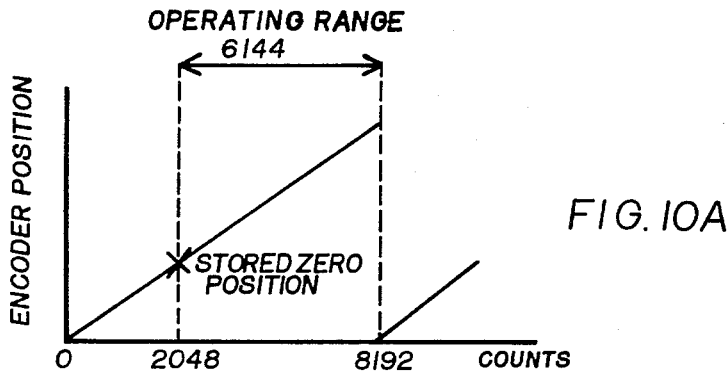

Referring to FIGURE 10A, all motion of the encoder is presumed to be upward from the "zero" position. Assuming now that the zero position is below 2048 counts, any motion upward within the limits of 6144 counts of the operating range will require no modification since the total number of counts of 8192 is equal and within the limits of the encoder counts.

Figure 10B:
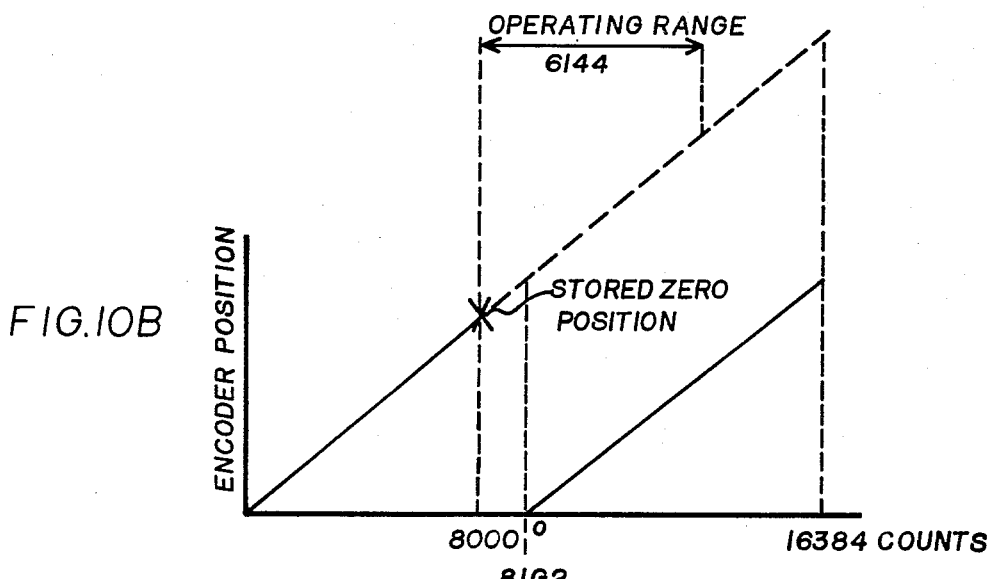

Referring to FIGURE 10B assume now that the stored zero position is 8000 counts. Any subsequent operation upwards of more than 192 counts will run the encoder beyond its maximum capacity of 8192 counts. This will then look as a sudden abrupt change, calling for a large position correction in the direction opposite of what is required. In other words, the encoder after reaching its maximum of 8192 counts will again start at zero and any

| Bit Weight | 8192 | 4096 | 2048 | 1024 | 512 | 256 | 128 | 64 | 32 | 16 | 8 | 4 | 2 | 1 | |
|---|---|---|---|---|---|---|---|---|---|---|---|---|---|---|---|
| Reference | 0 | 0 | 0 | 0 | 0 | 1 | 0 | 0 | 0 | 0 | 0 | 0 | 0 | 0 | 256 |
| Position | 0 | 0 | 0 | 0 | 0 | 0 | 0 | 0 | 0 | 0 | 1 | 0 | 1 | 0 | 10 |
| 2's Complement of Stored Zero | 1 | 1 | 1 | 1 | 1 | 1 | 1 | 1 | 1 | 1 | 0 | 1 | 1 | 0 | |
| Error | 0 | 0 | 0 | 0 | 0 | 1 | 0 | 0 | 0 | 0 | 0 | 0 | 0 | 0 | 256 | then the first error calculation would have to produce 256 counts. Since the stored zero number is subtracted from the actual encoder output at the beginning of each calculation by means of two's complement addition, the first error calculation will be as follows:

With the encoder moving down range, assume now that the encoder position is 5 counts and the stored zeroing position is 10 counts:

| Bit Weight | 8192 | 4096 | 2048 | 1024 | 512 | 256 | 128 | 64 | 32 | 16 | 8 | 4 | 2 | 1 | |
|---|---|---|---|---|---|---|---|---|---|---|---|---|---|---|---|
| Reference | 0 | 0 | 0 | 0 | 0 | 1 | 0 | 0 | 0 | 0 | 0 | 0 | 0 | 0 | 256 |
| Position | 0 | 0 | 0 | 0 | 0 | 0 | 0 | 0 | 0 | 0 | 1 | 0 | 1 | 0 | 10 |
| 2's Complement of Stored Zero | 1 | 1 | 1 | 1 | 1 | 1 | 1 | 1 | 1 | 1 | 0 | 1 | 1 | 0 | |
| Error | 0 | 0 | 0 | 0 | 0 | 0 | 1 | 1 | 1 | 1 | 1 | 0 | 1 | 1 | 251 |

The error is now 251. 256 less 5=251. Thus, the calculation is correct until the encoder goes down through its zero position and then abruptly again starts with 8192 counts. Supposing now that in the next calculation the encoder has gone two counts beyond zero in the downward direction to 8190 counts, the calculation would be as follows:

| Bit Weight | 8192 | 4096 | 2048 | 1024 | 512 | 256 | 128 | 64 | 32 | 16 | 8 | 4 | 2 | 1 |
|---|---|---|---|---|---|---|---|---|---|---|---|---|---|---|
| Reference | 0 | 0 | 0 | 0 | 0 | 1 | 0 | 0 | 0 | 0 | 0 | 0 | 0 | 0 |
| Position | 0 | 1 | 1 | 1 | 1 | 1 | 1 | 1 | 1 | 1 | 1 | 1 | 1 | 0 |
| 2's Complement of Stored Zero | 1 | 1 | 1 | 1 | 1 | 1 | 1 | 1 | 1 | 1 | 0 | 1 | 1 | 0 |
| Error | 1 | 0 | 0 | 0 | 0 | 0 | 1 | 1 | 1 | 1 | 0 | 1 | 0 | 0 |
| Additional Bit Weighted 8192 | 1 | 0 | 0 | 0 | 0 | 0 | 0 | 0 | 0 | 0 | 0 | 0 | 0 | 0 |
| Correct Error (1) | 0 | 0 | 0 | 0 | 0 | 0 | 1 | 1 | 1 | 1 | 0 | 1 | 0 | 0 | reading from there upward will look smaller than the stored zero position of 8000 counts used in this example. If not compensated, the circuit would try to move downward to correct for the error. However, at the point where the encoder reaches its maximum of 8192 counts, an extra bit weighing 8192 counts is inserted by the up encoder range logic, artificially extending the encoder range to 16384 counts. This allows the error calculation to be correct anywhere within the operating range of 6144 counts.

Figure 10C:
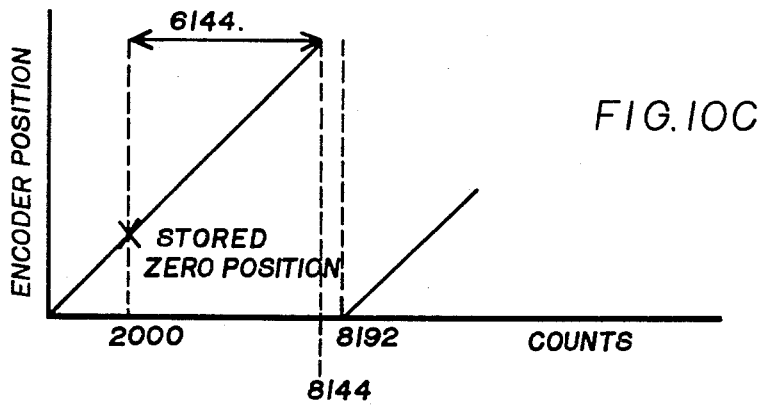

Referring now to FIGURE 10C, the range bias number will now be discussed. Assume that the stored zero number is 2000 counts, operation upward will not result in the addition of an extra bit. However, if with the encoder in a position upward from the stored zero number (2000), a reference equal to the stored zero is selected. The drive will then position to zero (encoder number 2000). If the drive overshoots to any extent such that the encoder will read less than 2000 counts, the encoder range logic would add an extra bit, which at this time should not be added since the encoder did not up range over its upper limit of 8192 counts. The bias is added to the encoder reading so that together the total number of counts will exceed the stored zero value after overshoot.

With an operating range of 6144 counts should the encoder go beyond its upper limit 8191 counts, the extra bit will always be added.

*Down range logic.*—The need for this logic stems from a situation where the stored zero number is equal to or near the actual zero of the encoder. For example, take 10 counts. Assuming that the reference is 256 counts, Except for the "one" in the most lefthand bit, the answer would be correct, 244 counts, which is 256 less twelve counts through zero to 8190.

It can be readily seen that if a binary one, weighted 8192 counts is added to the error, the result will be that the most lefthand bit will become a zero and the carry (encircled) will be shifted to the left beyond the word length.

In the actual arithmetic operation, the reference number is complemented twice, in exclusive OR's 273 and 291, which is the same as using the initial value as shown.

Provision is made for overshoot through zero. Assuming now that the reference number is near the actual zero of the encoder, for example, 10 counts and that at the time of the selection of the reference the encoder is positioned up range from the reference, then the encoder will proceed to move down, in an effort to reach 10. If the encoder then, upon reaching 10, overshoots, say 34 counts, this overshoot would produce an extremely large encoder output since the encoder would then have passed through its zero position and started again with 8192 counts. The overshoot would then have registered 8168 counts. This in effect would tell the drive to proceed a full range further in the zero direction whereupon reaching the reference of 10, it may overshoot again.

To allow for this a bias of 1024 counts is inserted at eleven digit time to both the reference and the feedback numbers. If the drive overshoots and passes through zero, at zero the feedback will be 1024 counts. The reference 10 plus the bias 1024 is 1035 counts, thus the feedback is less than the reference and the error signal will return the drive to 10.

The binary addition is completed in the feedback binary adder bit 257 in the normal manner with a one signal produced on output terminal P when the result of the binary addition is one and a one signal appearing on output terminal W when the result is a binary zero. The carry output terminal E produces a one signal when there is a carry to apply a one signal to the ST1 terminal of the carry shift register bit 253. When there is no carry, the one signal produced on output terminal L is applied to the ST0 terminal of the carry shift register bit 253. The next AU pulse received on input terminal 237 and inverted to a positive pulse by inverting OR circuit 241 is applied to the PUL terminals of shift register bit 253. The carry shift register bit 253 is set to a one or zero, depending on whether or not a carry or no carry has been indicated in the manner hereinbefore described.

Thus has been described the binary addition and subtraction of a bit of information from the reference input signal and the offset input signal. I have also described the addition and subtraction of the zeroing signal and the feedback signal in the binary adder 257.

A description will now be made of the addition in the final sum adder 261 of the two's complement of the reference signal and the feedback signal to effect a subtraction of the reference signal from the feedback signal. This addition is accomplished in serial form in the same manner hereinbefore described for the reference sum and the feedback sum with the addition accomplished bit by bit. It should be noted that at zero time, an AV signal received on input terminal 247 applied to one shot pulse generator 249 causes one shot pulse generator 249 50 microseconds later to produce a positive pulse on output terminal W which is inverted by inverter 263 to a negative pulse to reset shift register bits 265 and 267 to zero. Shift register bit 265 when reset to zero applies a zero signal to terminal N of exclusive OR circuit 271. Shift register bit 267 when reset to zero apples a one signal to terminal H of exclusive OR circuit 273.

Further preparation for the addition in the final sum binary adder bit 261 was accomplished by the receipt on input terminal 275 of the PHO signal (FIG. 4, waveform 4) which is a one signal from zero to 7 time. This one signal is applied to terminal R of AND/NOT circuit 277, causing AND/NOT circuit 277 to produce a zero signal which is passed by OR circuit 279 and applied to the ST1 terminal of shift register bit 267 and passed by OR circuit 281 and applied to the ST1 terminal of shift register bit 265. The zero signal produced by AND/NOT circuit 277 is also inverted by inverter 283 and applied as a one signal to the ST0 terminals of shift register bits 267 and 265.

Continuing on with setting up the circuit for the addition of the feedback and reference sums in the final sum adder at zero time, an AVO positive going signal is received on input terminal 285 (timing chart, FIG. 4, waveform 8) and applied to inputs J and K of reversing counter bit 287. For the immediate purposes of this description, assume that a one signal has been applied to terminals M and N of the reversing counter bit 287 so that the positive going signal received on terminals J and K is inhibited and reversing counter bit 287 does not count. Therefore, reversing counter bit 287 remains reset to zero with a zero signal supplied from terminal E to terminal Y of exclusive OR circuit 289 and terminal T of exclusive OR circuit 291.

The AV pulse (FIG. 4, waveform 6) received on input terminal 247 causes one shot pulse generator 249 to produce a zero pulse which is inverted by inverter 263 to a one pulse to set shift register bit 293 to one. Shift register bit 293 is set to one so that the two's complement of the reference signal can be added to the feedback signal by adding the inverse of the reference signal, a carry of one, and the feedback signal.

The feedback signal is read from output terminal T of the feedback adder 257, passed through exclusive OR circuit 271 and exclusive OR circuit 289 and applied to terminal H of the final sum binary adder bit 261. The feedback signal is applied to the binary adder bit 261 as a one signal or a zero signal as read from the feedback adder bit 257. The reference signal must be inverted before it is applied to terminal F of the final sum binary adder 261. A one signal is applied to terminal H of exclusive OR circuit 273 from output terminal L of shift register bit 267 as shift register bit 267 has been reset to zero at the beginning of the word cycle. Thus, if a binary one is in the binary adder bit 255, a one signal is applied to terminal F of exclusive OR circuit 273; and since a one signal is also applied to terminal H of exclusive OR circuit 273, a zero signal is delivered from terminal E of exclusive OR circuit 273, passed through exclusive OR circuit 291 and applied to terminal F of final sum binary adder bit 261. Conversely, if a binary zero is in the reference binary adder bit 255, a zero signal is applied from terminal P of binary adder bit 255 to terminal F of exclusive OR circuit 273; and as a one signal is applied to terminal H of exclusive OR circuit, a one signal is applied from terminal E of exclusive OR circuit 273 through exclusive OR circuit 291 to terminal F of final sum binary adder bit 261. Thus, the reference signal is inverted at the exclusive OR circuit 273.

The binary addition in the final sum binary adder bit 261 is accomplished in a straightforward manner with the resulting carry or no carry setting or resetting the shift register bit 293 to one or zero, respectively. Shift register bit 293 is set to one by a one signal from the carry output terminal E of binary bit 261 applied to the ST1 terminal of the shift register bit and an AU pulse (FIG. 4, waveform 1) received on the PUL input terminal from inverter 241 received from input terminal 237.

Shift register bit 293 is reset to zero from the final sum binary adder bit 261 in the same manner with a one signal applied to the ST0 terminal of shift register bit 293 when there is no carry out.

The addition of the inverse of the reference signal, the feedback signal, and the carry or no carry from the previous addition is carried out, bit by bit. If the total feedback number is greater than or equal to the reference, the final sum binary adder 261 has a carry of one with shift register bit 293 set to one. This is because in binary arithmetic one number is subtracted from another number by the addition of the two's complement of one number to the other number.

The first eight digits of the result which are the eight least significant digits are stored in the error buffer storage register. The error buffer storage register consists of shift register bits 300 through 307. The error buffer storage register is connected in the usual manner for a storage register.

The one terminal (terminal P) of the final sum binary adder bit 261 is connected to the ST1 terminal of the first shift register bit 300 in the error buffer storage register. The zero terminal W of the final sum binary adder bit 261 is connected to the ST0 terminal of shift register bit 300 of the error buffer storage register. Thus, when the result of a binary addition in the final sum binary adder bit 261 is a binary one, the ST1 terminal of shift register bit 300 is conditioned; and when a pulse is applied to the PUL terminal of shift register bit 300, shift register bit 300 is set to one. The PUL terminals of the shift register bits 300 through 307 are connected to inverting OR circuit 309. The negative AU pulses (timing chart, FIG. 4, waveform 1) are applied to inverting OR circuit 311. The negative pulses are inverted to a series of positive pulses by inverting OR circuit 311 and applied to terminal M of one shot pulse generator 313, causing one shot pulse generator 313 to produce a negative pulse on output terminal E for each positive pulse received. The negative pulses are inverted to a series of positive pulses by inverting OR 309 and applied to the PUL input terminals of the shift register bits 300 through 307.

*Error buffer storage register.*—Shift register bits 300–307 are set to one or reset to zero in accordance with the signals applied to the ST1 and ST0 terminals of each shift register bit. As the digits are added in the final sum adder, the result is shifted from shift register to shift register until the first eight digits of the result (the eight least significant digits) have been stored in the error buffer storage register.

When the feedback number is greater than, or equal to, the reference, the output of the final sum binary adder 261, after completion of the arithmetic operation, is a one signal on the carry output terminal E. The first eight of the least significant digits are in the buffer storage. Therefore, there is a zero signal output on the no carry terminal L which is applied to terminal U of AND/NOT circuit 315. At 13 time (as shown on the timing chart, FIG. 4, inverse of waveform 3) an LTO zero signal is received on terminal R of AND/NOT circuit 315. Also, when the AU signal received on input terminal 237 becomes a zero signal, zero signals are applied to terminals R, T and U of AND/NOT circuit 315 so that AND/NOT circuit 315 produces a one signal which is inverted to a zero signal by inverting amplifier 319. This zero signal produced by inverting amplifier 319 causes the eight bit error number in the error buffer storage register to be transferred into a particular regulator error storage register in a manner to be described with respect to the regulator error storage register itself. At 0 time, a new calculation can be started to calculate the error for another regulator position.

If the feedback number is less than the reference number, the final carry-out of adder 261 will be a zero instead of a one. Therefore, the one signal from the no carry terminal L is applied to terminal U of AND/NOT circuit 315 preventing AND/NOT circuit 315 from producing a one signal. Output terminal 321 therefore produces a one signal and the number in the error buffer storage register is not transferred to a regulator error storage register. Output terminal 316 delivers a one signal to terminal 187 in FIG. 5 to inhibit the selection of millstand position regulator.

The calculation is then repeated during the next word time but this time adding the two's complement of the feedback to the reference. This is accomplished by adding the inverse of the feedback, the reference, and a carry. There was a zero signal from the carry output terminal E of the binary adder 261 which is applied to terminals M and N of the reversing counter bit 287. The next one signal received on the AVO input terminal 285 is applied to terminals J and K of reversing counter bit 287 to complement the reversing counter bit 287. A one signal is applied from the one output terminal E of reversing counter bit 287 to terminals Y and T of exclusive OR circuits 289 and 291, respectively. By applying one signals to exclusive OR circuits 289 and 291, the input signals to the other terminals of these exclusive OR circuits are inverted. Therefore, when a binary one signal is applied to terminal R of exclusive OR circuit 291 at the same time that a one signal is applied to terminal T of exclusive OR circuit 291 from reversing counter bit 287, a zero signal is delivered from terminal P of exclusive OR circuit 291. Thus, with a one signal applied to terminals Y and T of exclusive OR circuits 289 and 291, respectively, the input signal to the other terminal thereof is inverted with the inverse of the signal received delivered on the output terminal.

The binary addition is accomplished in the same manner as has been described before. The reference number, the inverse of the feedback number and a carry are added in the final sum adder 261. The error is then stored in the error buffer storage register in the same manner as hereinbefore described.

At the beginning of a word time, signal AV on input terminal 247 (see FIG. 4, waveform 6) causes one shot pulse generator 249 to emit a zero pulse after 27 microseconds on terminal W which is applied to AND/NOT circuit 263 on terminal Y to cause AND/NOT circuit 263 to produce a one signal. This one signal is applied to AND/NOT circuit 333 on terminal N to cause AND/NOT circuit 333 to produce a zero signal on output terminal L. This output zero is applied to AND/NOT circuit 325 on terminal K. Since no reference or feedback is applied to the final sum adder 361 until 1 time, there is a one signal on final sum adder 361 terminal W during 0 time. This one signal is applied to AND/NOT circuit 323 terminal X to cause AND/NOT circuit 323 to produce a zero signal on output terminal W which is applied to terminal J of AND/NOT circuit 325. Since both J and K of AND/NOT circuit 325 are zero, its output will be one. In this way, the seal circuit composed of AND/NOT circuits 325 and 333 are preconditioned during 0 time.

If, during the calculation of an error signal, the final sum adder 361 never produces a zero signal on its inverse output terminal W, AND/NOT circuit 323 will remain with a zero output signal. AND/NOT circuit 325 will therefore remain with a one signal. The one signal output of AND/NOT circuit 325 is applied to AND/NOT circuits 327 and 337 on terminals Y and X, respectively, thereby causing AND/NOT circuits 327 and 337 to produce zero output signals. These zero output signals are inverted by inverting circuits 329 and 331 and reinverted by inverting circuits 339 and 341.

If, during the calculation of an error signal, the final sum adder 361 ever produces a zero signal on its inverse output terminal W which is applied to AND/NOT circuit 323 and this remains until after input signal AV on input terminal 237 and AND/NOT circuit 323, terminal Y (see FIG. 4, waveform 6) goes to a zero signal and AND/NOT circuit 323 is caused to produce a one signal. This one signal applied to AND/NOT circuit 325 on terminal J causes AND/NOT circuit 323 to produce a zero output signal on terminal E which is applied to terminal M of AND/NOT circuit 333. AND/NOT circuit 333 then produces a one signal which is applied to terminal K of AND/NOT circuit 325 to cause it to continue to produce a zero signal on its output terminal E.

The zero signal on output terminal E of AND/NOT circuit 325 is applied to input terminal Y of AND/NOT circuit 327 and X of AND/NOT circuit 337 thus enabling these two AND/NOT circuits. When the addition has been completed as indicated by signal 321 as described before, if the feedback is larger than the reference, the reversing counter circuit 287 has a zero output signal on terminal E and a one output signal on terminal L as described before. The zero output signal on terminal E of reversing counter 287 is applied to input terminal X of AND/NOT circuit 327 which causes the output terminal W of AND/NOT circuit 327 to produce a one signal. This one signal is inverted and reinverted by inverting circuits 329 and 331 so that a one signal is produced on output terminal V of inverter 331. The one on the L output terminal of reversing counter 287 is applied to input terminal Y of AND/NOT circuit 337 to cause a zero output to be produced on output terminal W of AND/NOT circuit 337. When the addition has been completed as indicated by signal 321 as described before, if the reference is larger than the feedback, the reversing counter 287 has a one output signal on terminal E and a zero output signal from terminal L as described before. This state of reversing counter 287 will work through AND/NOT circuits 327 and 337 and inverting 329, 331, 339 and 451 in a simple manner to that just described to produce a one output signal on inverter 341 and a zero output signal on inverter 331.

Almost null

It is desirable to know when the position error for a particular millstand reaches a predetermined value, before the feedback equals the reference. This almost null or anticipation signal may be used to initiate other operations which may be started when the position error reaches a predetermined value. In practice, of course, the reference may never equal the feedback; so it is desirable to know when the difference between the reference and the feedback is below a predetermined value.

The almost null circuit compares the final sum from the final sum adder 261 (FIG. 6), which is the position error, with an almost null input received on input terminal 362 from an input at the operator's console. The position error is compared with the almost null input serially bit by bit, starting with the least significant digit.

The position error will have a binary one after the almost null signal when the position error is larger than the almost null signal so that the last comparison between different binary numbers will be between the binary one for the position error and binary zero for the almost null signal. Final sum adder 261 set to one will apply a one signal to terminal U of AND/NOT 368 and a zero signal to terminal F of AND/NOT 370. A zero signal received on the almost null input terminal 362 will be applied to the ST1 terminal of shift register bit 366 and inverted to a one signal by inverter 364 and applied to the ST0 terminal of shift register bit 366. The next AU pulse will reset shift register bit 366 to zero so that a one signal is applied to terminal T of AND/NOT 368 and a zero signal to terminal J of AND/NOT 370. When the AU pulse goes to zero, a zero signal is applied to terminal N of AND/NOT 370 and to terminal T of AND/NOT 368. AND/NOT 368 therefore has a zero signal applied to all terminals and produces a one signal which is inverted to a zero signal by inverting OR circuit and applied to terminal F of AND/NOT 374. AND/NOT 368 with one signals applied to terminal T and U applies a zero signal to terminal N of AND/NOT 374. A zero signal is applied to terminal J at this time so AND/NOT 374 produces a one signal which is inverted to a zero signal by inverting amplifier 376 and delivered on terminal 378 indicating that the position error is larger than the almost null signal.

Two binary zeros might be compared later from the position error and the almost null signal. However, the one signal from AND/NOT 374 is applied back to terminal N of inverting OR 372 to keep inverting OR 372 applying a zero signal to terminal F of AND/NOT 374. Only if the position error is less than or equal to the almost null signal will AND/NOT 374 change.

When the almost null signal is greater than or equal to the position error, the signals applied to the AND/NOTS will be reversed. AND/NOT 368 will apply a one signal to terminal N of AND/NOT 374, causing AND/NOT 374 to produce a zero signal which is inverted by inverting amplifier 376 to a one signal and delivered on terminal 378 indicating that the position error is less than or equal to the almost null signal. The zero signal from AND/NOT 374 is also applied to terminal N of inverting OR 372, and the seal will be broken so that inverting OR 372 will no longer be sealed in.

*Overshoot compensation.*—The drive motor has a tendency to overshoot the reference position. This overshoot may ordinarily be corrected on the following position error calculation. However, when a zero or near zero separating distance is selected, the drive motor may drive the rolls together so that they are squeezed together with the separating distance in effect less than zero.

The feedback indicators commonly used indicate the separating distance between rolls in increments of 0 to about 8000. To effectively utilize the feedback position indicators, they should indicate a zero separating distance between the rolls when the actual separating distance is zero. However, in that case when the rolls are squeezed together, the feedback position indicators will indicate a separating distance in the order of 950 increments as the feedback indicators are not designed to indicate negative numbers. This would indicate to the position regulator that the difference between the reference and the feedback is extremely large, and the drive motor would exert maximum effort to bring the rolls together; when, in fact, they are already squeezed together, wrecking the rolls and the controls.

Accordingly, an overshoot compensation factor of 64 is added to the reference and to the feedback so that both the reference and the feedback will be indicated to be 64 increments greater than they actually are. In this manner the drive motor may overshoot the reference position plus 64 increments and actually reach the reference position. In the specific embodiment it is assumed that the normal overshoot is always less than 64 increments. If the overshoot is greater, the overshoot compensation factor may be changed accordingly.

Overshoot

To allow for the overshoot through zero feedback position, a bias count of 64 is added to the feedback and reference numbers. This bias count is added automatically to the seventh digit in a manner to be explained. It has previously been described how shift register bits 265 and 267 were reset to zero at the beginning of a word cycle and how the output from AND/NOT circuit 277 is a zero signal at the beginning of the word cycle. At 7 time of the cycle, the PH0 signal received on terminal 275 (timing diagram, FIG. 4, waveform 4) goes to a zero signal and is applied to terminal R of AND/NOT circuit 277 and terminal M of AND/NOT circuit 345. Also, at 7 time, the 1TR signal (timing diagram, FIG. 4, inverse of waveform 11) received on input terminal 347 goes to a one signal and is applied to terminal N of AND/NOT circuit 345, causing AND/NOT circuit 345 to apply a zero signal to terminal V of AND/NOT circuit 277. AND/NOT circuit 277 thereupon produces a one signal which is passed by OR circuit 279 and applied to the ST1 terminal of shift register bit 267 and is also passed by OR circuit 281 and applied to the ST1 terminal of shift register bit 265. The one signal from AND/NOT 277 is inverted by inverter 283 and applied as a zero signal to the ST0 terminals of shift register bits 265 and 267. Thereupon, the next positive pulse received on the PUL input terminals of shift register bits 265 and 267 at 8 time causes both shift register bits to be set to one.

The operation of shift register bits 265 and 267 in adding the binary number 64 to the number from the intermediate adder bits 255 and 257 is identical. Therefore, the following description will be confined to a description of the addition of a binary 64 to the feedback number from intermediate adder bit 257.

It has been described how shift register bit 265 is set to one at 8 time. With shift register bit 265 set to one, the one output terminal P applies a one signal to terminal M of exclusive OR circuit 271. Referring now to Table 1 for the addition of the binary number 64 to the numbers 448 and 384.

TABLE 1

| Digit | 11 | 10 | 9 | 8 | 7 | 6 | Number |
|---|---|---|---|---|---|---|---|
| Feedback Adder 257 | 0 | 0 | 1 | 1 | 1 | 0 | 448 |
| SR 265 | 0 | 1 | 1 | 1 | 1 | 0 | +64 |
| Exclusive OR 271 | 0 | 1 | 0 | 0 | 0 | 0 | 512 |

When the seventh digit out of feedback adder 257 is a zero, the computation is as follows:

| Digit | 11 | 10 | 9 | 8 | 7 | 6 | Number |
|---|---|---|---|---|---|---|---|
| Feedback Adder 257 | 0 | 0 | 1 | 1 | 0 | 0 | 384 |
| SR 265 | 0 | 0 | 0 | 0 | 1 | 0 | 64 |
| Exclusive OR 271 | 0 | 0 | 1 | 1 | 1 | 0 | 448 |

Taking the number 448 first, a binary one is applied from the feedback binary adder 257 after 7 time, at 8 time applying a one signal to terminal M of exclusive OR circuit 271. Exclusive OR circuit 271 with one signals applied to both input terminals M and N thereupon produces a zero signal indicating a binary zero. Exclusive OR 271 has thus added a binary one and a binary one to give a result of a binary one plus a carry of a binary one. At 8 time, the 1TR pulse received on input terminal 347 goes to a zero signal and is applied to terminal N of AND/NOT circuit 345. The PHO signal (FIG. 4, waveform 4) applied to terminal M is a zero signal causing AND/NOT circuit 345 to apply a one signal to terminal V of AND/NOT circuit 277 so that AND/NOT circuit 277 applies a zero signal through OR circuits 281 and 279 to the ST1 input terminals of shift register bits 265 and 267. The zero signal from AND/NOT circuit 277 is inverted by inverter 283 and applied as a one signal to the ST0 input terminals of shift register bits 265 and 267. After 8 time, at 9 time (as shown in Table 1), the binary adder bit 257 produces a one signal from terminal P which is passed by OR circuit 281 and applied as a one signal to the ST1 terminal of shift register bit 265. Shift register bit 265 with one signals applied to both its ST1 and ST0 terminals remains set to one upon receiving positive pulses on its PUL terminal, applying a one signal to terminal N of exclusive OR circuit 271. This provides the carry of one. A one signal is also applied to terminal M of exclusive OR circuit 271 from terminal P of the feedback binary adder bit 257 so that exclusive OR circuit 271 produces a zero signal indicating a binary zero. This continues for the number 448 until after 10 time a binary zero from the binary adder bit 257 produces a zero signal on terminal P, which is applied to terminal M of exclusive OR circuit 271 and passed by OR circuit 281 and applied as a zero signal to the ST1 terminal of shift register bit 265. During 10 time shift register bit 265 remains set to one, applying a one signal from terminal P to terminal N of exclusive OR 271. Exclusive OR 271 thereupon produces a one signal for digit 10. As shift register bit 265 has a one signal applied to the ST0 terminal at this time for the reason hereinbefore described, shift register bit 265 upon receiving the next positive pulse at 11 time on the PUL input terminal is reset to zero. The result of the addition is therefore a binary 512 (448+64).

Now looking at Table 1 for the addition of the binary number 64 to the number 384. After 7 time, the output from the binary adder bit 257 is a binary zero applying a zero signal to terminal N of exclusive OR circuit 271. At 8 time, a pulse to the PUL terminal sets shift register bit 265 to one applying a one signal to terminal N of exclusive OR circuit 271. This causes exclusive OR circuit 271 to produce a one signal at 8 time. Therefore, the result of the addition of 384 to 64 is 448.

The automatic addition of a bias of 64 to the feedback and reference numbers to correct for overshoot has thus been described.

*Error buffer*

If the output of the final adder binary adder bit 261 is one after the eighth digit, the error buffer should have all shift register bits set to one to indicate a larger error than an eight bit number. At 9 time, as the eighth bit is shifted into the error buffer register, the 2TR signal (FIG. 4, inverse of waveform 12) which is applied to input terminal 351 goes to zero and is applied to terminal J of inverting OR circuit 353. The 1TR signal (FIG. 4, inverse of waveform 11) is zero at 9 time. Terminal H of inverting OR 353 receives a zero signal and the PHO signal (FIG. 4, waveform 4) is zero so terminal F of inverting OR circuit 353 receives a zero signal. Inverting OR circuit 353 at 9 time and thereafter applies a one signal to terminal N of inverting OR circuit 355 and to terminal F of AND/NOT circuit 311, causing inverting OR circuit 355 to apply a zero signal to terminal T of AND/NOT circuit 349 and causing output terminal E of AND/NOT circuit 311 to be zero thereafter. If the result of the addition of the ninth bit in the final sum binary adder bit 261 is one, the zero terminal W of final sum adder bit 261 applies a zero signal to terminal V of AND/NOT circuit 349. Also, 13.3 microseconds after 9 time, the AU pulse received on input terminal 237 goes to zero, applying a zero signal to terminal U of AND/NOT circuit 349 so that AND/NOT circuit 349 produces a one signal which is applied to the set terminals of shift register bits 300 to 307 to set all of the shift register bits in the error buffer storage register to one.

Thus, if the error is larger than an eight digit number, all eight shift register bits 300–307 are automatically set to one.

*Transfer of error from error buffer to error storage.—* After the position error has been temporarily stored in the error buffer, it must be transferred to the proper error storage. The zero output terminals to shift register bits 300–307 in FIG. 6 are connected through inverting amplifiers 800–807, respectively, to output terminals 810–817, respectively. The output terminals 810–817 of the error buffer are connected to the inputs of the error storage registers of the individual millstands. For example, the output terminals 810–817 of the error buffer in FIG. 6 are connected to input terminals 820–829 of the error storage register in FIG. 7.

In this manner, a shift register bit 300–307 in FIG. 6 in the error buffer set to one applies a one signal to a corresponding input terminal 820–827 in FIG. 7.

*Error storage and control circuit*

A representative regulator error storage and amplifier is shown in FIG. 7. After 13 time and before 0 time, when the serial arithmetic in FIG. 8 has finished the error calculation, a zero signal is received on input terminal 501 from terminal 321 in FIG. 6, indicating the error calculation is finished, applying a zero signal to terminal F of AND/NOT circuit 503. Also, before zero time, a zero signal received on input terminal 505 is applied to terminal J of AND/NOT circuit 503, indicating that the particular millstand position regulator has been selected. AND/NOT circuit 503 thereupon produces a one signal which is inverted to a zero signal by inverting OR circuit 507 and applied to the HOLD input terminals of relay flip flops 510–517. The IN input terminals of relay flip flops 510–517 are connected, respectively, to the inverted zero output terminals of shift register bits 300 to 307 of the error buffer storage register in FIG. 6. Therefore, the relay flip flops 510 to 517 are set to one or reset to zero in accordance with the binary numbers in the error buffer storage register in FIG. 6. The zero signal applied from inverting OR circuit 507 is also applied to the HOLD terminal of relay flip flops 519 and 521. Relay flip flop 519 receives a one signal on its IN input terminal from output terminal 343 in FIG. 6 when the feedback was less than the reference. The input terminal on relay flip flop 521 receives a signal from output terminal 331 in FIG. 6 when the reference was smaller than the feedback. Therefore, depending on whether the reference was smaller or larger than the feedback either relay flip flop 519 or relay flip flop 521 is energized to close the contacts therein.

After the relay flip flops are set and reset, the input signal on terminal 501 changes to a zero signal as a new calculation begins so that AND/NOT circuit 503 produces a zero signal which is inverted by inverting OR circuit 507 to a one signal and applied to all of the HOLD input terminals of relay flip flops 510–517, 519 and 521. Therefore, the relay flip flops cannot change until that particular mill stand has been selected again and the calculation of the position error has been finished. This is due to the fact that a zero signal is only received on input terminal 505 at that time. The closed interlocks in the relay flip flops are utilized for a conventional current summing digital to analog converter from the closed contacts of the energized relays. A current proportional to the error as stored in the regulator error storage register is applied to the input of an operational amplifier 523 which drives a power amplifier 525 to operate a conventional drive control. The drive control will drive the drive motor in accordance with the error indicated.

The direction in which the drive motor is driven is according to whether relay flip flop 519 or 521 has been energized. When feedback is less than the reference relay, flip flop 519 is energized closing the relay contacts and setting the flip flop to one. Flip flop 519 when energized the operational amplifier 523 is connected through the closed interlocks of flip flops 510–517 to a −62 volt potential. The operational amplifier 523 then moves the rolls further apart in accordance with the current proportional to the error as stored in the error storage register.

When the feedback is greater than the reference relay, flip flop 521 is energized, closing its contacts and setting the flip flop to one. Flip flop 521 when energized the operational amplifier 523 is connected through the closed interlocks of flip flops 510–517 to a +62 volt potential. The operational amplifier 523 then moves the rolls closer together in accordance with the current proportional to the error as stored in the error storage register.

*Position feedback*

The position of the drive motors is sensed by binary coded shaft position encoders. Each encoder is coupled to a selsyn receiver which is in turn electrically connected to reproduce the relation of a selsyn transmitter affixed to the shaft of the drive motor. The binary shaft position encoders are sensed in a standard manner and the resulting position feedback number transferred to be compared with the reference number in the manner described as the specific position is selected for comparison of the feedback position and the reference in the manner described.

*Reference input*

The reference number for each position is read into relay interfaces by the closing of individual contacts by the operator or other input means as described before.

*Automatic zeroing*

The automatic zeroing feature provides for correction of the feedback from the coacting rolls. The feedback from each mill stand indicates the distance between a point on the bottom roll and a point on the top roll. Thus, when the rolls are closed with no actual separating distance between the coacting rolls, the feedback will still indicate that there is a separating distance between the points on the lower and upper rolls. This is provided so that compensation may be made for the wear on the rolls as they are used.

The feedback must accurately indicate the actual separating distance between the surfaces of the top and bottom rolls. Therefore, the automatic zeroing feature is provided as described hereinafter.

The rolls are moved apart and the actual separating distance between the surfaces of the rolls measured. The actual measured distance between the surfaces of the contacting rolls is then subtracted from the indicated feedback separating distance. The result is a zeroing correction factor that must be effected in the feedback so that the separating distance between the coacting rolls is accurately indicated by a corrected feedback. The zeroing correction factor therefore must be subtracted from the feedback each time before a comparison is made with the reference so that the comparison may be made with a zero corrected feedback.

To carry this out, referring now to FIG. 6, the actual measured distance between the rolls is entered into the reference input terminal 221 and the feedback is entered into the feedback terminal 231. The subtraction of the actual measured distance from the indicated feedback is carried out in the same manner as that hereinbefore described for subtraction of the reference from the feedback by adding the two's complement of the actual measured distance to the feedback in the final sum adder bit 261. The result is read out of output terminal 262 connected to the one output terminal P of the final binary adder bit 261. This information is stored in the 13 bit register in FIG. 8 in a manner to be described. After the difference between the indicated feedback and the actual measured distance between the rolls has been calculated and stored in the storage register, it is transferred to a permanent storage register associated with the particular mill stand regulator for which the zero correction has been determined. Thereinafter, each time that particular millstand regulator has its feedback compared with the reference, the zero correction is applied to the zero input terminal 243 in FIG. 6 to correct the indicated feedback signal to give a zero corrected feedback in the manner hereinbefore described.

The zero correction factor is transferred from the one terminal of binary adder bit 261 to the register in FIG. 8.

When the zero correction number is to be stored in the shift register in FIG. 8, a one signal is received from the particular regulator having its zero correction factor calculated (FIG. 9—693) on input terminal 405, inverted to a zero signal by inverter 407 and applied to terminal N of AND/NOT circuit 409. One and zero signals (binary one–zero) are applied to terminal 411 from output terminal 262 in FIG. 6. A zero signal received on input terminal 411 (FIG. 8), indicating that the bit of the zero correction number from terminal 262 (FIG. 6) is zero, is inverted to a one signal by inverter 410 (FIG. 6) to cause AND/NOT circuit 409 to apply a zero signal to terminal V of AND/NOT circuit 413. For the purposes of the description, other terminals of AND/NOT 413 receive zero signals at this time so that AND/NOT 413 produces a one signal. The one signal from AND/NOT 413 is applied to the ST0 terminal of shift register bit 430 and inverted by inverter 421 to apply a zero signal to the ST1 terminal of shift register bit 430. Shift register bit 430 thus has a one signal applied to its ST0 terminal and a zero signal applied to its ST1 terminal.

The zero signal produced by inverter 407 is inverted to a one signal by inverter 415 and applied to terminal M of inverting OR circuit 417 causing inverting OR circuit 417 to apply a zero signal to terminal V of AND/NOT circuit 419. AU pulses are received on terminal 445 (FIG. 4, waveform 1) and applied to terminal U of AND/NOT circuit 419. A one AU pulse causes AND/NOT 419 to apply a zero or positive signal to the PUL terminals of shift register bits 430–443, causing the contents of the shift register bits 430–443 to be shifted to the right; and shift register bit 430 is set to one or reset to zero, depending on the signal applied to its ST1 and ST0 terminals. In the above manner, all 13 bits of the zero correction number are read into shift register bits 430–443 from the final sum adder 261 in FIG. 6.

After the zero correction number for an individual millstand regulator has been read into shift register bits 430–443, it must be stored in the interface relays of the particular millstand shown in FIG. 9. A binary one stored in one of the shift register bits 430–443 produces a one signal to energize a corresponding relay coil 450–463. An energized relay coil 450–463 closes a normally open relay contact 479–482 in FIG. 9. The zero correction number stored in the relay interface consists of 12 bits. The closing of a relay contact 479–482 in FIG. 9 energizes a corresponding relay coil 601–612 in a relay interface 681, 683, and 685. An energized relay coil remains energized until reset in the relay interface. An energized relay coil opens associated normally closed contacts and closes normally open contacts to store a binary one in the relay interface. Normally closed contacts 621–632 are opened when a corresponding relay coil 601–612 is energized and normally open contacts 641–652 are closed when a corresponding relay coil is energized.

The normally open relay contacts 641–652, when closed, energize corresponding lamps 661–672 indicating that a binary one has been stored in the corresponding position. The normally closed relay contacts 621–632, when opened, indicate a binary one and apply zero signals to commutators 655 and 657.

The zero correction number is read out serially as serial signals are applied to the commutators.

A zero signal is applied to terminal 830 from 0 time to 6 time of the word time to condition commutator 655 and inhibit commutator 657. At 7 time, the signal changes to condition commutator 657 and inhibit commutator 655. The following TR signals are applied to terminals 831–863 at the bit times shown:

| Bit Time | Terminal | Signal |
| --- | --- | --- |
| 0 |  |  |
| 1 | 831 | 1TR |
| 2 | 832 | 2TR |
| 3 | 833 | 3TR |
| 4 | 834 | 4TR |
| 5 | 835 | 5TR |
| 6 | 836 | 6TR |
| 7 | 831 | 1TR |
| 8 | 832 | 2TR |
| 9 | 833 | 3TR |
| 10 | 834 | 4TR |
| 11 | 835 | 5TR |
| 12 | 836 | 6TR |
| 13 | 837 |  |

From 0 time through 6 time with commutator 655 conditioned, the 1–6TR signals are effective to cause one signals to be read out where a zero signal is applied to the commutator 655 from the normally closed contacts 621–626 which have been opened to store a binary one from 9 time through 12 time. With commutator 657 conditioned, the 1–6TR signals are effective to cause one signals to be read out where a zero signal is applied to commutator 657 from the normally closed contacts 627–632 which have been opened to store a binary one.

For example, if normally closed contact 627 is opened to store a binary one, applying a zero signal to terminal W of commutator 657, at 76 time a 1TR one signal is received on terminal 836 and applied to terminal K of commutator 657. As terminal W of commutator 657 has a zero signal applied thereto, a one signal is read out from commutator 657 and delivered on output terminal 838 to the zeroing input terminal 243 in FIG. 6.

Referring back to FIG. 9, a zeroing operation (determining the zeroing factor) is initiated by an operator by turning the selector switch 661 to the zero position closing normally closed contacts 663. Contacts 663, when closed, apply a voltage to trigger 665. Trigger 665 then applies a zero signal from terminal L to terminal F of AND/NOT 667 and to the RST terminal of flip flop 669. Flip flop 669 is reset to zero prior to the operator turning switch 661 from RUN to zero. Zero signals are applied to terminals J and K of AND/NOT 667. A zero signal received on terminal 671 at a regulator sampling interval when the particular millstand has been selected is applied to terminal H of AND/NOT 667 and terminal U of AND/NOT 691.

AND/NOT 667 then applies a one signal to the set terminal of flip flop 673 to set flip flop 673 to "one." The one signal from terminal E of flip flop 673 passes through amplifier 675 to energize relay coil 677. Relay coil 677, when energized, closes normally open contacts 679 to apply a —18 volt signal to relay interfaces 681, 683 and 685. A —18 volt signal applied to the relay interfaces conditions them to store a new number therein.

The zero signal output from terminal L of flip flop 673 is delayed by time delay 687 for a period of three milliseconds and inverted to a one signal, inverted back to a zero signal by inverter 689 and applied to terminal R of AND/NOT 691. The time delay is to allow for the operation of relay 677. At the next regulator sampling period of that particular millstand a RSO zero signal is applied to terminal U of AND/NOT 691 so that a one signal is delivered on output terminal 693 to terminal 405 in FIG. 8 to start zeroing calculation.

The one signal from terminal E of flip flop 673 in FIG. 9 also sets flip flop 669 to one with the one signal from terminal P of flip flop 669 inverted by inverter 695 to a zero signal, inverted back to a one signal by inverting amplifier 697 and applied to terminal R of AND/NOT 667. The zeroing calculation is carried out of the usual calculation time for that particular millstand.

After the zeroing calculation has been completed, the signal storage relays 471–482 have been selectively energized as described hereinbefore.

The one signal received on terminal 405 in FIG. 8 starting the zeroing calculation after inversion to a zero signal by inverter 407 is applied to terminal Y of AND/NOT 701. At the end of a calculation cycle at zero time, a zero OTXO signal (FIG. 4, inverse of waveform 7) is applied to terminal X of AND/NOT 701 (FIG. 8), applying a one signal to terminal F of one shot 703. One shot 703 then applies a zero signal to terminal T of AND/NOT 705 for a period of 50 milliseconds. For the purposes of this description, the other terminals of AND/NOT 705 have zero signals applied thereto at the time that a one signal amplified by amplifier 707 energizes relay coils 709 and 711.

Energized relay coil 711 closes normally open contacts 713 in FIG. 9 to apply a +6 volt signal to relay interfaces 681, 683 and 685 to store the information therein as indicated by the selective closing of controls 471–482.

Energized coil 709 in FIG. 8 closes normally open contacts 716 in FIG. 9, applying a one signal to terminal J of AND/NOT 667 and a one signal to the RST terminal of flip flop 673 to reset that flip flop to zero. With flip flop 673 reset to zero, relay coil 677 is de-energized, opening contacts 679 to remove the —18 volt signal from relay interfaces 681, 683, and 685 so that the +6 volt signal through relay contacts 713 is no longer effective in changing the state of relays 601–612 by the selected closings of contacts 471–482.

As flip flop 673 is reset to zero, the one signal from terminal L is inverted to a zero signal by time delay 687, inverted and applied as a one signal to terminal R of AND/NOT 691 so that a zero signal is delivered on terminal 693 to terminal 405 in FIG. 8.

A zero signal is applied from terminal E of flip flop 673 in FIG. 9 to terminal Y of AND/NOT 715; and as flip flop 669 remains set to one, a zero signal is applied to terminal X of AND/NOT 715. AND/NOT 715 therefore produces a one signal which is amplified by amplifier 717 to energize the zero complete lamp 719. This indicates to the operator that the zeroing operation is complete and the operator may return the selector switch to run closing normally closed contacts 663 and resetting flip flop 669.

While the invention has been explained and described with the aid of particular embodiments thereof, it will be understood that the invention is not limited thereby and that many modfications retaining and utilizing the spirit thereof without departing essentially therefrom will occur to those skilled in the art in applying the invention to specific operating environments and conditions. It is therefore contemplated by the appended claims to cover

What is claimed is:

1. In a position regulating system for positioning a pair of coacting rolls in a rolling mill according to the difference between the actual and desired separating distance between said pair of coacting rolls, means for indicating the indicated separating distance between sad pair of coacting rolls, means for indicating the zero correction factor for said indicating means, means for comparing said indicated separating distance and said zero correction factor, and means responsive to said comparing means for increasing the range of said indicated separating distance by a predetermined value when said indicated separating distance is less than said zero correction factor.

2. In a position regulating system for positioning a pair of coacting rolls in a rolling mill according to the difference between the actual and desired separating distance between said pair of coacting rolls, means for indicating the indicated separating distance between said pair of coacting rolls, means for indicating the zero correction factor for said indicating means, means for indicating the normal working range of said coacting rolls, means for comparing said indicated separating distance and said zero correction factor plus said normal working range, means for modifying said indicated separating distance by said zero correction factor to indicate the actual separating distance between said pair of coacting rolls, means for indicating a desired separating distance for said pair of coacting rolls, means for calculating the difference between the actual and desired separating distance of said pair of coacting rolls, and means responsive to said comparing means for adding a predetermined binary number to said difference when said indicated separating distance is less than said zero correction factor plus said normal working range.

3. In a position regulating system for positioning a pair of coacting rolls in a rolling mill according to the difference between the actual and desired separating distance between said pair of coacting rolls, means for indicating the indicated separating distance between said pair of coacting rolls, means for indicating the zero correction factor for said indicating means, means for indicating the normal working range of said coacting rolls, first means for comparing said indicated separating distance and said zero correction factor, means responsive to said first comparing means for increasing the range of said indicated separating distance by a predetermined value when said indicated separating distance is less than said zero correction factor, means for comparing said indicated separating distance and said zero correction factor plus said normal working range, means for modifying said indicated separating distance by said zero correction factor to indicate an actual separating distance between said pair of coacting rolls, means for indicating a desired separating distance for said pair of coacting rolls, means for calculating the difference between the actual and desired separating distance of said pair of coacting rolls, and means responsive to said comparing means for inhibiting the highest order bit of said difference when said indicated separating distance is less than said zero correction factor plus said normal working range.

4. In a position regulating system for positioning a pair of coacting rolls in a rolling mill according to the difference between the actual and desired separating distance between said pair of coacting rolls, means for indicating the indicated separating distance between said pair of coacting rolls, means for indicating the zero correction factor for said indicating means, means for providing a bias, means for comparing said zero correction factor and said indicated separating distance plus said bias, and means responsive to said comparing means for increasing the range of said indicated separating distance by a predetermined value when said indicated separating distance plus said bias is less than said zero correction factor.

5. In a position regulating system for positioning a pair of coacting rolls in a rolling mill according to the difference between the actual and desired separating distance between said pair of coacting rolls, means for indicating the indicated separating distance between said pair of coacting rolls, means for indicating the zero correction factor for said indicating means, means for modifying said indicated separating distance by said zero correction factor to indicate an actual separating distance, means for comparing said indicated separating distance and said zero correction factor, means responsive to said comparing means for increasing the range of said indicated separating distance by a predetermined value when said indicated separating distance is less than said zero correction factor, means for indicating a desired separating distance for said pair of coacting rolls, and means for calculating the difference between the actual and desired separating distance between said pair of coacting rolls.

6. In a position regulating system for positioning a pair of coacting rolls in a rolling mill according to the difference between the actual and desired separating distance between said pair of coacting rolls, means for indicating the indicated separating distance between said pair of coacting rolls, means for deriving the zero correction factor for said pair of coacting rolls, means for comparing said indicated separating distance and said zero correction factor, and means responsive to said comparing means for increasing the range of said indicated separating distance by a predetermined value when said indicated separating distance is less than said zero correction factor.

7. In a position regulating system for positioning a pair of coacting rolls in a rolling mill according to the difference between the actual and desired separating distance between said pair of coacting rolls, means for indicating the actual separating distance between said pair of coacting rolls, means for indicating the indicated separating distance between said pair of coacting rolls, means for calculating the difference between said actual separating distance and said indicated separating distance, means for storing said difference as a zero correction factor, means for comparing said indicated separating distance and said zero correction factor, and means responsive to said comparing means for increasing the range of said indicated separating distance by a predetermined value when said indicated separating distance is less than said zero correction factor.

8. In a position regulating system for positioning a plurality of pairs of coacting rolls in a rolling mill according to the difference between the actual and desired separating distance between each pair of coacting rolls, each pair of coacting rolls having associated therewith means for indicating a desired separating distance, each pair of coacting rolls having associated therewith means for indicating an indicated separating distance, each pair of coacting rolls having associated therewith means for indicating the actual separating distance, means for selecting the indicated and actual indicating means associated with each pair of coacting rolls in a predetermined order, means for calculating the difference between the selected indicated separating distance and the actual separating distance, storage means associated with each pair of coacting rolls for storing the difference between the indicated and actual separating distance as a zero correction factor, said selection means selecting the indicated and desired indicated means for each pair of coacting rolls in a predetermined order, means for comparing said indicated separating distance and said zero correction factor, means for modifying the selected indicated separating distance by the zero correction factor, means responsive to said comparing means for increasing the range of said indicated separating distance by a predetermined value when said indicated separating distance is less than said zero correction factor, and said calculating means responsive to the selected modified indicated separating distance and the desired separating distance for calculating the difference therebetween.

References Cited

UNITED STATES PATENTS

| | | | |
|---|---|---|---|
| 2,410,283 | 10/1946 | Garr | 72—8 |
| 3,100,410 | 11/1962 | Hulls | 72—8 |
| 3,204,440 | 9/1965 | Thompson | 72—8 |
| 3,246,496 | 4/1966 | Holben | 72—21 |

CHARLES W. LANHAM, *Primary Examiner.*

A. RUDERMAN, *Assistant Examiner.*